(12) United States Patent
Okada

(10) Patent No.: US 6,367,326 B1
(45) Date of Patent: Apr. 9, 2002

(54) ANGULAR VELOCITY SENSOR

(75) Inventor: Kazuhiro Okada, Ageo (JP)

(73) Assignee: Wacoh Corporation, Saitama (JP)

( * ) Notice: Subject to any disclaimer, the term of this patent is extended or adjusted under 35 U.S.C. 154(b) by 0 days.

(21) Appl. No.: 09/547,799

(22) Filed: Apr. 12, 2000

Related U.S. Application Data

(62) Division of application No. 09/029,471, filed as application No. PCT/JP96/01926 on Jul. 10, 1996, now Pat. No. 6,076,401.

(51) Int. Cl.[7] .................................................. G01P 9/04
(52) U.S. Cl. .................................................. 73/504.12
(58) Field of Search ........................ 73/504.12, 504.15, 73/504.16, 504.03, 504.04, 504.08, 510, 514.39

(56) References Cited

U.S. PATENT DOCUMENTS

| | | | |
|---|---|---|---|
| 3,842,681 A | 10/1974 | Mumme | 73/505 |
| 4,848,158 A | 7/1989 | Egli et al. | 73/514.39 |
| 4,905,523 A | 3/1990 | Okada | 73/862.04 |
| 4,967,605 A | 11/1990 | Okada | 73/862.041 |
| 4,969,366 A | 11/1990 | Okada | 73/862.08 |
| 5,014,415 A | 5/1991 | Okada | 29/621.1 |
| 5,035,148 A | 7/1991 | Okada | 73/862.041 |
| 5,092,645 A | 3/1992 | Okada | 294/86.4 |
| 5,182,515 A | 1/1993 | Okada | 73/862.041 |
| 5,263,375 A | 11/1993 | Okada | 73/862.042 |
| 5,295,386 A | 3/1994 | Okada | 73/1 D |

(List continued on next page.)

FOREIGN PATENT DOCUMENTS

| | | |
|---|---|---|
| JP | 52-109963 | 9/1977 |
| JP | 58-221109 | 12/1983 |
| JP | 61-17910 | 1/1986 |
| JP | 61-93018 | 8/1986 |
| JP | 63-97859 | 6/1988 |
| JP | 63-183508 | 11/1988 |
| JP | 4-178517 | 6/1992 |
| JP | 5-248875 | 9/1993 |
| JP | 6-510604 | 11/1994 |
| JP | 07-91958 | 4/1995 |

*Primary Examiner*—John E. Chapman
(74) *Attorney, Agent, or Firm*—Ladas & Parry

(57) ABSTRACT

A pivotal shaft (130) is provided along the Z-axis on a semiconductor substrate (100), whose upper surface extends along the XY-plane, to fit a rotor (200) consisting of dielectric material. The rotor is supported by the pivotal shaft so that it can be inclined and can be rotated. The peripheral portion of the rotor constitutes weight bodies (211, 212), and stators (111, 115) consisting of conductive material are disposed at the periphery thereof. When a.c. voltages of predetermined period are delivered to the stators, the rotor is rotated while floating in accordance with the principle of the induction motor. When angular velocity ωx about the X-axis is applied to the substrate 100, Corioli's force Fcz in the Z-axis positive direction is applied to the weight body (211) passing through the X-axis with velocity component in the Y-axis positive direction so that it becomes away from-the substrate. Corioli's force –Fcz in the Z-axis negative direction is applied to the weight body (212) passing through the X-axis with velocity component in the Y-axis negative direction so that it becomes close the substrate. Capacitance elements C1, C2 are formed by fixed electrodes (141AB, 142AB) on the substrate and movement electrodes (231, 232) on the rotor. Difference between electrostatic capacitance values of both the capacitance elements is obtained to detect magnitude of applied Corioli's force. The magnitude of the detected Corioli's force is outputted as a value of angular velocity ωx about the X-axis. Even under the environment where acceleration is applied, the acceleration component is canceled by obtaining difference.

6 Claims, 26 Drawing Sheets

U.S. PATENT DOCUMENTS

| | | | |
|---|---|---|---|
| 5,343,765 A | 9/1994 | Okada | 73/862.043 |
| 5,365,799 A | 11/1994 | Okada | 73/862.043 |
| 5,377,544 A | 1/1995 | Dunn | 73/505 |
| 5,384,059 A | 1/1995 | Klein et al. | 252/73 |
| 5,392,658 A | 2/1995 | Okada | 73/862.043 |
| 5,406,848 A | 4/1995 | Okada | 73/517 R |
| 5,421,213 A | 6/1995 | Okada | 73/862.043 |
| 5,437,196 A | 8/1995 | Okada | 73/862.043 |
| 5,492,020 A | 2/1996 | Okada | 73/862.626 |
| 5,497,668 A | 3/1996 | Okada | 73/862.626 |
| 5,531,002 A | 7/1996 | Okada | 29/25.41 |
| 5,531,092 A | 7/1996 | Okada | 73/1 D |
| 5,571,972 A | 11/1996 | Okada | 73/862.043 |
| 5,635,640 A | 6/1997 | Geen | 73/504.12 |
| 5,639,973 A | 6/1997 | Okada | 73/862.043 |
| 5,646,346 A | 7/1997 | Okada | 73/504.04 |
| 5,668,316 A | 9/1997 | Okada | 73/504.11 |
| 5,682,000 A | 10/1997 | Okada | 73/862.043 |
| 5,744,718 A | 4/1998 | Okada | 73/514.33 |
| 5,780,749 A | 7/1998 | Okada | 73/862.043 |
| 5,811,693 A | 9/1998 | Okada | 73/862.043 |
| 5,831,163 A | 11/1998 | Okada | 73/504.12 |
| 5,850,040 A | 12/1998 | Okada | 73/504.04 |
| 5,856,620 A | 1/1999 | Okada | 73/514.32 |
| 5,952,572 A * | 9/1999 | Yamashita et al. | 73/504.12 |
| 5,962,787 A | 10/1999 | Ikada | 73/514.32 |
| 5,987,985 A | 11/1999 | Okada | 73/504.04 |
| 6,003,371 A | 12/1999 | Okada | 73/504.02 |
| 6,053,057 A | 4/2000 | Okada | 73/862.043 |

* cited by examiner

ANGULAR VELOCITY SENSOR

This application is a divisional of application(s) application Ser. No. 09/029,471 filed on Mar. 2, 1998, now U.S. Pat. No. 6,076,401 and International Application PCT/JP96/01926 filed on Jul. 10, 1996 and which designated the U.S., claims the benefit thereof and incorporates the same by reference.

TECHNICAL FIELD

This invention relates to an angular velocity sensor, and more particularly to an angular velocity sensor suitable for mass-production utilizing micromachining technology and semiconductor technology.

BACKGROUND ART

In the automobile industry or machinery industry, etc., there has been increased demand for sensors capable of precisely detecting acceleration or angular velocity of a moving object. In regard to an acceleration, sensors of various types have been conventionally proposed, and small-sized sensors capable of two-dimensionally or three-dimensionally detecting an applied acceleration have been put into practical use. For example, in the International Publication No. WO88/08522 based on the Patent Cooperation Treaty (U.S. Pat. Nos. 4,967,605, 5,182,515), an acceleration sensor utilizing changes of resistance values of piezo resistance elements formed on a semiconductor substrate is disclosed. Moreover, in the International Publication No. WO92/17759 based on the Patent Cooperation Treaty (U.S. Pat. No. 5,492,020), there is disclosed an acceleration sensor in which electrostatic capacitance elements or piezoelectric elements are used to detect an applied acceleration in every respective coordinate axis direction. In the International Publication No. WO93/02342 based on the Patent Cooperation Treaty (U.S. Pat. No. 5,365,799), there is disclosed a multi-axial acceleration sensor using piezoelectric elements of different type.

On the other hand, there are a relatively few publications in connection with the angular velocity sensor. Particularly, publications in regard to angular velocity sensors capable of simultaneously detecting angular velocity about multi-axes can be hardly seen. Ordinarily, angular velocity sensors are utilized for the purpose of detecting an angular velocity of a power shaft, etc. of vehicle, and only have a function to detect an angular velocity about a specific one axis. In such a case that a rotational speed of the power shaft as described above is measured, it is sufficient to use a one-dimensional angular velocity sensor. However, as a sensor for detecting angular velocity with respect to an object which carries out free movement within a three-dimensional space, multi-axial velocity sensors capable of simultaneously detecting angular velocity components about two-axes or three-axes are expected.

In order to meet with such demand, the inventor of this application has proposed novel multi-axial angular velocity sensors in the International Publication No. WO94/23272 based on the Patent Cooperation Treaty (U.S. patent application Ser. No. 08/366,026) and the Japanese Patent Application No. 7-56690/1995 specification (U.S. patent application Ser. No. 08/601,794). Such novel angular velocity sensors utilize the principle that when an angular velocity is applied about the second coordinate axis to the object moving in the first coordinate axial direction in the XYZ three-dimensional rectangular coordinate system, Coriolis force is produced in the third coordinate axial direction, and the sensors detect the Coriolis force applied to the object so as to indirectly detect an angular velocity. For detecting Coriolis force, the technologies which have been fostered in the conventional acceleration sensors are applied. That is, a piezo resistance element, a capacitance element and a piezoelectric element, etc. are utilized.

SUMMARY OF THE INVENTION

An object of this invention is to provide a concrete and more practical mechanism of the angular velocity sensor based on the above-described principle, particularly to provide a novel technique for manufacturing a multi-axial angular velocity sensor utilizing micromachining technology and semiconductor technology, According to this invention, mass-production of small and high accuracy multi-axial angular velocity sensors is realized.

(1) The first feature of the present invention resides in an angular velocity sensor comprising:

a substrate having an upper surface along an XY plane in an XYZ three-dimensional coordinate system;

a weight body for carrying out rotational movement in a non-contact state with respect to the upper surface with a Z-axis perpendicular to the upper surface being an axis of rotation; energy supply means for delivering energy to the weight body so that the weight body carries out the rotational movement while maintaining a fixed distance with respect to the upper surface of the substrate when no external force is applied; and "distance above X-axis measurement means" for measuring a distance between the upper surface and the weight body at a time when the weight body passes above the X-axis;

thus to detect an angular velocity about the X-axis on the basis of a distance measured by the distance above X-axis measurement means.

(2) The second feature of the present invention resides in an angular velocity sensor as in the first feature: and wherein there are provided a first weight body and a second weight body which carry out the rotational movement in a non-contact state with respect to the upper surface of the substrate with the Z-axis being as an axis of rotation;

wherein the first weight body and the second weight body can be rotated in a state where their phases are shifted relative to each other by 180 degrees so that when the first weight body is positioned above the positive X-axis, the second weight body is positioned above the negative X-axis; and the "distance above positive X-axis measurement means" serves for measuring the distance between the upper surface of the substrate and either of the weight bodies at a time when the weight body passes above the positive X-axis;

the "distance above negative X-axis measurement means" serves for measuring a distance between the upper surface of the substrate and either of the weight bodies at a time when the weight body passes above the negative X-axis; and difference calculation means for obtaining a difference between the distance measured by the "distance above positive X-axis measurement means" and the distance measured by the "distance above negative X-axis measurement means", thus to detect an angular velocity about the X-axis applied to the substrate on the basis of a difference obtained by the difference calculation means.

(3) The third feature of the present invention resides in an angular velocity sensor according to the first feature:

wherein there is further provided "distance above Y-axis measurement means" for measuring a distance between the upper surface of the substrate and the weight body at a time point when the weight body passes above the Y-axis;

thus to detect an angular velocity about the X-axis applied to the substrate on the basis of the distance measured by the "distance above X-axis measurement means", and to detect an angular velocity about the Y-axis applied to the substrate on the basis of the distance measured by the "distance above Y-axis measurement means".

(4) The fourth feature of the present invention resides in an angular velocity sensor according to the third feature:

wherein there are provided a first weight body and a second weight body which carry out rotational movement in a non-contact state with respect to the upper surface of the substrate with the Z-axis being as an axis of rotation;

wherein the first weight body and the second weight body can be rotated in a state where their phases are shifted relative to each other by 180 degrees so that when the first weight body is positioned above the positive X-axis, the second weight body is positioned above the negative X-axis and when the first weight body is positioned above the positive Y-axis, the second weight body is positioned above the negative Y-axis;

wherein there are provided;

"distance above positive X-axis measurement means" for measuring a distance between the upper surface of the substrate and either of the weight bodies at a time point when the weight body passes above the positive X-axis;

"distance above negative X-axis measurement means" for measuring the distance between the upper surface of the substrate and either of the weight bodies at a time when the weight body passes above the negative X-axis;

"distance above positive Y-axis measurement means" for measuring the distance between the upper surface of the substrate and either of the weight bodies at a time point when the weight body passes above the positive Y-axis;

"distance above negative Y-axis measurement means" for measuring the distance between the upper surface of the substrate and either of the weight bodies at a time point when the weight body passes above the negative Y-axis;

first difference calculation means for obtaining a difference between the distance measured by the "distance above positive X-axis measurement means" and the distance measured by the "distance above negative X-axis measurement means"; and second difference calculation means for obtaining a difference between the distance measured by the "distance above positive Y-axis measurement means" and the distance measured by the "distance above negative Y-axis measurement means";

thus to detect an angular velocity about the X-axis applied to the substrate on the basis of a difference obtained by the first difference calculation means, and to detect an angular velocity about the Y-axis applied to the substrate on the basis of the difference obtained by the second difference calculation means.

(5) The fifth feature of the present invention resides in an angular velocity sensor according to the fourth feature:

wherein there are further provided, in addition to the first weight body and the second weight body, a third weight body and a fourth weight body which carry out rotational movement in a non-contact state with respect to the upper surface of the substrate with the Z-axis being an axis of rotation; and wherein the first weight body, the second weight body, the third weight body and the fourth weight body are coupled through an intermediate member so that when the first weight body is positioned above the positive X-axis, the second weight body is positioned above the negative X-axis, the third weight body is positioned above the positive Y-axis and the fourth weight body is positioned above the negative Y-axis.

(6) The sixth feature of the present invention resides in an angular velocity sensor according to the second, fourth or fifth feature:

wherein the shapes and masses of the plural weight bodies are the same.

(7) The seventh feature of the present invention resides in an angular velocity sensor according to the first to the sixth features:

wherein a ring-shape structural body to surround the periphery of the Z-axis is prepared to allow the ring-shaped structural body to undergo rotational movement in a non-contact state with respect to the upper surface of the substrate with the Z-axis being an axis of rotation by delivering energy from the energy supply means to the ring-shaped structural body so that a portion of the ring-shaped structural body is considered to be a single weight body which is subject to distance measurement.

(8) The eighth feature of the present invention resides in an angular velocity sensor according to the first to the seventh features:

wherein the rotational movement of the weight body is a continuous rotational movement always having the same rotational direction.

(9) The ninth feature of the present invention resides in an angular velocity sensor according to the eighth feature:

which comprises a pivotal shaft fixed on the upper surface of the substrate in a manner extending along the Z-axis to support the weight body by the pivotal shaft so that the weight body can be moved in the Z-axis direction and a rotational direction with respect to the Z-axis with a predetermined degree of freedom.

(10) The tenth feature of the present invention resides in an angular velocity sensor according to the first to the seventh features:

wherein the weight body carries out a reversal rotational movement such that a rotation in the clockwise direction and a rotation in the counterclockwise direction are alternately repeated.

(11) The eleventh feature of the present invention resides in an angular velocity sensor according to the tenth feature:

wherein there are provided:.

a first weight body carrying out a reversal rotational movement to traverse the positive X-axis;

a second weight body carrying out a reversal rotational movement to traverse the negative X-axis;

a third weight body carrying out a reversal rotational movement to traverse the positive Y-axis; and a fourth weight body carrying out a' reversal rotational movement to traverse the negative Y-axis;

wherein a rotational direction of the reversal rotational movement of the first weight body and the second weight body and a rotational direction of the reversal rotational movement of the third weight body and the fourth weight body are set to be always opposite each other.

(12) The twelfth feature of the present invention resides in an angular velocity sensor according to the tenth or eleventh feature:

wherein a supporting body made of material capable of producing torsion about the Z-axis is secured on the upper surface of the substrate to support the weight body.

(13) The thirteenth feature of the present invention resides in an angular velocity sensor according to the first to the twelfth features:

wherein at least a portion of the weight body is constituted by a dielectric substance; and wherein the energy supply means is constituted by plural electrodes disposed along an orbit of the rotational movement of the weight body and a voltage supply circuit for supplying, to the plural electrodes, a.c. voltages whose phases are different from each other.

(14) The fourteenth feature of the present invention resides in an angular velocity sensor according to the first to the thirteenth features:

wherein means for measuring a distance between the weight body passing above a coordinate axis and the upper surface of the substrate is constituted by a movement electrode formed on a lower surface of the weight body, a fixed electrode formed in the vicinity of the coordinate axis on the upper surface of the substrate, and a detection circuit for detecting an electrostatic capacitance value of a capacitance element constituted by the movement electrode and the fixed electrode.

(15) The fifteenth feature of the present invention resides in an angular velocity sensor according to the fourteenth feature:

wherein there are provided a first fixed electrode and a second fixed electrode which are disposed in a manner adjacent to each other;

wherein there is provided an electrically unitary movement electrode which can be opposed to both the first fixed electrode and the second fixed electrode; and wherein the detection circuit is constituted by a circuit for electrically detecting an electrostatic capacitance value between the first fixed electrode and the second fixed electrode.

(16) The sixteenth feature of the present invention resides in an angular velocity sensor comprising:

a substrate having an upper surface in an XY plane in an XYZ three-dimensional coordinate system;

a weight body for carrying out rotational movement in a non-contact state with respect to the upper surface and a Z-axis perpendicular to the upper surface as an axis of rotation;

energy supply means for delivering energy to the weight body so that the weight body carries out the rotational movement while maintaining a fixed distance with respect to the Z-axis when no external force is applied; and distance measurement means for measuring a distance between the weight body and the Z-axis;

thus to detect an angular velocity about the Z-axis applied to the substrate on the basis of the distance measured by the distance measurement means.

(17) The seventeenth feature of the present invention resides in an angular velocity sensor according to the sixteenth feature:

wherein there are provided a first weight body and a second weight body which carry out the rotational movement in a non-contact state with respect to the upper surface of the substrate around the Z-axis;

wherein the first weight body and the second weight body can be rotated in a state where their phases are shifted relative to each other by 180 degrees so that when the first weight body is positioned above the positive X-axis, the second weight body is positioned above the negative X-axis; and wherein there are provided;

"passing above positive X-axis distance measurement means" for measuring a distance between the Z-axis and either of the weight bodies at a time point when either of the weight bodies passes above the positive X-axis;

"passing above negative X-axis distance measurement means" for measuring a distance between the Z-axis and either of the weight bodies at a time point when either of the weight bodies passes above the negative. X-axis; and calculation means for obtaining a sum of the distance measured by the passing above positive X-axis distance measurement means and the distance measured by the passing above negative X-axis distance measurement means;

thus to detect an angular velocity about the Z-axis applied to the substrate on the basis of the sum obtained by the calculation means.

(18) The eighteenth feature of the present invention resides in an angular velocity sensor according to the seventeenth feature:

wherein the rotational movement of the weight body is a continuous rotational movement always having the same rotational direction.

(19) The nineteenth feature of the present invention resides in an angular velocity sensor according to the eighteenth feature:

wherein the first weight body and the second weight body are coupled by an intermediate member having an expanding or contracting property; and wherein a pivotal shaft fixed on the upper surface of the substrate and extending along the Z-axis is provided to rotatively support the intermediate member.

(20) The twentieth feature of the present invention resides in an angular velocity sensor according to the seventeenth feature:

wherein the weight body carries out a reversal rotational movement such that a rotation in the clockwise direction and a rotation in the counterclockwise direction are alternately repeated.

(21) The twenty-first feature of the present invention resides in an angular velocity sensor according to the twentieth feature:

wherein a supporting body made of material which can produce torsion about the Z-axis is secured on the upper surface of the substrate to support the weight body by the supporting body through an intermediate member having an expanding or contracting property.

(22) The twenty-second feature of the present invention resides in an angular velocity sensor according to the sixteenth to the twenty-first features:

wherein at least a portion of the weight body is constituted with dielectric substance; and wherein the energy supply means is constituted by plural electrodes disposed along an orbit of the rotational movement of the weight body and a voltage supply circuit for supplying, to the plural electrodes, a.c. voltages whose phases are different from each other.

(23) The twenty-third feature of the present invention resides in an angular velocity sensor according to the sixteenth to the twenty-second feature:

wherein distance measurement means for measuring a distance between the weight body and the Z-axis is constituted by a movement electrode formed on a lower surface of the weight body, a fixed electrode formed at a position shifted by a predetermined offset distance toward the inside or the outside relative to a position opposite the movement electrode, and a detection circuit for detecting an electrostatic capacitance value of a capacitance element constituted by the movement electrode and the fixed electrode.

(24) The twenty-fourth feature of the present invention resides in an angular velocity sensor according to the twenty-third feature:

wherein there are provided a first fixed electrode and a second fixed electrode which are disposed adjacent to each other;

wherein there is provided an electrically unitary movement electrode which can be opposed to both the first fixed electrode and the second fixed electrode; and wherein the detection circuit is constituted by a circuit for electrically detecting an electrostatic capacitance value between the first fixed electrode and the second fixed electrode.

BEST MODE FOR CARRYING OUT THE INVENTION

§1 Fundamental Principle of this Invention

Figure 1:
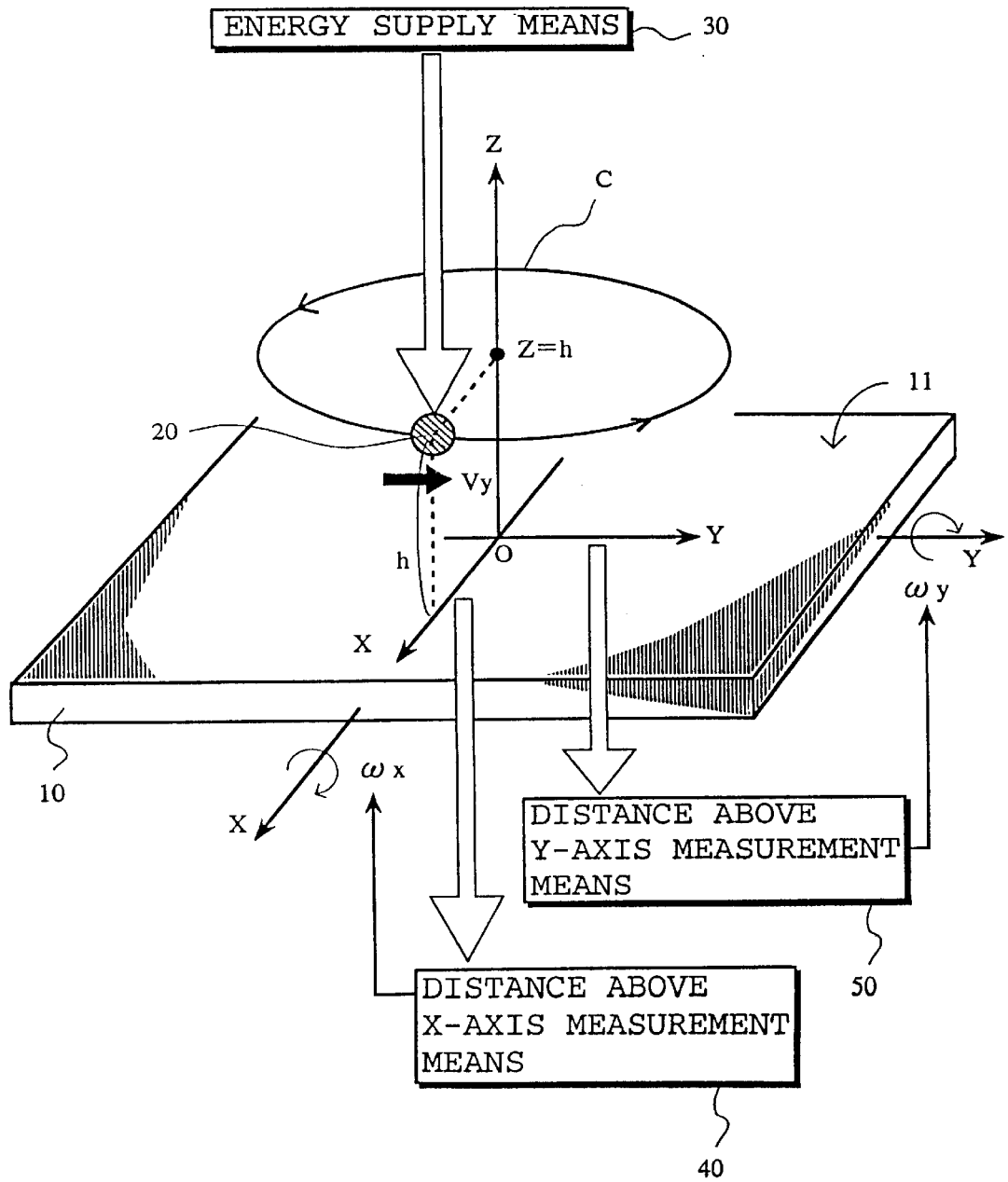
FIG. 1 is a perspective view showing a fundamental configuration of an angular velocity sensor for detecting angular velocity components $\omega x$, $\omega y$ about the X-axis and the Y-axis.

Initially, the fundamental principle of an angular velocity sensor according to this invention will be described with reference to FIG. 1. The angular velocity sensor shown in FIG. 1 has a function to detect angular velocity components ωx, ωy about the X-axis and the Y-axis in the XYZ three-dimensional coordinate system. A substrate 10 has a flat upper surface 11 and functions as a device casing. In this case, the XYZ three-dimensional coordinate system is defined in such a manner that this upper surface 11 is included within the XY plane, wherein the Z-axis extending upwardly from the origin O serves as an axis perpendicular to the upper surface 11. It is now assumed that a weight body 20 having a predetermined mass is prepared so as to allow this weight body 20 to undergo rotational movement along an orbit C with the Z-axis being an axis of rotation. Namely, the weight body 20 carries out rotational movement in non-contact state with respect to the upper surface 11 of the substrate 10. At this time, such an approach is employed to deliver energy for rotational movement from energy supply means 30 to the weight body 20 to allow the weight body 20 to carry out rotational movement while maintaining a fixed distance h relative to the upper surface 11.

While it is a matter of course that, in actual angular velocity sensors, more practical mechanisms for supporting the weight body 20 with respect to the substrate 10, and/or more practical mechanisms for allowing the weight body 20 to carry out rotational movement while maintaining a fixed distance h in the state where the weight body 20 is not in contact with the upper surface 11 are required, explanation will be give in more detail at the chapter §5 and the chapters succeeding thereto in connection with such more practical mechanisms. It is here assumed that there is provided some mechanism such that as long as an additional force (external force) from the external of the system, e.g., Coriolis force or force based on acceleration, etc. is not applied (i.e., as long as the substrate 10 is in the stationary state), it permits the weight body 20 to carry out rotational movement while always maintaining a fixed distance h from the upper surface 11.

This angular velocity sensor further comprises means 40 for measuring distance above the X-axis (hereinafter referred to as "distance above X-axis measurement means" as occasion may demand) which measures a distance between the upper surface 11 and the weight body 20 at a time point when the weight body 20 passes above the X-axis, and means 50 for measuring a distance above the Y-axis (hereinafter referred to as "distance above Y-axis measurement means" as occasion may demand) which measures a distance between the upper surface 11 and the weight body 20 at a time point when the weight body 20 passes above the Y-axis. As described above, in the state where force external of the system is not applied, the weight body 20 keeps rotational movement at a height position of distance h from the upper surface 11 at all times. In other words, the weight body 20 moves along the circular orbit C on the plane indicated by the equation z=h. Accordingly, in this state, a measured value by the distance above X-axis measurement means 40 and a measured value by the distance above Y-axis measurement means 50 both are equal to distance h in the steady state.

However, in the case where the entirety of this system is caused to undergo rotational motion (movement) at an angular velocity ωx about the X-axis or an angular velocity ωy about the Y-axis, in other words, in the case where an angular velocity ωx or ωy is applied to the substrate 10, a Coriolis force based on this angular velocity is applied to the weigh body 20, so motion (movement) of the weight body 20 deviates from the primary circular orbit C.

Figure 2:
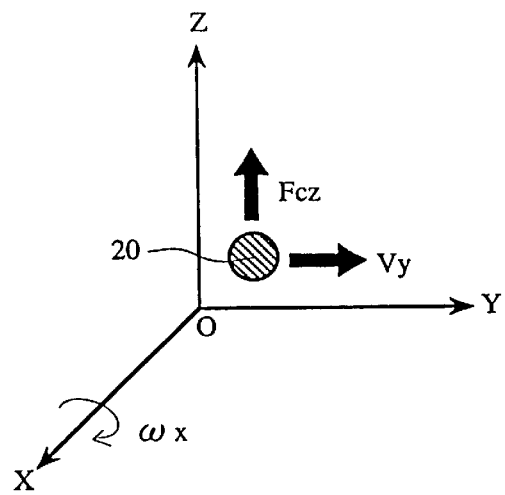
FIG. 2 is a perspective view showing a principle that Coriolis force is produced in the case when an angular velocity is applied to the moving object.

The relationship between an angular velocity and a Coriolis force applied to a moving object will now be briefly described with reference to FIG. 2. Let us now consider the case where the weight body 20 having predetermined mass m is moving at a predetermined velocity Vy in the Y-axis direction in the XYZ three-dimensional coordinate system as shown in FIG. 2. At this time, when the entirety of this coordinate system is assumed to be rotated at an angular velocity ωx about the X-axis, motion of the weight body 20 within this coordinate system can be dealt as a motion under the state where an external force Fcz in the Z-axis direction is applied. This external force Fcz is an apparent force appearing within this system, and is called the Coriolis force. This Coriolis force is defined by the following equation.

$$Fcz=2\cdot m\cdot Vy\cdot \omega x.$$

In the example shown in FIG. 2, the orbit (deflected) of the weight body 20 moving in the Y-axis direction is curved in the Z-axis direction by the action of this Coriolis force Fcz.

Figure 3:
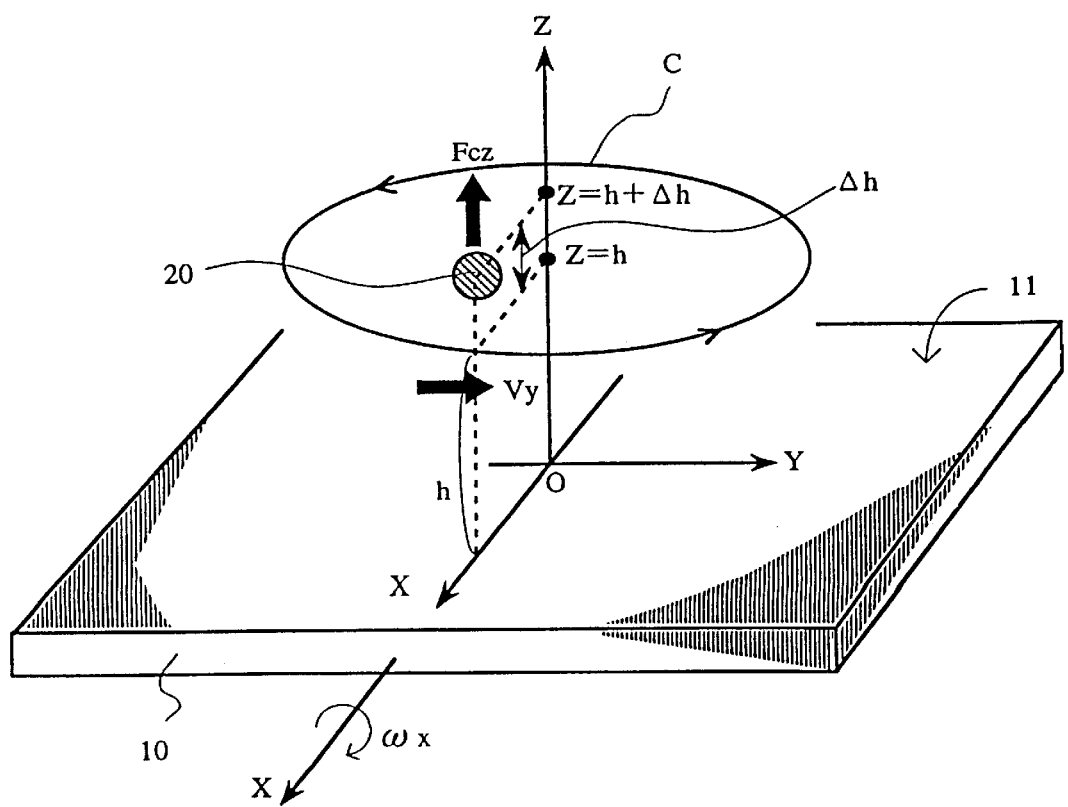
FIG. 3 is a perspective view for explaining an operation of the angular velocity sensor shown in FIG. 1.

In view of the above, let us now consider the action of the Coriolis force with respect to the weight body 20 in the case where an angular velocity ωx about the X-axis is applied to the entirety of the system shown in FIG. 1. As shown in FIG. 3, the weight body 20 has velocity component Vy in the Y-axis direction which is tangential of the circular orbit C at a moment when it passes above the X-axis. Accordingly, in the case where an angular velocity ωx about the X-axis is applied to the entirety of the system at this moment, Coriolis force Fcz is applied in the Z-axis direction. Energy supply means 30 supplies energy for allowing the weight body 20 to carry out rotational movement along the original circular orbit C (the scheduled orbit when angular velocity ωx=0). However, when Coriolis force Fcz in the Z-axis direction is applied to the weigh body 20, it deviates by Δh in the Z-axis direction from the original circular orbit C, so it passes through the point (position) spaced by the distance h+Δh from the upper surface 11 of the substrate. The spacing Δh from the original circular orbit C becomes a value related to the applied Coriolis force Fcz. As previously described, since the magnitude of this Coriolis force Fcz is defined by the following equation, $$Fcz=2\cdot m\cdot Yy\cdot \omega x,$$

if mass m and moving velocity Vy of the weight body 20 are fixed (caused to be constant), the Coriolis force Fcz takes a value proportional to an angular velocity ωx. Eventually, a spacing Δh from the original circular orbit C at a time point when the weight body 20 passes above the X-axis can be used as a value indicating an angular velocity ωx. Moreover, since h is constant, if distance h+Δh between the weight body and the upper surface 11 of the substrate can be measured, a value of an angular velocity ωx can be obtained.

The angular velocity sensor shown in FIG. 1 has a function to detect an angular velocity ωx about the X-axis and an angular velocity ωy about the Y-axis on the basis of such a principle. Namely, when the substrate 10 as a sensor casing is attached to an object to be measured and energy is delivered to the weight body 20 from the energy supply means 30, the weight body 20 carries out rotational motion (movement) along the circular orbit C. In this state, a measured value of distance between the upper surface 11 of the substrate and the weight body 20 when the weight body 20 passes above the X-axis is outputted by the "distance above X-axis measurement means 40", and a measured value of distance between the upper surface 11 of the substrate and the weight body 20 when the weight body 20 passes above the Y-axis is outputted by the "distance above Y-axis measurement means 50". Accordingly, an output of the "distance above X-axis measurement means 40" takes a value indicating an angular velocity ωx about the X-axis of the substrate 10 (i.e., an angular velocity ωx of the object to be measured), and an output of the "distance above Y-axis measurement means 50" takes a value indicating an angular velocity ωy about the Y-axis of the substrate 10 (i.e., an angular velocity ωy of the object to be measured).

In the case where an angular velocity in opposite direction is applied, the direction of the Coriolis force produced is reversed and the sign of spacing (distance) Δh from the circuit orbit C is inverted. Accordingly, it is possible to recognize the direction of the applied angular velocity in dependency upon whether distance h between the weight body 20 and the upper surface 11 of the substrate is increased or decreased.

§Cancellation of Acceleration Component

In the case where consideration is made in connection with an environment where an angular velocity sensor is actually used, the environment in which only pure angular velocity is applied is very rare. Ordinarily, there are many instances where such an angular velocity sensor is used under the environment in which both acceleration and angular velocity are applied. In the premise that the angular velocity sensor is used under such a general environment, a function to precisely detect only the angular velocity without influence of acceleration is required.

The angular velocity sensor described in the previous chapter §1 cannot carry out precise detection of angular velocity under the environment where acceleration is also applied. Namely, in FIG. 3, in the environment where only angular velocity ωx is applied, distance (spacing) Δh becomes a quantity based on only Coriolis force Fcz which is proportional to an angular velocity ωx, and a measured value of Δh becomes a quantity indicating an angular velocity ωx. However, in the case where an acceleration αZ in the Z-axis direction is applied to the entirety of this system, force Faz based on the acceleration αZ is applied to the weight body 20. Thus, the spacing (distance) Δh becomes a quantity determined by both of the Coriolis force Fcz proportional to the angular velocity ωx and the force Faz based on the acceleration αZ. For this reason, the acceleration component is included in the measured value of Δh. Thus, a precise angular velocity ωx cannot be determined.

As a matter of course, a general acceleration sensor may be used in combination along with the angular velocity sensor described in chapter §1 in order to carry out correction with respect to a detected value of the angular velocity sensor by a detected value of acceleration by this acceleration sensor thus to cancel the acceleration component. However, the device would necessarily become complicated on the premise that the angular velocity sensor is always used in combination with the acceleration sensor. This is not preferable in view of miniaturization and reduction in cost of the device. While the angular velocity sensor described in this chapter §2 essentially employs the principle of the angular velocity sensor described in chapter §1, this sensor can easily obtain a precise detection value in which the acceleration component is canceled.

Figure 4:
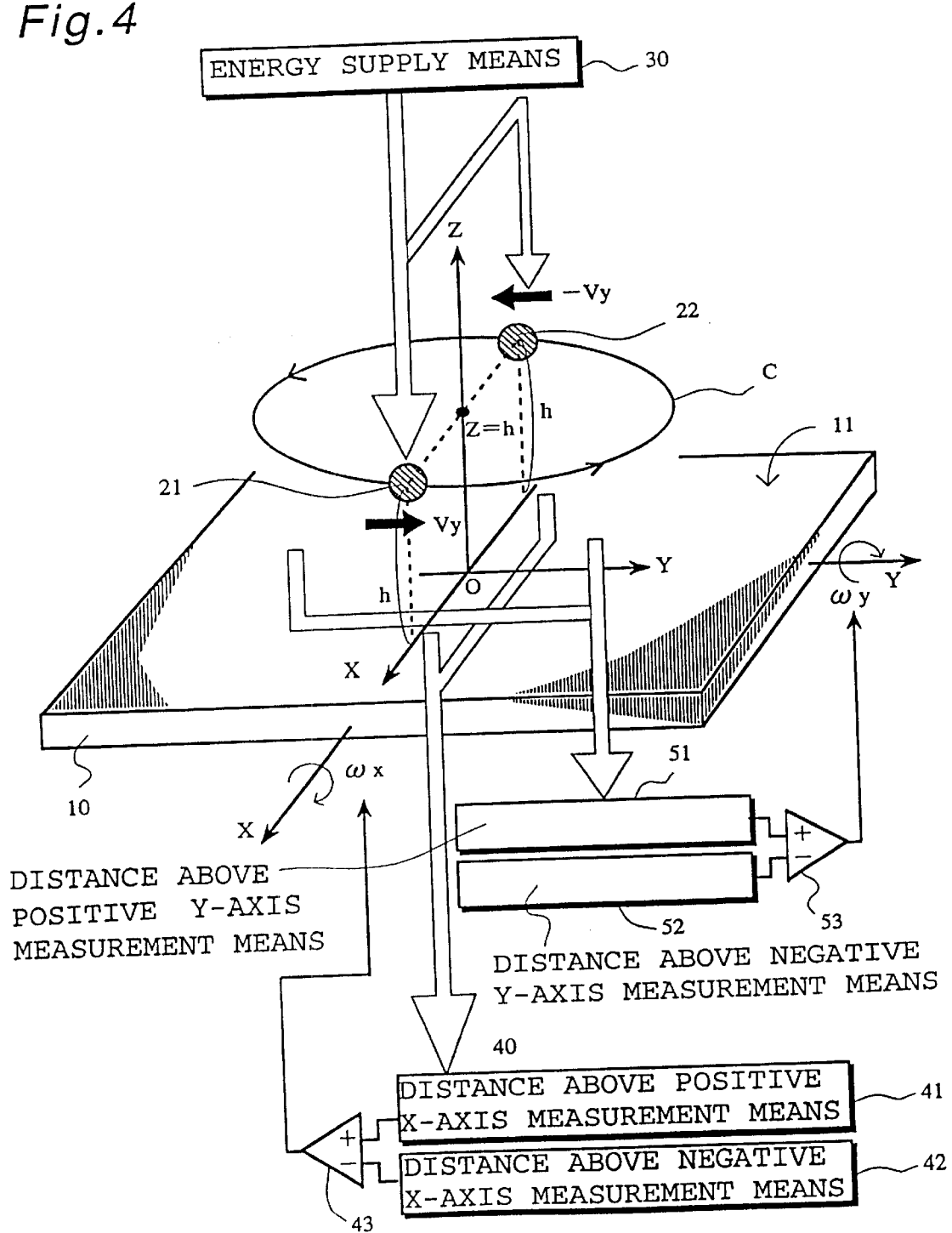
FIG. 4 is a perspective view showing a fundamental configuration of an angular velocity sensor for detecting angular velocity components $\omega x$, $\omega y$ about the X-axis and the Y-axis while canceling the component of acceleration under the environment where acceleration is applied.

The fundamental configuration of the angular velocity sensor having a function to cancel the acceleration component is shown in FIG. 4. The feature of this sensor resides in that a pair of weight bodies 21, 22 are provided on the orbit C. Both the weight bodies are also supplied with energy from the energy supply means 30 to carry out rotational motion (movement) in the non-contact state with respect to the upper surface 11 of the substrate 10 with the Z-axis being an axis of rotation. It is to be noted that the first weight body and the second weight body carry out rotational motion in the state where their phases are shifted relative to each other by 180 degrees so that when the first weight body 21 is positioned above the positive X-axis, the second weight body 22 is positioned above the negative X-axis as shown in the Figure. Accordingly, when the first weight body 21 is positioned above the positive Y-axis, the second weight body 22 is positioned above the negative Y-axis.

Moreover, in this angular velocity sensor, there are provided four sets of distance measurement means. Namely, "distance above positive X-axis measurement means 41" has a function to measure a distance between the upper surface 11 and either one of the weight bodies at a time point when the weight body passes above the positive X-axis (the point where the first weight body 21 exists in FIG. 4), and "distance above negative X-axis measurement means 42" has a fiction to measure a distance between the upper surface 11 and either one of the weight bodies at a time point when the weight body passes above the negative X-axis (the point where the second weight body 22 exists in FIG. 4). Further, "distance above positive Y-axis measurement means 51" has a function to measure a distance between the upper surface 11 and either one of the weight bodies at a time point when the weight body passes above the positive Y-axis, and "distance above negative Y-axis measurement means 52" has a function to measure a distance between the upper surface 11 and either one of the weight bodies at a time point when the weight body passes above the negative Y-axis.

Further, this angular velocity sensor comprises first difference calculation means 43 for determining difference between a distance measured by the "distance above X-axis measurement means 41" and a distance measured by the "distance above negative X-axis measurement means 42", and second difference calculation means 53 for determining difference between a distance measured by the "distance above positive Y-axis measurement means 51" and a distance measured by the "distance above negative Y-axis measurement means 52". Ultimately, an angular velocity $\omega x$ about the X-axis and an angular velocity $\omega y$ about the Y-axis are detected on the basis of outputs of these difference calculation means 43, 53.

Figure 5:
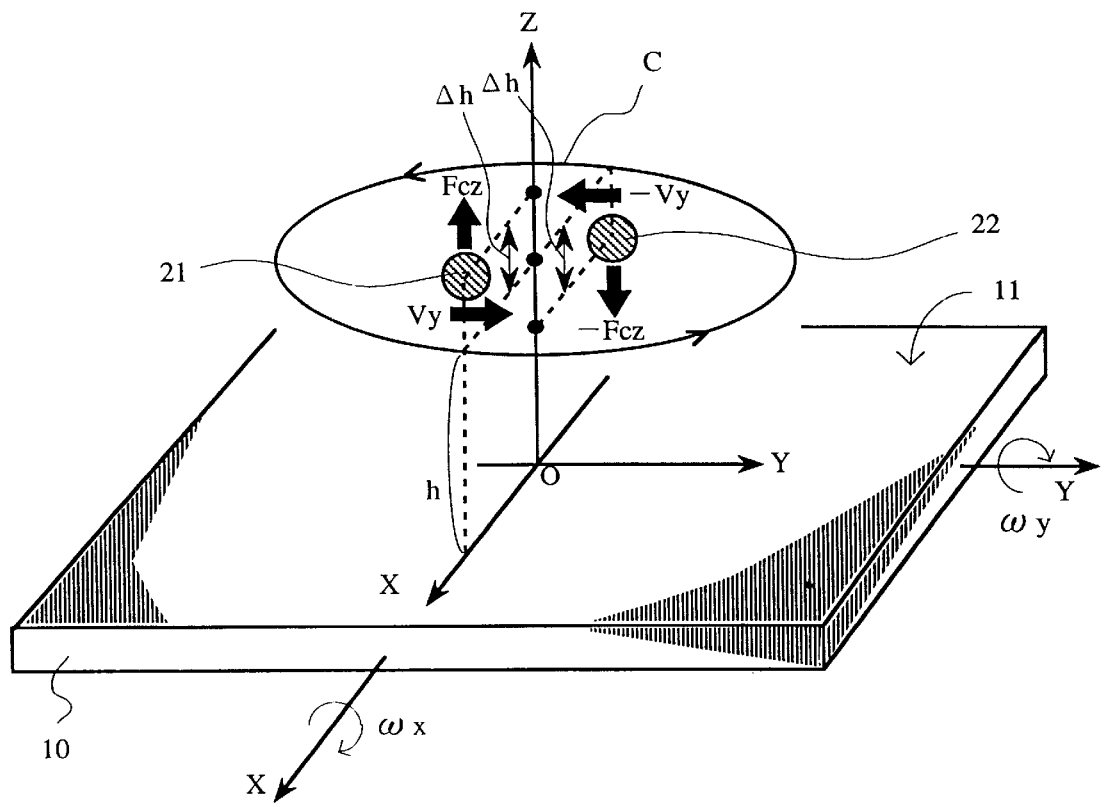
FIG. 5 is a perspective view for explaining an operation of the angular velocity sensor shown in FIG. 4.

Subsequently, the detection principle in this angular velocity sensor and the reason why the acceleration component is canceled in this sensor will be described. Let us now consider the state where energy is supplied from the energy supply means 30 so that a pair of weight bodies 21, 22 carry out rotational motion (movement) in the state where their phases are shifted relative to each other by 180 degrees on the circular orbit C included within the plane indicated by the equation Z=h as illustrated in FIG. 4. In this state, the first weight body 21 passes above the positive X-axis at a velocity Vy in the Y-axis positive direction, and the second weight body 22 passes above the negative X-axis at a velocity $-$Vy in the Y-axis negative direction simultaneously therewith. At this time, if an angular velocity $\omega x$ about the X-axis is applied to the entirety of this system, Coriolis force Fcz in the Z-axis positive direction is applied to the first weight body 21 as shown in FIG. 5. As a result, the first weight body 21 deviates upwardly from the original circular orbit C. On the other hand, Coriolis force $-$Fcz in the Z-axis negative direction is applied to the second weight body 22. As a result, the second weight body 22 deviates downwardly from the original circular orbit C.

It is now assumed that the first weight body 21 and the second weight body 22 have exactly the same shape and exactly have the same mass. In this case, since both the weight bodies carry out rotational motion (movement) while maintaining phase difference of 180 degrees therebetween at all times, they are the same also in absolute values of velocities of the rotational motions (movements). Accordingly, absolute values of Coriolis forces applied to both the weight bodies are the same. Therefore, when the first weight body 21 deviates upwardly from the circular orbit C by $\Delta h$ and passes through the position spaced by distance h+$\Delta h$ from the upper surface 11 of the substrate, the second weight body 22 deviates downwardly from the circular orbit C by $\Delta h$ and passes through the position spaced by distance h$-\Delta h$ from the upper surface 11 of the substrate. Accordingly, an output of the "distance above positive X-axis measurement means 41" becomes equal to h+$\Delta h$, and an output of the "distance above the negative X-axis measurement means 42" becomes equal to h$-\Delta h$. Eventually, a value 2·$\Delta h$ which is the difference therebetween is outputted from the difference calculation means 43. This difference 2·$\Delta h$ indicates a magnitude of an applied Coriolis force Fcz ($-$Fcz) which corresponds to a magnitude of an angular velocity $\omega x$ about the X-axis. In the case where a direction of an applied angular velocity $\omega x$ is opposite to the above, a direction of the Coriolis force is inverted. As a result, an output from the difference calculation means 43 becomes equal to $-$2·$\Delta h$. Accordingly, the sign of an output signal obtained from the difference calculation means 43 indicates a direction of an angular velocity $\omega x$, and a magnitude of the output signal indicates a magnitude of the angular velocity $\omega x$.

In this sensor, even if acceleration is applied to the entirety of the system, the applied acceleration has no influence on the detection result. Namely, even if any acceleration component is applied to the entirety of the system, force base on the acceleration component is applied to both the first weight body 21 and the second weight body 22. Accordingly, they are canceled at the stage where difference therebetween is taken. For example, in the example shown in FIG. 5, it is assumed that because acceleration $\alpha z$ in the Z-axis direction is applied, both the weight bodies are caused to further undergo displacement by $\Delta k$ in the Z-axis positive direction resulting from the force Faz based on the acceleration $\alpha z$. Therefore, an output of the "distance above positive X-axis measurement means 41" becomes equal to h+$\Delta h$+$\Delta k$, and an output of the "distance above negative X-axis measurement means 42" becomes equal to h$-$h+$\Delta k$. As a result, difference outputted from the difference calculation means 43 remains to be 2$-\Delta h$. Namely, the influence of acceleration $\alpha z$ is canceled by taking the difference.

As described above, by using a pair of weight bodies which carry out rotational motion (movement) in the state where their phase are shifted relative to each other by 180 degrees, it is possible t cancel the acceleration component.

In the above described example, an operation for detecting an angular velocity $\omega x$ about the X-axis has been explained by using the "distance above positive X-axis measurement means 41", the "distance above negative X-axis measurement means 42", and the difference calculation means 43 for taking difference between the outputs of both the measurement means. However, it is to be noted that if the "distance above positive Y-axis measurement means 51", the "distance above negative Y-axis measurement means 52", and difference calculation means 53 for taking difference between the outputs of both the measurement means are used, it is possible to detect an angular velocity $\omega y$ about the Y-axis on the basis of exactly the same principle. As stated above, according to this embodiment, an angular velocity $\omega x$ about the X-axis is detected at a moment when both the weight bodies 21 and 22 pass above the positive and the negative X-axis, and an angular velocity $\omega y$ about the Y-axis is detected at a moment when both the weight bodies 21 and 22 pass above the positive and the negative Y-axis so that it is possible to alternately detect angular velocity components ωx, ωy. In addition, this detection period can be adjusted by the rotational speeds of the weight bodies 21, 22.

§3 Configuration of Rotor by Weight Body

In the above-described chapter §2, the technique has been described for allowing a pair of weight bodies to undergo rotational motion (movement) in the state where their phases are shifted relative to each other by 180 degrees. While this pair of weight bodies may be constituted by respectively independent bodies in principle, it is preferable from a viewpoint of practical use to prepare a pair of weight bodies as a single structural body. In addition, while the acceleration component can be canceled by using at least two weight bodies, it is preferable from a viewpoint of practical use to use a larger number of weight bodies.

Figure 6:
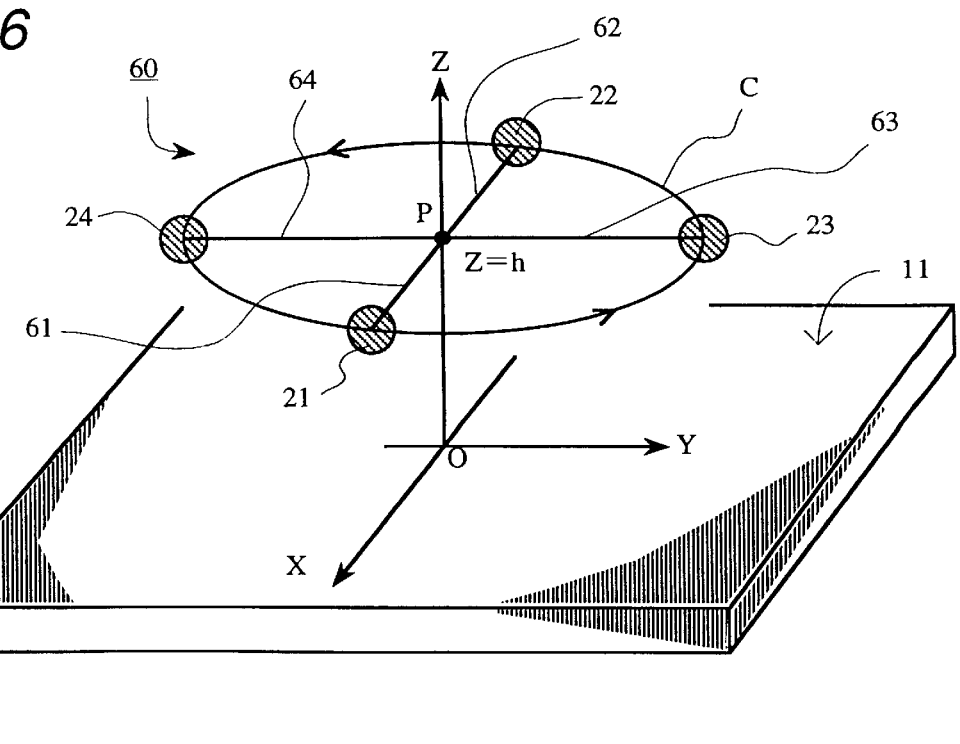
FIG. 6 is a perspective view showing a modified example of the angular velocity sensor shown in FIG. 4.

In this chapter let us demonstrate the embodiment in which plural weight bodies are coupled to each other to thereby form a rotor. The embodiment shown in FIG. 6 is directed to the example in which four weight bodies 21, 22, 23, 24 are coup ed through arms 61, 62, 63, 64 to thereby form a rotor 60. The four arms 61 to 64 are disposed in the plane of Z=h and are coupled at a point P in the state where angles of 90 degrees are held therebetween. The weight bodies 21 to 24 are respectively coupled to the outside end portions of the respective arms 61 to 64. If such a rotor 60 is caused to be rotated with the point P being as a central point, the four weight bodies 21 to 24 are caused to carry out rotational motion (movement) on the circular orbit C with phase differences of 90 degrees therebetween. Since the four weight bodies 21 to 24 are disposed with phase differences of 90 degrees therebetween as stated above, when the first weight body 21 is located above the positive X-axis, the second weight body 22 is positioned above the negative X-axis, the third weight body 23 is positioned above the positive Y-axis, and the fourth weight body 24 is positioned above the negative Y-axis as in the state shown. Accordingly, if such an approach is employed to measure distances between the respective weight bodies and the upper surface 11 of the substrate at this particular moment, it is possible to detect an angular velocity ωx about the X-axis on the basis of measured result in regard to the first weight body 21 and the second weight body 22, and it is possible to detect, at the same time, an angular velocity ωy about the Y-axis on the basis of measured result in regard to the third weight body 23 and the fourth weight body 24.

In order to carry out such detection, the central point P of the rotor 60 must be supported at a predetermined position on the Z-axis. In that case, a device satisfying the following two conditions is required. The first condition is the condition where the respective weight bodies 21 to 24 are permitted to undergo rotational movement with the Z-axis being an axis of rotation. In order to realize the fundamental principle of this invention to detect the Coriolis force applied to the weight body subject to rotational movement the above-mentioned condition is indispensable. In addition, the second condition is the condition where the respective weight bodies 21 to 24 are permitted to undergo movement with a predetermined degree of freedom in the Z-axis direction. In order to detect the Coriolis force as a change of distance from the upper surface 11 of the substrate, it is indispensable to employ a configuration such that the respective weight bodies can be moved within a necessary range in the Z-axis direction.

Figure 7:
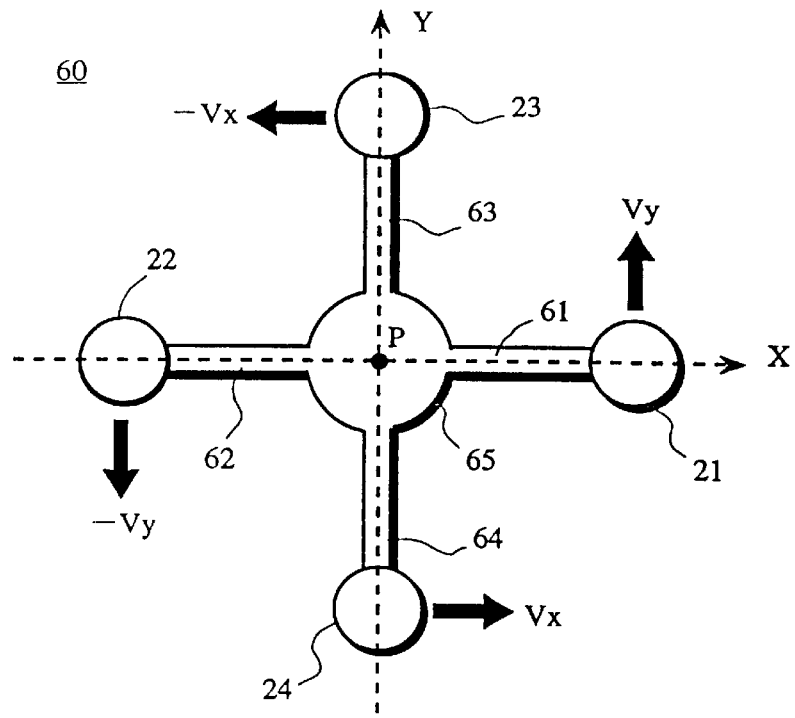
FIG. 7 is a plan view showing an example of a practical structure of a rotor portion of the angular velocity sensor shown in FIG. 6.

FIG. 7 is a plan view showing a more practical configuration of the rotor 60 shown in FIG. 6. Four weight bodies 21 to 24 are connected to the outside end portions of the four arms 61 to 64, and the inside end portions of the four arms 61 to 64 are connected to a central member 65 disposed in the vicinity of the central point P. The rotor 60 has rigidity as a whole, and is rotated as indicated by arrows in the figure with the central point P as a center.

At the moment shown, the first weight body 21 passes through the positive X-axis-at a velocity Vy in the Y-axis positive direction and the second weight body 22 passes through the negative X-axis at a velocity -Vy in the Y-axis negative direction. Accordingly, in the environment where an angular velocity ωx about the X-axis is applied, Coriolis force Fcz in the Z-axis positive direction is applied to the first weight body 21, and Coriolis force -Fcz in the Z-axis negative direction is applied to the second weight body 22. Thus, an angular velocity ωx is detected as the difference therebetween. Similarly, since the third weight body 23 passes through the positive Y-axis at a velocity -Vx in the X-axis negative direction and the fourth weight body 24 passes through the negative Y-axis at a velocity Vx in the X-axis positive direction, Coriolis forces in directions opposite to each other are respectively applied to the third weight body 23 and the fourth weight body 24 in the environment where an angular velocity ωy about the Y-axis is applied. Thus, an angular velocity ωy is detected as the difference therebetween.

As previously explained in chapter §2, by taking difference it is possible to cancel the influence of acceleration. Moreover, in dependency upon the action of an angular velocity ωx, any Coriolis force is not produced with respect to the third weight body 23 and the fourth weight body 24 because they have a velocity component in the X-axis direction. Similarly, in dependency upon the action of an angular velocity ωy, any Coriolis force is not produced with respect to the first weight body 21 and the second weight body 22 because they have a velocity component in the Y-axis direction. Accordingly, also in the environment where both the angular velocity ωx about the X-axis and the angular velocity ωy about the Y-axis are applied, it is possible to respectively independently detect both the angular velocity components at the same time. There is no possibility that interference takes place therebetween.

In the case where an angular velocity ωz about the Z-axis is applied, the sensor according to this invention cannot detect this angular velocity ωz itself. However, there is no possibility that the detection result of angular velocity ωx or angular velocity ωy is affected by the existence of the angular velocity ωz. Even if, e.g., Coriolis force Fcx toward the X-axis positive direction is applied to the first weight body 21 resulting from the angular velocity ωz, as Coriolis force -Fcx toward the X-axis negative direction is applied to the second weight body 22, the influence of these Coriolis forces would be canceled as the entirety of the rotor 60.

Figure 8:
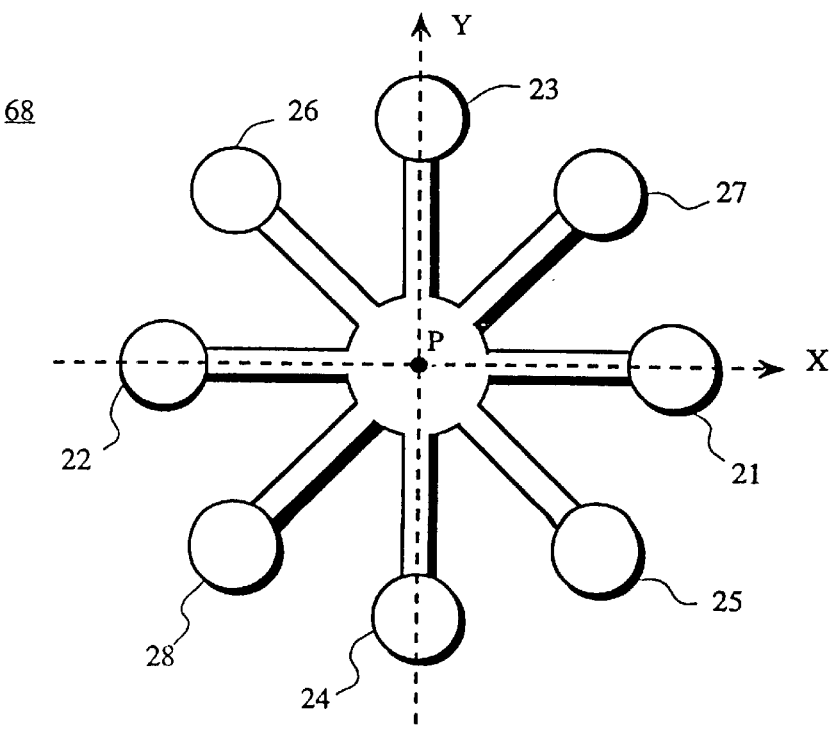
FIG. 8 is a plan view showing a modified example of the rotor shown in FIG. 7.

As stated above, if the rotor 60 shown in FIG. 7 is used, detection values of both the angular velocity ωx about the X-axis and the angular velocity ωy about the Y-axis can be obtained at every period when the rotor 60 is rotated by 90 degrees. In order to shorten this detection period, it is sufficient to increase the rotational speed of the rotor 60, or it is also sufficient to increase the number of weight bodies. For example, FIG. 8 is a plan view of a rotor 68 including eight weight bodies 21 to 28. If such a rotor 68 is used, it is possible to obtain detection values of both the angular velocity ωx about the X-axis and the angular velocity ωy about the Y-axis at every period when the rotor 68 is rotated by 45 degrees. When the rotor 68 is used, as compared to the case where the rotor 60 shown in FIG. 7 is used, the detection period can be reduced to one half even if the rotational speed is the same.

It is to be noted that in the case where plural weight bodies are use to form a rotor, it is preferable that shapes and masses of individual weight bodies are caused to be the same. While it is a matter of course that even if plural weigh bodies having shapes or masses different from each other are used, this invention can be realized. Such a method is not practical because of the necessity of carrying out a correction operation (calculation) in which mass or moment is taken into consideration for the purpose of canceling the acceleration component.

Figure 9:
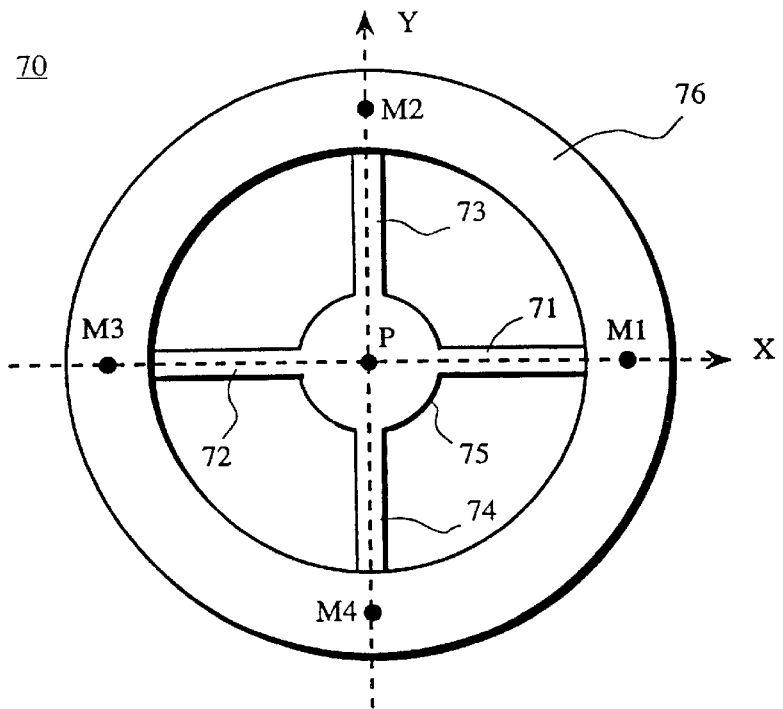
FIG. 9 is a plan view showing a further different modified example of the rotor shown in FIG. 7.

Rotor 70 shown in FIG. 9 is composed of four arms 71 to 74, a central member 75 connected to their inside end portions, and a ring-shaped structural body 76 connected to their outside end portions. If the central point P is supported on the Z-axis and the ring-shaped structural body 76 is caused to undergo rotational motion (movement) in the non-contact state with respect to the upper surface 11 of the substrate with the Z-axis being an axis of rotation by utilizing energy delivered from the energy supply means 30, the ring-shaped structural body 76 functions as a large number of weight bodies. Namely, if a portion of this ring-shaped structural body 76 is considered to be a single weight body to allow it to be subject to distance measurement, angular velocity detection based on the above-described principle can be made. If, e.g., as shown in FIG. 9, mass points M1 to M4 are defined on the ring-shaped structural body 76 to assume these mass points to be respectively the weight bodies 21 to 24, this rotor 70 is equivalent to the rotor 60 shown in FIG. 7.

Since the rotor 70 has the ring-shaped structural body 76 which functions as a rotor having an infinite number of weight bodies in principle, the detection period of the angular velocity can be educed to zero. Thus, in point of time, continuous detection values can be obtained.

§4 Reversal Rotational Motion of Rotor

In all the examples which have been described until now, a set of weight bodies or a rotor is always moved in the same rotational direction as the aggregate. For example, in the example using the rotor 60 shown in FIG. 7, the entirety of the rotor 60 is rotated "in the counterclockwise direction" with the point P being the central point. There is no change in the counterclockwise rotational direction. Thus, continuous rotational motion is carried out.

However, in accordance with the fundamental principle of this invention, it is only required that such a movement that the weight body traverses above the X-axis or the Y-axis with a velocity component perpendicular to the axis is repeatedly executed. Namely, it is not necessarily required to allow the weight body to continuously undergo rotational motion (movement).

Figure 10:
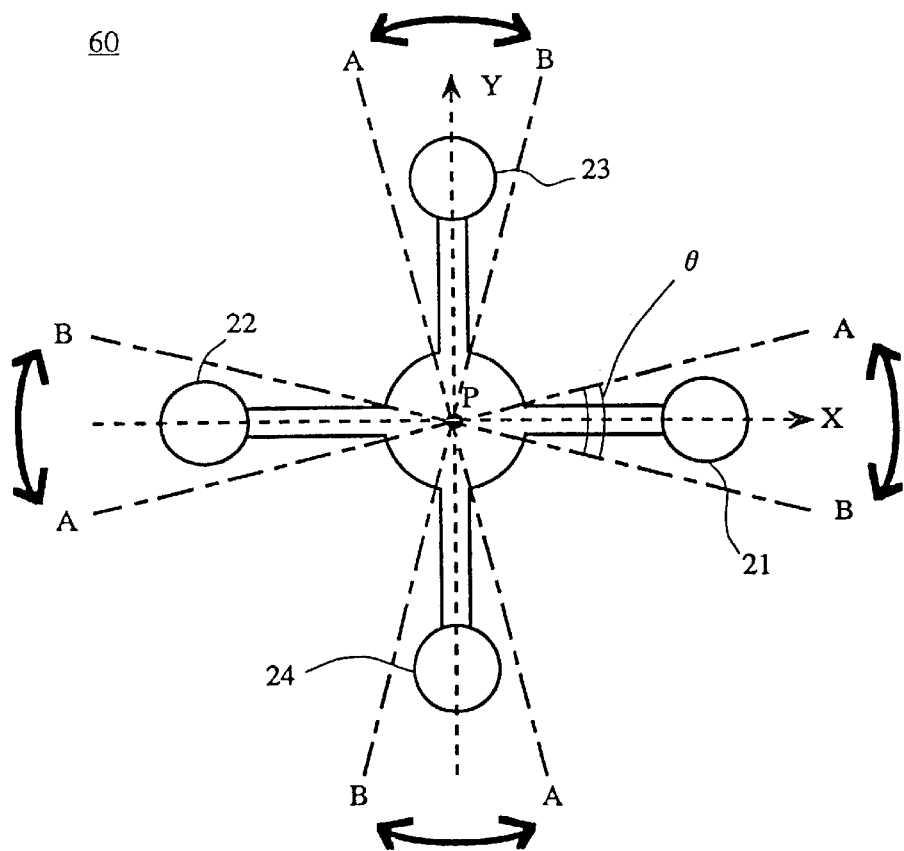
FIG. 10 is a plan view showing an operation mode for allowing the rotor shown in FIG. 7 to undergo reversal rotational movement (oscillating motion).

For example, even if the rotor 60 is caused to undergo reversible rotational motion as shown in FIG. 10, the angular velocity detection based on the fundamental principle of this invention can be made. In this case, the reversal rotational motion refers to particular movements for alternately repeating rotation in the clockwise direction and rotation in the counterclockwise direction. In the example shown in FIG. 10, rotational motion of the first half period (rotational motion in the clockwise direction) for moving respective weight bodies 21 to 24 from the position A to the position B and rotational motion of the second half period (rotational motion in the counterclockwise direction) for moving them from the position B to the position A in a manner opposite the above are alternately repeatedly executed. Since the X-axis or the Y-axis is positioned between the positions A and B, the respective weight body traverses above the X-axis or the Y-axis with a velocity component perpendicular to the axis in both the first half period and the second half period. In short, the respective weight bodies repeat reciprocating motion along an orbit having a circular arc shape. In other words, the respective weight bodies carry out oscillatory motion along such a circular arc to traverse the respective axes. Particularly, if they are caused to be oscillated at their own resonant frequency, efficient reciprocating motion can be made.

It is to be noted that in the case where such a reversal or reciprocating rotational operation is caused to be carried out, it is necessary to draw attention to the fact that the sign of detection value is inverted when the reciprocating rotational motion shifts from the first half period to the second half period. Namely, detection values obtained when the weight body traverses above respective axes in the first half period moving from the position A to the position B and detection values obtained when the weight body traverses above respective axes in the second period moving from the position B to the position A are inverted in their sign because the direction of applied Coriolis force is reversed. For this reason, with respect to, e.g., a detection value obtained in the second half period, a processing for inverting sign is required.

As described above, "rotational motion (movement)" in this specification is used as a broad concept including both "continuous rotational motion (movement)" where the rotational direction is always fixed and "reversal (reciprocating) rotational motion (movement) or oscillation" where the rotational direction is periodically reversed. In addition, it is not also required that a rotational angle with respect to the center point changes over the entire range of 360 degrees. It is sufficient that, as shown in FIG. 10, the rotor is caused to be rotated only by predetermined angle θ corresponding to distance between the positions A and B defined at both the sides of the X-axis or the Y-axis.

The merit that the rotor is caused to undergo reversal (reciprocating) rotational motion without allowing it to undergo continuous rotational motion resides in that the supporting mechanism of the rotor is simplified as in the embodiment of chapter §8 which will be described later. Namely, in the case of the reversal (reciprocating) rotational motion, it is sufficient to rotate the rotor by angle θ shown in FIG. 10 without necessity of rotating the rotor by 360 degrees. Accordingly, it is sufficient to fix the rotor on the substrate in such a form to produce torsion by angle θ about the Z-axis. In short, it becomes possible to employ a simple structure in which supporting body consisting of material capable of producing torsion about the Z-axis is fixed on the substrate to support the rotor (weight body) by this supporting body.

It is to be noted that in the case where such simple structure is employed, oscillation by the reversal (reciprocating) rotational motion of the rotor is propagated from the substrate to th device casing through the supporting body. Namely, since the entirety of the rotor is rotated in the clockwise direction in the first half period, this clockwise rotational element (component) is propagated to the casing, and since the entirety of the rotor is rotated in the counterclockwise direction in the second half period, this counterclockwise rotational element (component) is also propagated to the casing. It is not preferable from implementation of precise detection that the oscillatory component of the rotor leaks into the device casing as stated above. For example, when the device casing is touched by hand, it affects the reversal (reciprocating) rotational motion of the rotor. In addition, detection result is affected also by attachment form of the device casing with respect to object to be measured.

Figure 11:
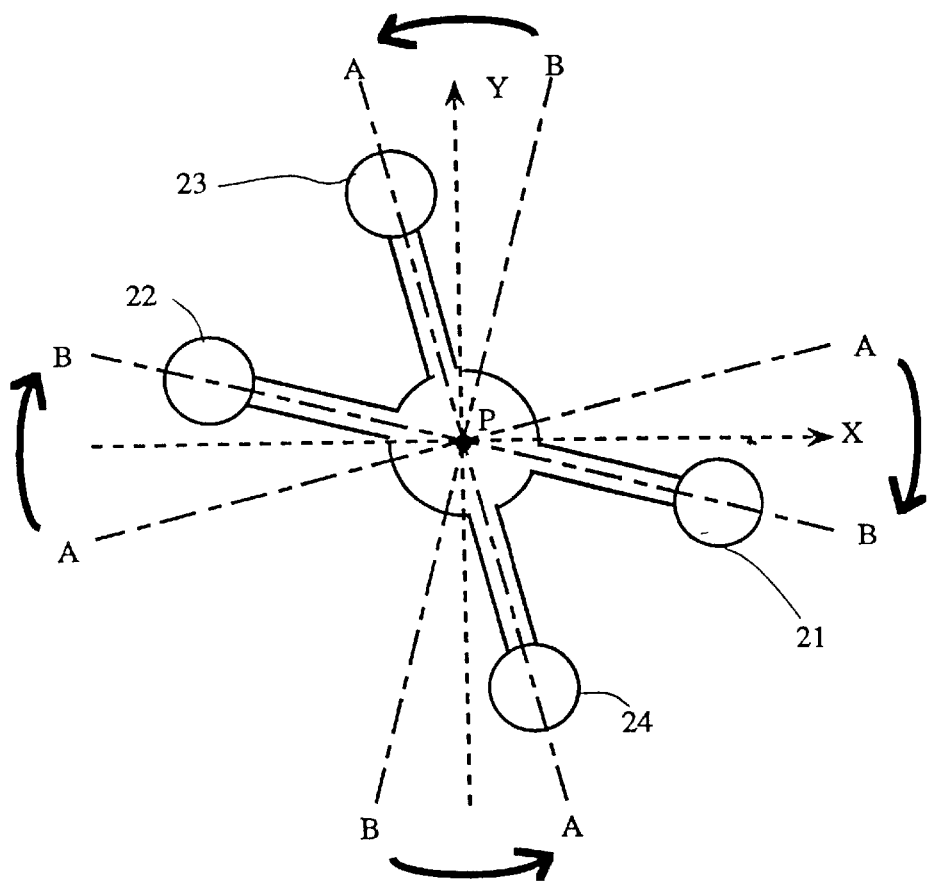
FIG. 11 is a plan view showing a first operation mode for allowing the rotor shown in FIG. 7 to undergo reversal rotational movement by a method of canceling a rotational oscillatory component.
Figure 12:
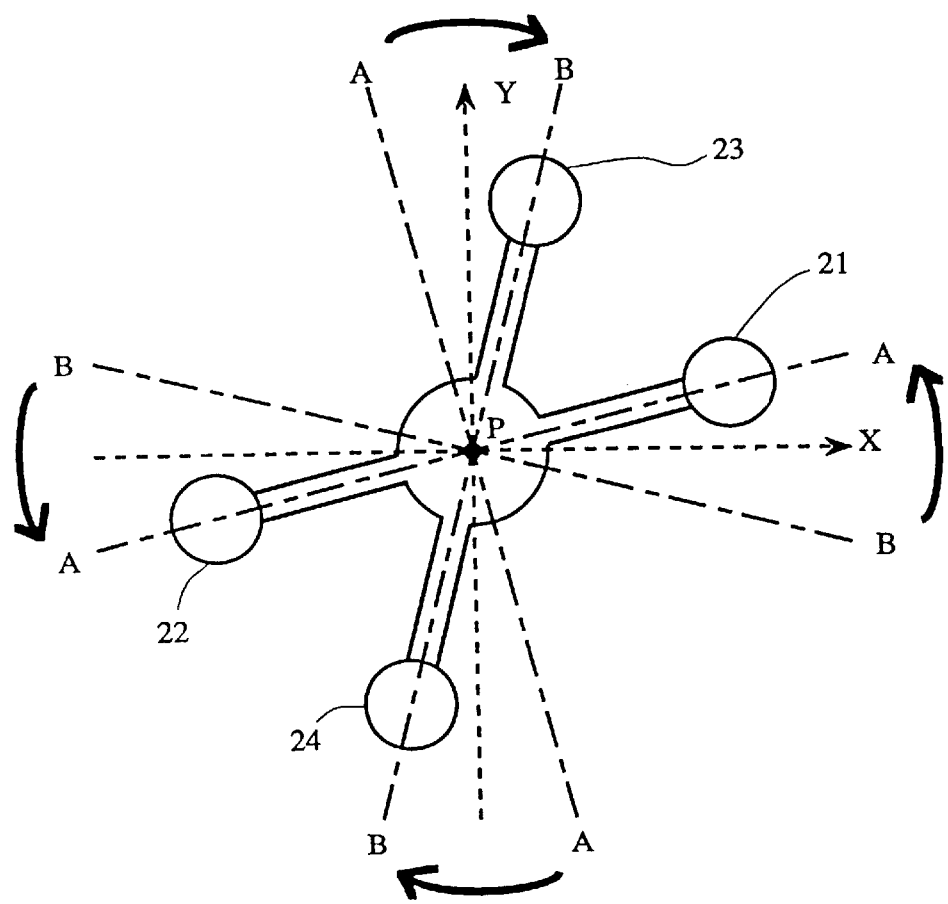
FIG. 12 is a plan view showing a second operation mode for allowing the rotor shown in FIG. 7 to undergo reversal rotational movement by a method of canceling a rotational oscillatory component.

In order to prevent such oscillatory leakage, it is sufficient to carry out reversal (reciprocating) rotational motion in such a form that clockwise rotation and counterclockwise rotation are canceled with each other. In more practical sense, in the first half period, as shown in FIG. 11, the first weight body 21 and the second weight body 22 (weight bodies traversing the X-axis) are caused to undergo rotational motion in the clockwise direction from the position A toward the position B, and the third weight body 23 and the fourth weight body 24 (weight bodies traversing the Y-axis) are caused to undergo rotational motion in the counterclockwise direction from the position B toward the position A. Then in the second half period, as shown in FIG. 12, the first weight body 21 and the second weight body 22 (weight bodies traversing the X-axis) are caused to undergo rotational motion in the counterclockwise direction from the position B toward the position A, and the third weight body 23 and the fourth weight body 24 (weight bodies traversing the Y-axis) are caused to undergo rotational motion in the clockwise direction from the position A toward the position B.

As stated above, if setting is made such that the rotational direction of the reversal (reciprocating) rotational motion of the first weight body 21 and the second weight body 22 and the rotational direction of the reversal (reciprocating) rotational motion of the third weight body 23 and the fourth weight body 24 are caused to always be opposite each other, the clockwise oscillatory component and the counterclockwise oscillatory component are canceled with each other within the rotor 60, thus making it possible to suppress oscillation leakage to the device casing. It should be noted that in the case where such a drive method is employed, the arms 61, 62, 63, 64 constituting the rotor 60 are required to be of a structure having flexibility to some degree (flexibility of the arm can be adjusted by, e.g., thickness).

§5 More Practical Embodiment of Angular Velocity Sensor of this Invention

Figure 13:
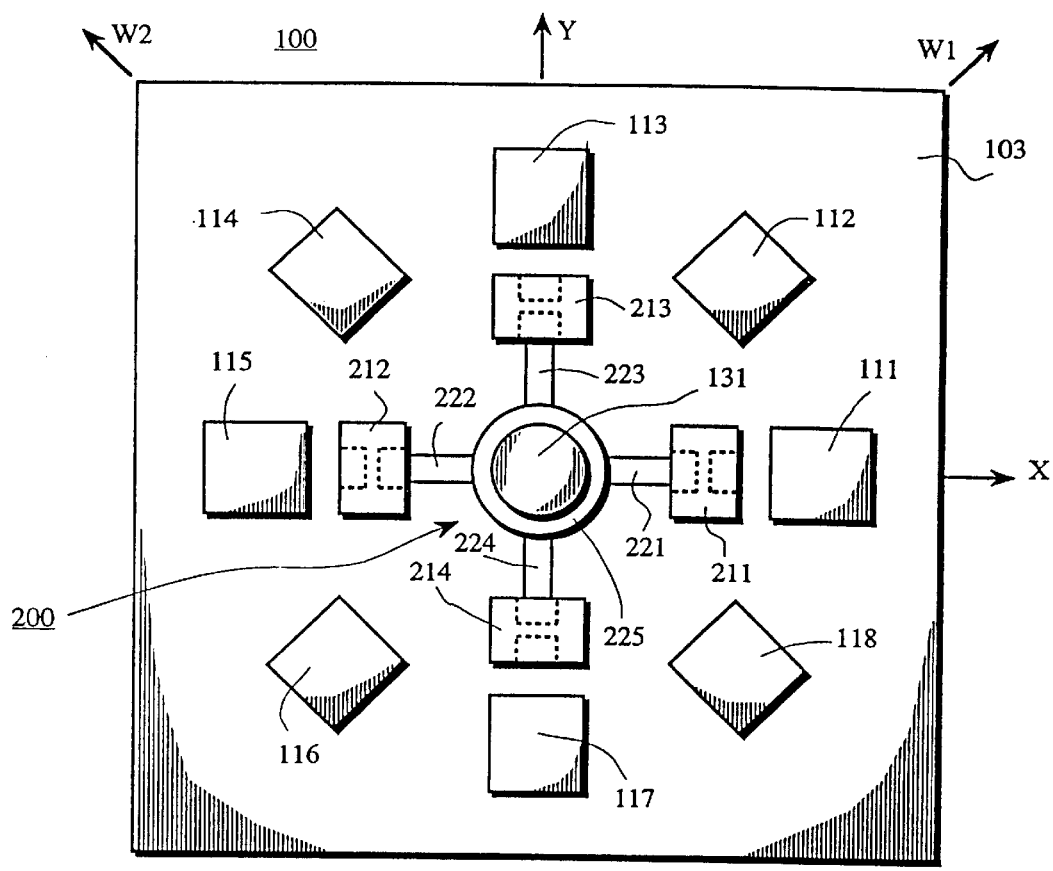
FIG. 13 is a plan view of an angular velocity sensor according to a more practical embodiment of this invention of the type of allowing a rotor to continuously undergo rotational movement.

Subsequently, the angular velocity sensor according to this invention will be described in accordance with more practical embodiment. FIG. 13 is a plan view of this embodiment, and FIG. 4 is a side cross sectional view showing the state cut along the X-axis of this embodiment. This embodiment is directed to an angular velocity sensor which can be manufactured by utilizing micro machining technology and semiconductor technology, wherein necessary components are all formed on semiconductor substrate.

Figure 14:
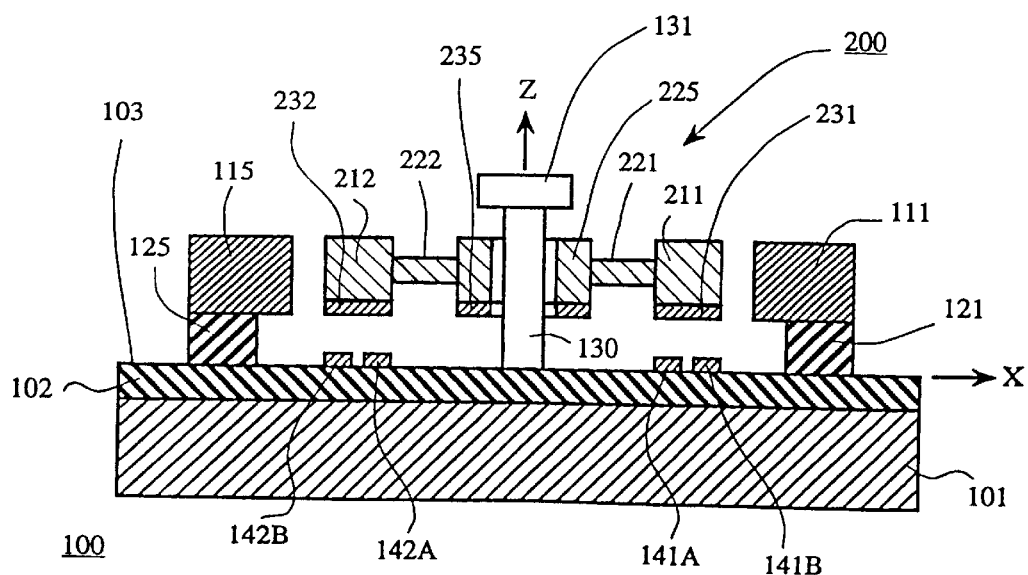
FIG. 14 is a side cross sectional view showing the state cut along the X-axis of the angular velocity sensor shown in FIG. 13.

The main components of this angular velocity sensor are a substrate 100 an a rotor 200. As shown in FIG. 14, the substrate 100 is composed of a silicon substrate 101 and a silicon oxide layer 102 formed on the upper portion thereof. Here, the XYZ three-dimensional coordinate system is defined so that an upper surface 103 of the substrate 100 is included within the XY plane and the following explanation will be given.

On the upper surface 103 of the substrate 100, the rotor 200 is disposed. The rotor 200 essentially has the same structure as that of the rotor 60 shown in FIG. 7 as clearly shown in the plan view of FIG. 15. Namely, four arms 221 to 224 are disposed so as to respectively have angular differences of 90 degrees therebetween, wherein the respective inside end portions are connected to a thick and cylindrical central member 225. Moreover, weight bodies 211 to 214 are respectively connected to the outside end portions of the respective arms 221 to 224. The four arms 221 to 224 and the four weight bodies 211 to 214 are all the same in the shape an the mass.

Figure 23:
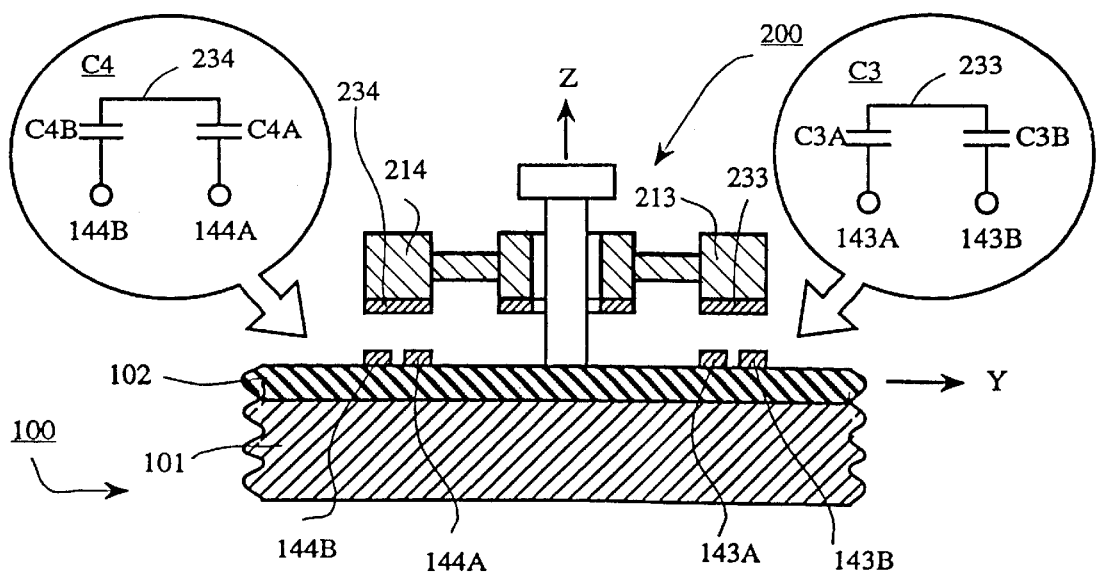
FIG. 23 is a side cross sectional view showing a cutting plane along the Y-axis for indicating capacitance elements constituted by movement electrodes formed on the rotor and fixed electrodes formed on the stator of the angular velocity sensor shown in FIG. 13.

The body portion of this rotor 200 is constituted of dielectric material, wherein electrodes having conductivity are formed on the lower surface thereof. Namely, the weight bodies 211 to 214, the arms 221 to 224 and the central member 225 constituting the body portion of the rotor 200 are all constituted of dielectric material (polysilicon in this example), wherein movement electrodes 231 to 235 each consisting of conductive material (aluminum or polysilicon in which a high concentration impurity is doped in this example) are formed on the lower surfaces of the weight bodies 211 to 214 and the central member 225 (the movement electrodes 233, 234 are shown in FIG. 23). The reason why the body portion of the rotor 200 is constituted by dielectric material is to allow the rotor 200 to carry out rotational motion (movement) on the basis of the principle of the induction motor as described in detail in chapter §6. In addition, the reason why the movement electrodes 231 to 234 are formed on the lower surfaces of the respective weight bodies 211 to 214 is to form capacitance elements for measuring distances between the weight bodies 211 to 214 and the upper surface 103 of the substrate as described in detail in chapter §7.

It is to be noted that although it is unnecessary to form the electrode 235 on the lower surface of the central member 225, when a typical semiconductor manufacturing process is implemented, the electrode layer 235 would also be formed on the lower surface of the central member 225 in the process for forming the layer of the movement electrodes on the lower surfaces of the respective weight bodies. Since the electrode layer 235 does not impede the operation of the angular velocity sensor in any sense, the electrode layer 235 is left as it is in this embodiment.

Figure 15:
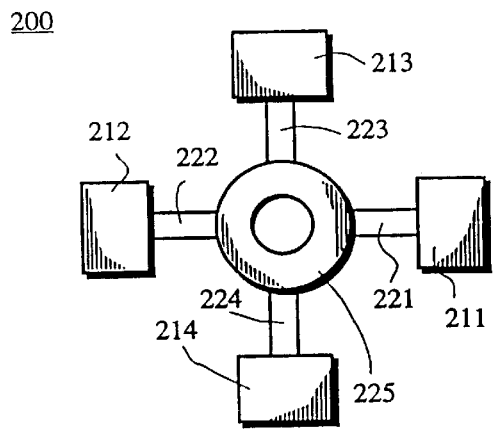
FIG. 15 is a plan view showing only the rotor of the angular velocity sensor shown in FIG. 13.

A columnar pivotal shaft 130 is secured on the substrate 100 in a manner extending along the Z-axis. As shown in FIG. 15, the central member 225 of lie rotor 200 has a thick cylindrical shape, wherein a columnar cavity is formed at a central portion thereof. The diameter of this cavity is slightly greater than the diameter of the pivotal shaft 130. When the rotor 200 is fitted into the pivotal shaft 130 in a manner to pass the pivotal shaft 130 through the, cavity as shown in FIG. 14, a gap is formed between the outer circumferential portion of the pivotal shaft 130 and the cavity inner circumferential portion. By this gap, the rotor 200 is supported with respect to the pivotal shaft 130 so that it can be rotated and can be inclined with a predetermined degree of freedom (in other words, respective weight bodies can be moved in the Z-axis direction). A disc-shaped stopper 131 is attached at the upper end portion of the pivotal shaft 130 thus to prevent the rotor 200 from slipping off the pivotal shaft 130. While the pivotal shaft 130 or the stopper 131 may be constituted by any material, it is preferable to constitute such a member of insulating material in order not to obstruct electric operation when the rotor 200 comes into contact herewith.

While the state where the rotor 200 floats above the substrate 100 is shown in FIG. 14 in this example, the reason why such an illustration is made is that the state where the rotor 200 is subject to rotational motion (movement) is shown as described later.

As seen from the plan view of FIG. 13, eight stator electrodes 111 to 118 are disposed on the substrate 100 in a manner to surround the periphery of the rotor 200. These stator electrodes 111 to 118 serve to deliver energy for rotating the rotor 200. While, in this embodiment, the eight stator electrodes 111 to 118 are disposed on the X-axis, the W1-axis, the Y-axis and the W2-axis intersecting so as to respectively have angular differences of 45 degrees therebetween, a larger number of stator electrodes may be disposed in order to allow the rotor to carry out more smooth rotational motion (movement).

The respective stator electrodes 111 to 118 are secured on the substrate 100 through pedestals consisting of insulating material. For example, as shown in the side cross sectional view of FIG. 14, the stator electrode 111 is fixed on the substrate 100 through the pedestal 121 and the stator electrode 115 is fixed on the substrate 100 through the pedestal 125. In this embodiment, the respective pedestals are constituted of polysilicon and the stator electrodes are constituted of aluminum. The reason why the respective stator electrodes are provided on the substrate 100 through insulating pedestals is to allow the rotor to smoothly carry out floating rotational motion (movement) thereof as described later.

Figure 16:
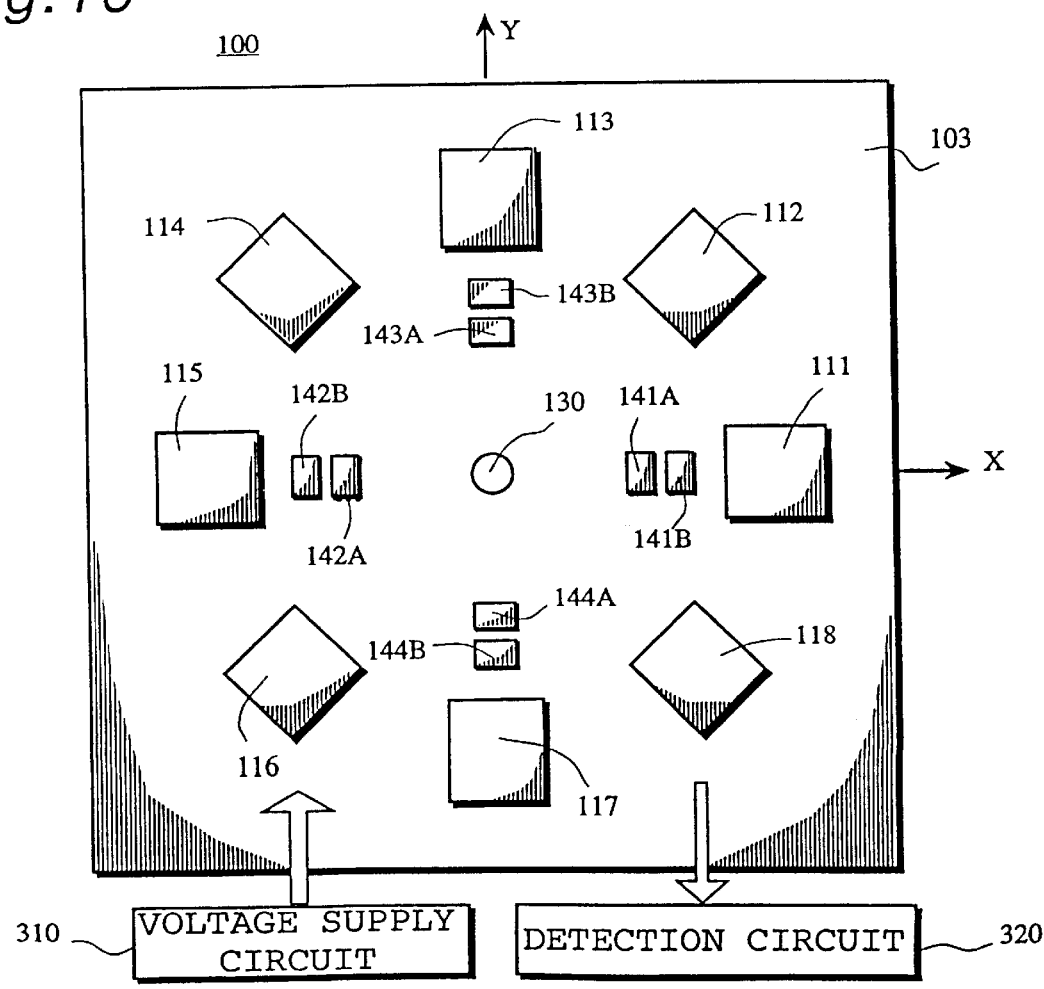
FIG. 16 is a plan view showing the state where the rotor is detached from the angular velocity sensor shown in FIG. 13.

FIG. 16 is a plan view showing the state where the stopper 131 of the angular velocity sensor shown in FIG. 13 is removed and the rotor 200 is detached, wherein the state where fixed electrodes 141A to 144A, 141B to 144B are disposed on the substrate to 100 is clearly shown. These fixed electrodes are all disposed in the vicinity of respective coordinate axes forming four pairs, respectively. Namely, the fixed electrode pair 141A, 141B are disposed in the vicinity of the positive X-axis, the fixed electrode pair 142A, 142B are disposed in the vicinity of the negative X-axis, the fixed electrode pair 143A, 143B are disposed in the vicinity of the positive Y-axis, and the fixed electrode pair 144A, 144B are disposed in the vicinity of the negative Y-axis. In addition, respective fixed electrodes 141A to 144A, 141B to 144B are disposed at positions such that they are opposite the movement electrodes 231 to 234 formed on the lower surfaces of the respective weight bodies when the respective weight bodies 211 to 214 of the rotor 200 pass above the X-axis and the Y-axis, as indicated by broken lines in FIG. 13.

When the respective fixed electrodes are disposed at positions as described above on the substrate 100, capacitance elements are formed at positions of the respective axes when the respective weight bodies 211 to 214 pass above the X-axis and Y-axis. For example, in FIG. 14, there is shown the state where the weight body 211 is located above the positive X-axis and the weight body 212 is located above the negative X-axis. In this state, the movement electrode 231 formed on the lower surface of the weight body 211 is opposite the fixed electrode pair 141A, 141B formed on the substrate 100 so that a pair of capacitance elements are formed. Similarly, the movement electrode 232 formed on the lower surface of the weight body 212 is opposite the fixed electrode pair 142A, 142B formed on the substrate 100 so that a pair of capacitance elements are formed. These capacitance elements are used for measuring distances between the respective weight bodies and the upper surface 103 of the substrate. The details of the capacitance elements will be described in the chapter §7.

In FIG. 16, there are shown a voltage supply circuit 310 and a detection circuit 320 as a block diagram. The voltage supply circuit 310 is a circuit for delivering predetermined voltages to the respective stator electrodes 111 to 118, and the detection circuit 320 is a circuit for detecting electrostatic capacitance values of the above-described respective capacitance elements. In practice, wirings for voltage supply exist between the respective stator electrodes 111 to 118 and the voltage supply circuit 310. Moreover, wirings for capacitance detection exist also between the respective fixed electrodes 141A to 144A, 141B to 144B and the detection circuit 320. For the purpose of avoiding that the drawing becomes complicated, illustration of these wirings is omitted in FIG. 16. In this embodiment, since the substrate 100 is a semiconductor substrate, the process for forming such wirings can be easily incorporated into the process of the semiconductor manufacturing procedure.

§6 Principle of Rotational Operation of Rotor

In this chapter, the principle of the rotational operation of the rotor in the angular velocity sensor whose structure has been described in chapter §5 will be described. This principle is well known as the principle of the induction motor. In recent years, in a field such as micro machining, etc., it is utilized as a principle for rotating a micro motor formed on a semiconductor substrate. In this embodiment, a.c. voltages having different phases from each other are delivered from the voltage supply circuit 310 to the respective stator electrodes 111 to 118 to thereby deliver rotational energy to the rotor 200 consisting of dielectric material.

Figure 17:
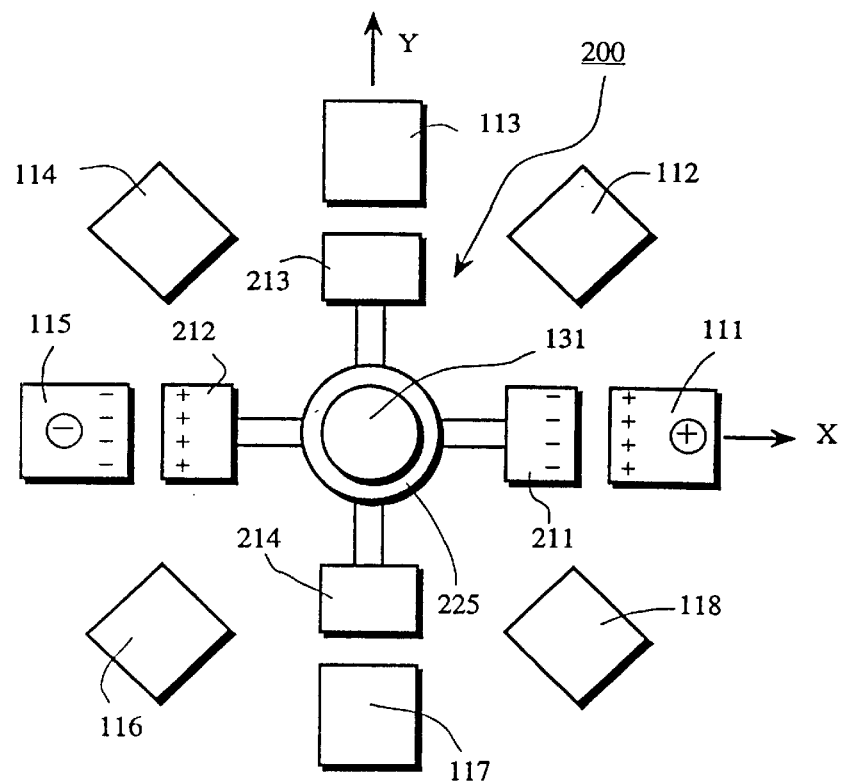
FIG. 17 is a plan view for explaining an operation of the angular velocity sensor shown in FIG. 13.
Figure 18:
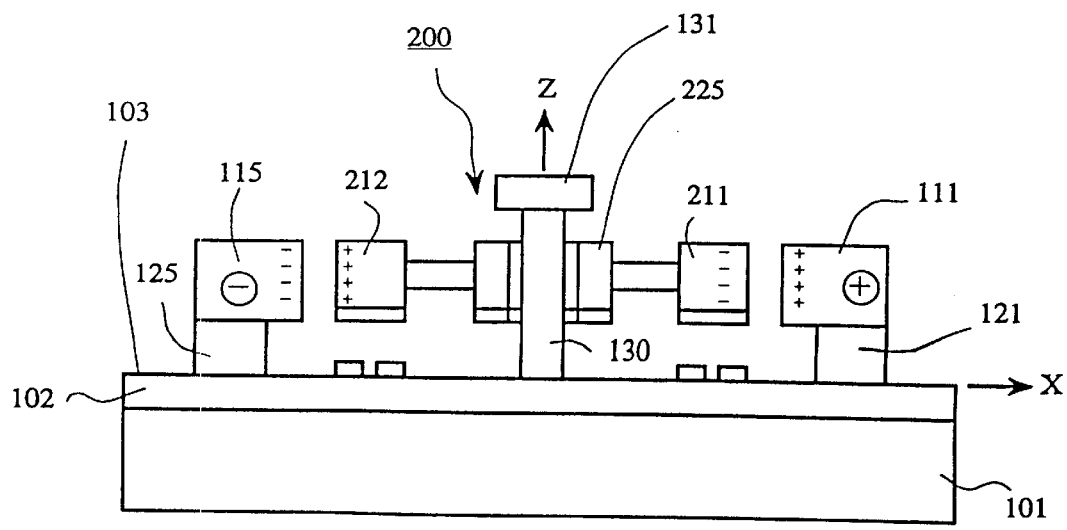
FIG. 18 is a side cross sectional view showing cutting plane along the X-axis for explaining the operation of the angular velocity sensor shown in FIG. 13.

It is now assumed as shown in FIG. 17 that a predetermined voltage is applied across the stator electrode 111 and the stator electrode 115 to produce positive charges on the stator electrode 111 and negative charges on the stator electrode 115. Since the body portion of the rotor 200 is constituted of dielectric material, polarization is produced therewith. As shown, negative charges are collected at the weight body 211 side and positive charges are collected at the weight body 212 side. FIG. 18 is a side cross sectional view showing the state at this time (hatching for indicating the cross section is omitted). Thus, there result the state where Coulomb attractive forces are applied across the weight body 211 and the stator electrode 111 and across the weight body 212 and the stator electrode 115.

Figure 19:
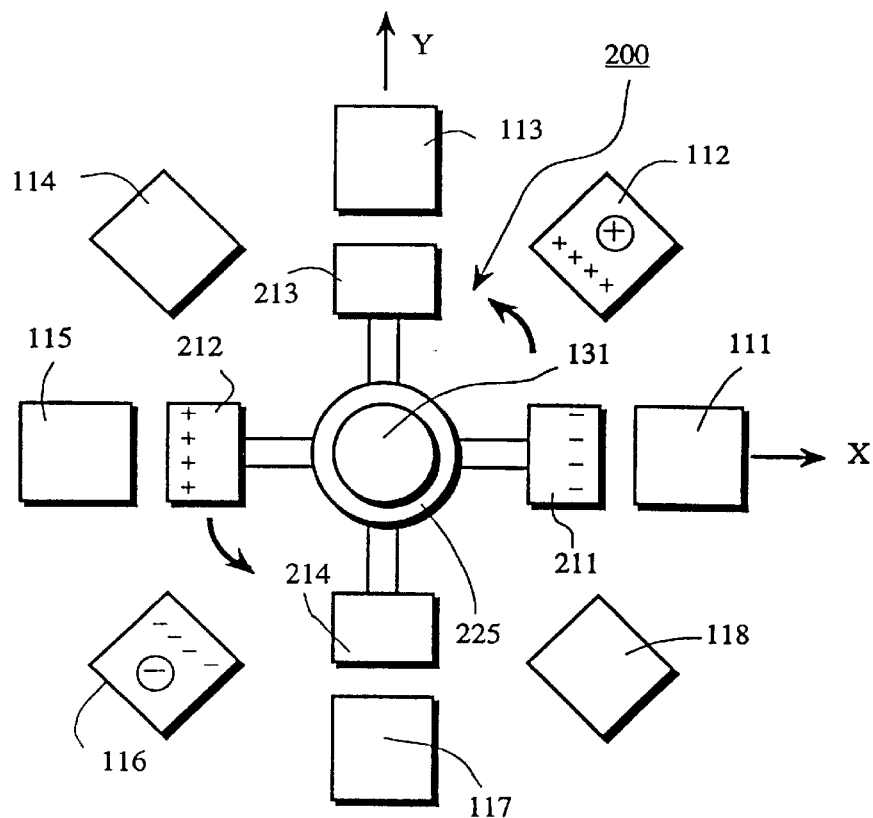
FIG. 19 is a plan view showing a principle for rotating the rotor by applying a predetermined voltage to the stator in the angular velocity sensor shown in FIG. 13.
Figure 20:
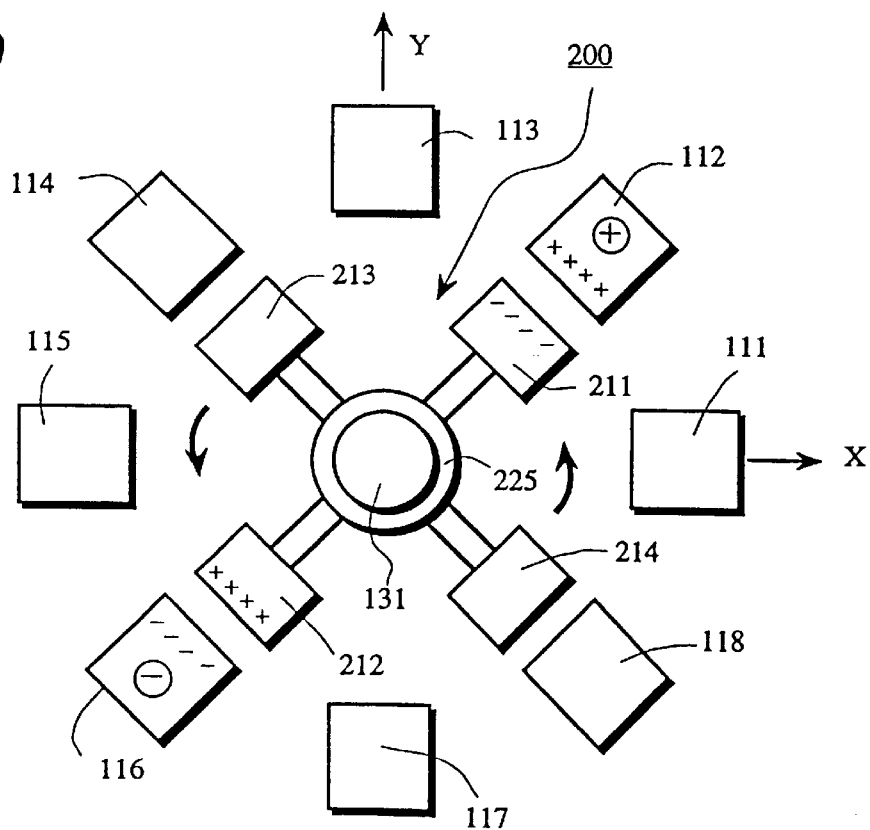
FIG. 20 is another plan view showing a principle for rotating the rotor by applying a predetermined voltage to the stator in the angular velocity sensor shown in FIG. 13.

In the next step, application of voltage across the stator electrode 111 and the stator electrode 115 is stopped and then, as shown in FIG. 19, a predetermined voltage is instead applied across the stator electrode 112 and the stator electrode 116 to produce positive charges at the stator electrode 112 side and negative charges at the stator electrode 116 side. When the distribution state of charges at the stator electrode side is changed in this way; the polarization state within the rotor 200 is also changed accordingly. Since the charge transfer speed within the dielectric substance is lower as compared to the charge transfer speed within the conductor, the change of the polarization state within the rotor 200 cannot sufficiently follow the change of the charge distribution state of the stator electrodes. For this reason, as shown in FIG. 19, after the electrode distribution of the stator electrodes has changed, the polarization state of the rotor remains in the state immediately before. Thus, Coulomb attractive force is applied across the weight body 211 and the stator electrode 112, and Coulomb attractive force is applied across the weight body 212 and the stator electrode 116. As a result, rotational force in the direction as indicated by the arrows in the figure is applied to the rotor 200. Thus, the rotor 200 is rotated to the position shown in FIG. 20.

In the following step, application of voltage across the stator electrode 112 and the stator electrode 116 is stopped in turn, and a predetermined voltage is instead applied across the stator electrode 113 and the stator electrode 117 to produce positive charges at the stator electrode 113 and negative charges at the stator electrode 117. Thus, Coulomb attractive force is applied across the weight body 211 and the stator electrode 113, and Coulomb attractive force is applied across the weight body 212 and the stator electrode 117. As a result, rotational force in the counterclockwise direction is further applied to the rotor 20. In a manner as stated above, if charge distribution relating to the stator electrodes 111 to 118 is subsequently changed in the counterclockwise direction, the rotor 20 carries out continuous rotational movement in the counterclockwise direction.

Figure 21:
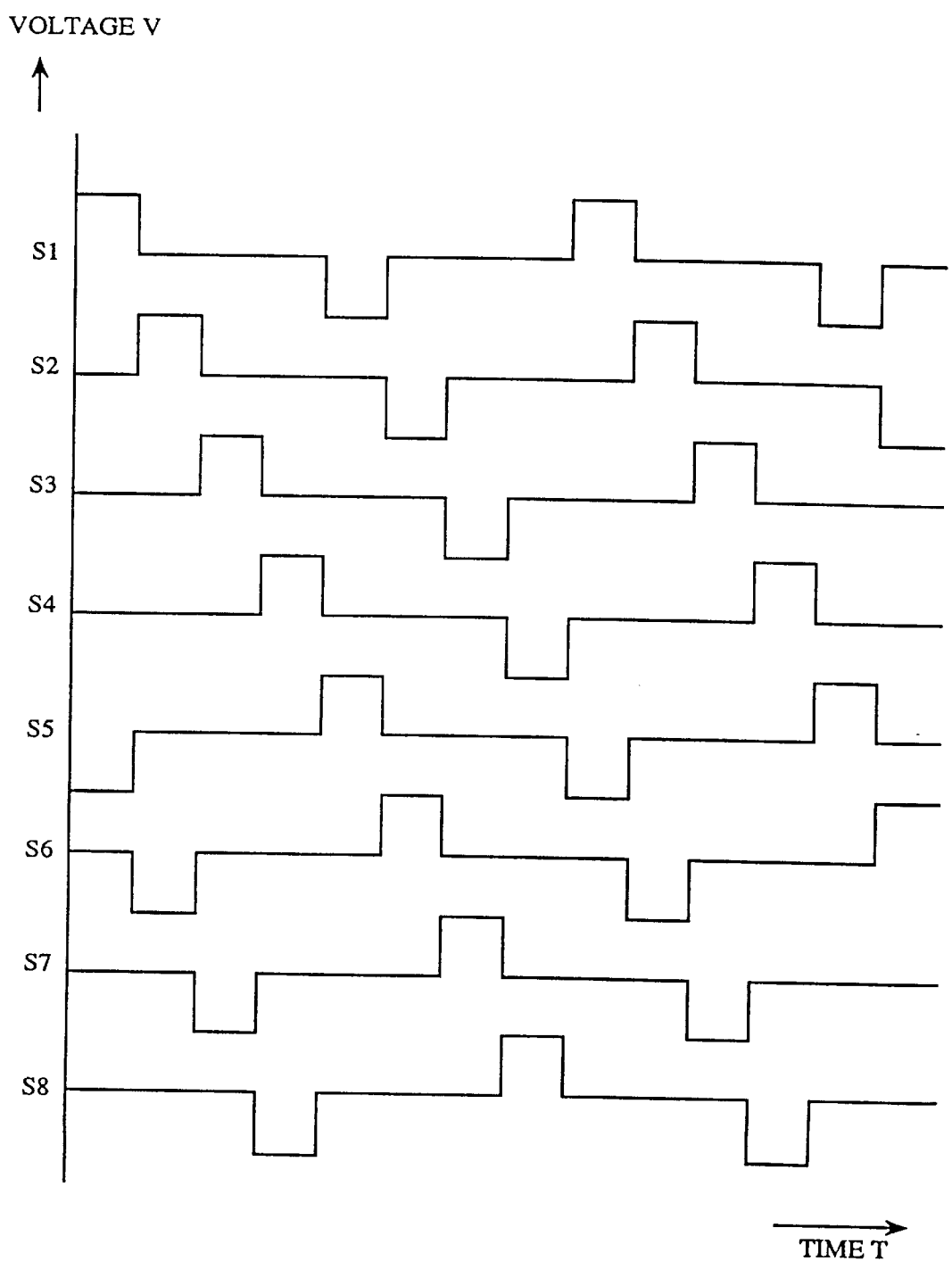
FIG. 21 is a waveform diagram showing a.c. voltage to be applied to the stator of the angular velocity sensor shown in FIG. 13.

Eventually, if a.c. voltage signals S1 to S8 as respectively shown in FIG. 21 are delivered from the voltage supply circuit 310 to the respective stator electrodes 111 to 118, the rotor 200 is permitted to continuously undergo rotational movement in the counterclockwise direction. It is a matter of course that if a.c. voltage signal to be delivered is varied, the rotor 200 is permitted to continuously undergo rotational movement in the clockwise direction, or is permitted to undergo reversal rotational movement to alternately repeat the clockwise movement and the counterclockwise movement. It is to be noted that it is preferable in the structure shown in this embodiment to allow the rotor 200 to continuously undergo rotational movement at a fixed rotational speed. When the rotor 200 is caused to continuously undergo rotational motion at a fixed speed, fluid layer of air is formed at the lower surface of the rotor 200. As a result, as shown in FIG. 14, the rotor 200 is rotated in the state floating above the substrate 100. Thus, stable rotational motion can be maintained. The reason why the rotor 200 floats in the rotating state in this way is that Coulomb attractive force with respect to the stator electrode provided on the pedestal is applied, and the rotor is placed in the state riding on the fluid layer of air formed by rotation movement.

Since the rotor 200 carries out stable continuous rotational motion in non-contact state with respect to the substrate 100 as stated above, there is no possibility that the oscillatory component caused by the rotation movement leaks to the substrate. Thus, reliable angular velocity detection can be made.

While the embodiment in which the rotor (weight body) is caused to undergo continuous rotational motion on the basis of the principle of the induction motor has been described above, the principle for rotating the rotor is not limited to this principle of the induction motor in carrying out this invention. In short, any methods in which the rotor (weight bodies) is permitted to be rotated in the non-contact state with respect to the substrate may be used. For example, it is possible to employ a structure such that the rotor is caused to be rotated on the basis of the principle of, e.g., variable capacitance motor or electret motor, etc.

§71 Principle of Detection of Distance Between Weight Body and Substrate

In accordance with the fundamental principle of the angular velocity sensor of this invention, distance between the weight body and the substrate is detected at a time point when the weight body subject to rotational motion passes above the X-axis or the Y-axis to thereby determine Coriolis force Fcz applied in the Z-axis direction thus to indirectly detect an angular velocity (ωx about the X-axis or an angular velocity ωy about the Y-axis. In this chapter, the principle for detecting distance between the weight body and the substrate in the angular velocity sensor whose structure has been described in chapter §5 will be described.

Let us now consider a pair of capacitance elements formed by a pair of fixed electrodes formed on the substrate and a movement electrode formed on the lower surface of the weight body. For example, in the side cross sectional view of FIG. 22, there is shown the state where the movement electrode 231 formed on the lower surface of the weight body 211 is opposite a pair of the fixed electrodes 141A, 141B formed on the substrate 100. This state can be replaced by the equivalent circuit shown at the right and upper portion of the figure. Namely, a first capacitance element C1A is formed by the first fixed electrode 141A and a portion of the movement electrode 231, and a second capacitance element C1B is formed by the second fixed electrode 141B and a portion of the movement electrode 231. In addition, since the movement electrode 231 is a single electrode, the pair of capacitance elements C1A, C1B are in the state where they are series-connected with the movement electrode 231 as an intermediate point.

In view of the above, the entirety of the pair of capacitance elements C1A, C1B connected in series is considered to be a single capacitance element C1. Providing that an electrostatic capacitance value of the capacitance element C1 lis designated by C1, and respective electrostatic capacitance values of the individual capacitance elements C1A, C1B are respectively designated by C1A, C1B, the following relational expression is obtained:

$$1/C1=(1/C1A)+(1/C1B).$$

Particularly, in the case of C1A=C1B, the above-mentioned relational expression can be described as follows:

$$C1=C1A/2.$$

Figure 22:
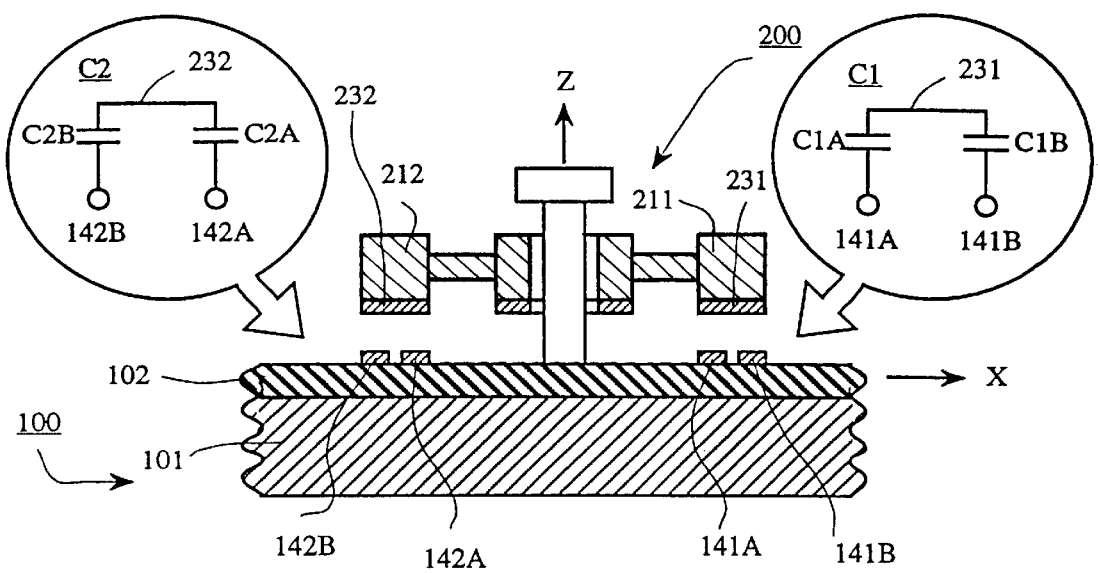
FIG. 22 is a side cross sectional view showing a cutting plane along the X-axis for indicating capacitance elements constituted by movement electrodes formed on the rotor and fixed electrodes formed on the stator of the angular velocity sensor shown in FIG. 13.

Similarly, if an equivalent circuit as shown at the left and upper potion of FIG. 22 is assumed in connection with the movement electrode 232 formed on the lower surface of the weight body 212 and a pair of fixed electrodes 142A, 142B opposite thereto, a capacitance element C2 is constituted. On the other hand, in FIG. 23 which shows a cutting plane along the Y-axis, there are shown an equivalent circuit with respect to the movement electrode 233 formed on the lower surface of the weight body 213 and a pair of the fixed electrodes 143A, 143B opposite thereto, and an equivalent circuit with respect to the movement electrode 234 formed on the lower surface of the weight body 214 and a pair of the fixed electrodes 144A, 144B opposite thereto. In these equivalent circuits, capacitance elements C3, C4 are constituted.

Figure 24:
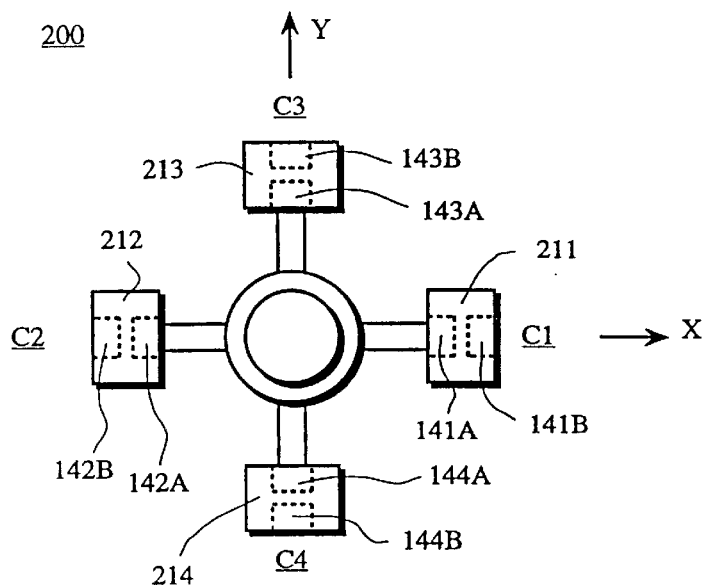
FIG. 24 is a plan view showing capacitance elements constituted by movement electrodes formed on the rotor and fixed electrodes formed on the stator of the angular velocity sensor shown in FIG. 13.

Eventually, in the case where the rotor 200 is located at a position as shown in FIG. 24, the capacitance element C1 is formed below the weight body 211 located above the positive X-axis, the capacitance element C2 is formed below the weight body 212 located above the negative X-axis, the capacitance element C3 is formed below the weight body 213 located above the positive Y-axis, and the capacitance element C4 is formed below the weight body 214 located above the negative Y-axis.

In this embodiment, a pair of capacitance elements which are connected in series (e.g., capacitance elements C1A, C1B) are considered to be a single capacitance element (e.g., capacitance element C1). The reason why such a handling is applied is that wirings with respect to the movement electrodes provided on the rotor 200 are difficult. Let us explain this reason with an example. In the equivalent circuit shown at the right and upper portion of FIG. 22, if an electrostatic capacitance value of one capacitance element C1A itself is to be measured, wiring with respect to the fixed electrode 141A an wiring with respect to the movement electrode 231 are required. However, since the movement electrode 231 is the electrode rotated by rotational motion of the rotor 200 and the rotor 200 carries out rotational motion in the non-contact state with respect to the substrate 100 as previously described, it is difficult from a viewpoint of practical use to implement wiring with respect to the movement electrode 231. On the contrary, if an approach is employed to measure an electrostatic capacitance value of the entirety of a pair of capacitance elements C1A, C1B connected in series as an electrostatic capacitance value of the capacitance element C1, the wiring with respect to the movement electrode 231 becomes unnecessary. Namely, since it is enough from an electric point of view that an electrostatic capacitance value between the first fixed electrode 141A and the second fixed electrode 141B can be measured, it is sufficient that wiring with respect to the pair of fixed electrodes is carried out.

Meanwhile, when it is assumed that an area of the electrode is S, the distance (spacing) between the electrodes is d and dielectric constant between the electrodes is ∈, an electrostatic capacitance value C of the capacitance element constituted by a pair of electrodes is represented by the following relational expression, $$C = \in \cdot S/d.$$

In this case, if the electrode area S and the dielectric constant ∈ are constant, the electrostatic capacitance value C is inversely proportional to d. Therefore, if the electrostatic capacitance value C can be measured, it is possible to determine the electrode distance d. Accordingly, in the equivalent circuits shown in FIGS. 22 and 23, electrostatic capacitance values C1, C2, C3, C4 results in values respectively related to distances between the weight bodies 211, 212, 213, 214 and the upper surface of the substrate 100. Eventually, if these electrostatic capacitance values C1 to C4 are detected by the detection circuit 320, the detected values result in values indicating distances between the weight bodies and the substrate, and result in values indicating applied angular velocity.

Figure 25:
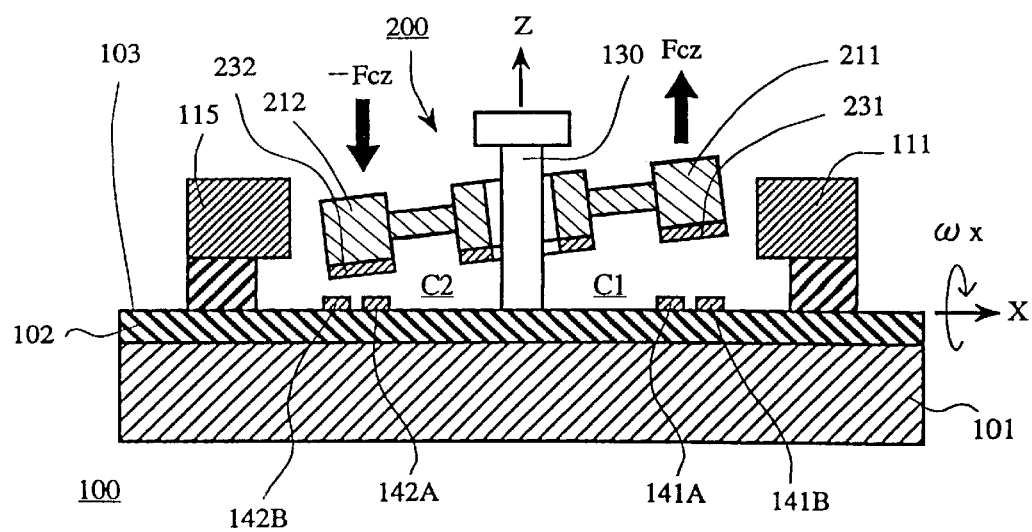
FIG. 25 is a side cross sectional view showing a cutting plane along the X-axis of the angular velocity sensor shown in FIG. 13 in the state where an angular velocity $\omega x$ about the X-axis is applied during rotation of the rotor.

Subsequently, the principle of actual angular velocity detection will be described with reference to FIG. 25. It is now assumed that the rotor 200 is carrying out continuous rotational motion at a fixed velocity in the counterclockwise direction when viewed from the upper direction on the basis of the principle described in the previously mentioned chapter §6. In this circumstance, when an angular velocity ωx about the X-axis as shown is assumed to be applied o the substrate 100, Coriolis force Fcz in the Z-axis positive direction is applied to the weight body 211 at the moment when it passes above the positive X-axis. At this time, the weight body 212 is passing above the negative X-axis, and Coriolis force −Fcz in the Z-axis negative direction is applied to the weight body 232. As a result, the entirety of the rotor 200 is inclined as shown. As compared to the reference state where an angular velocity is not applied, the electrode spacing of the capacitance element C1 is widened and the electrode spacing of the capacitance element C2 is narrowed. As a result, the electrostatic capacitance value C1 is deceased by ΔC1 and the electrostatic capacitance value C2 is increased by ΔC2. Accordingly, if difference (ΔC1+ΔC2) between both the electrostatic capacitance values is taken, a sign of this difference indicates direction of the applied angular velocity ωx about the X-axis and the magnitude of this difference indicates the magnitude of the angular velocity ωx. It is to be noted that ΔC1 and ΔC2 are not equal to each other rigorously speaking, but they can be handled as ΔC1=ΔC2=ΔC in a practical sense. Thus, the difference can be determined as 2·ΔC.

Figure 26:
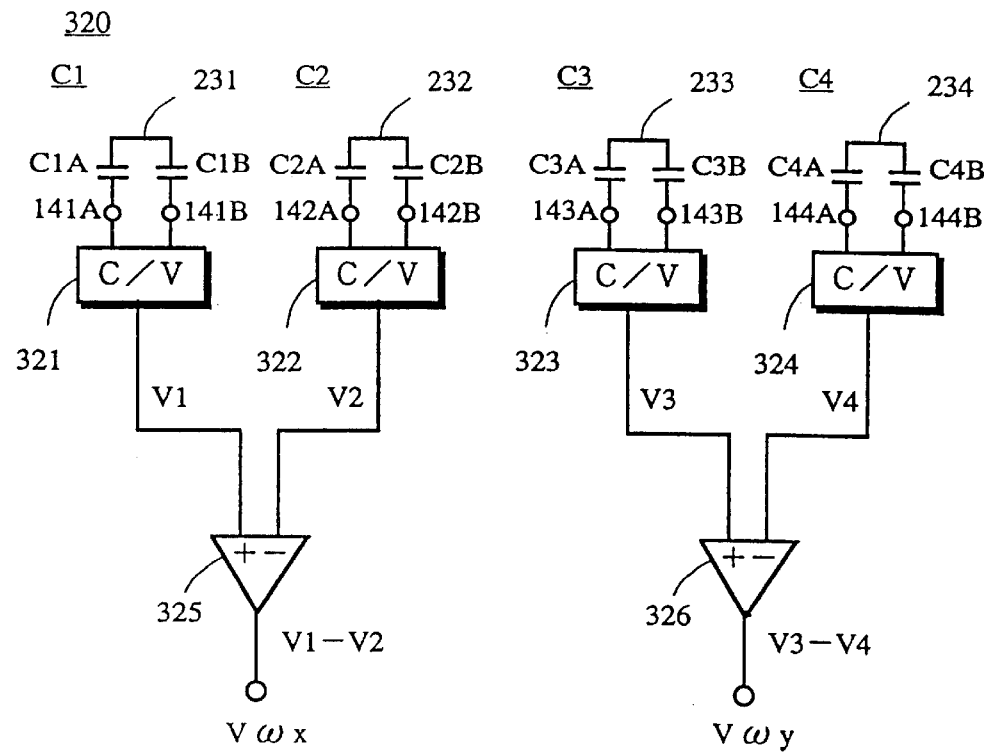
FIG. 26 is a circuit diagram showing a detection circuit used with respect to the angular velocity sensor shown in FIG. 13.

FIG. 26 is a circuit diagram showing an example of a practical circuit configuration of the detection circuit 320. Electrostatic capacitance values of the capacitance elements C1, C2, C3, C4 are respectively converted into voltage values V1, V2, V3, V4 by C/V converting circuits 321, 322, 323, 324 having a function to convert electrostatic capacitance value C into voltage value V. Then, the difference between the voltage values V1 and V2 is calculated by a differential amplifier 325, and the difference between voltage values V3 and V4 is calculated by a differential amplifier 326. As described above, difference (V1−V2) between voltage values is outputted from the differential amplifier 325 as an output voltage Vωx indicating an angular velocity ωx about the X-axis, and the difference (V3−V4) between voltage values is outputted from the differential amplifier 326 as an output voltage Vωy indicating an angular velocity ωy about the Y-axis.

In the embodiment illustrated here, since the rotor 200 having four weight bodies is used as shown in FIG. 24, output voltages Vωx and Vωy indicating correct detection values can be obtained at every period when the rotor 200 is rotated by 90 degrees (when the respective weight bodies pass above the respective axes). In the case where the rotor 70 having ring-shaped structural body 76 as shown in FIG. 9 is used, if an integrated movement electrode is formed on the entirety of the lower surface of the ring-shaped structural body 76, correct detection values are outputted at all the times.

Figure 27:
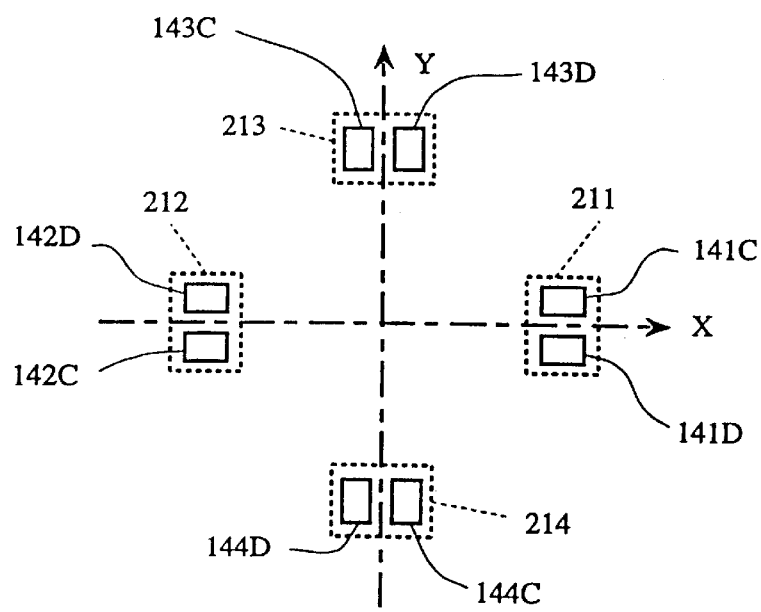
FIG. 27 is a plan view showing another example of arrangement of fixed electrodes used for the angular velocity sensor shown in FIG. 13.

While the fixed electrodes 141A to 144A, 141B to 144B in the above-described embodiments are all disposed on the respective coordinate axes, it is sufficient that a paid of fixed electrodes are adjacently disposed in the vicinity of the coordinate axis. For example, as shown in FIG. 27 (reference positions of the weight bodies 211 to 214 are indicated by broken lines), the fixed electrodes 141C to 144C, 141D to 144D may be arranged in such a manner that they are put so that the respective coordinate axes are located therebetween. In addition, although it is sufficient that a pair of fixed electrodes adjacently disposed are different in shape and/or size, it is preferable for the purpose of simplifying the detection circuit that all fixed electrodes are caused to have the same shape and the same size.

§8 Another Embodiment of Angular Velocity Sensor of this Invention

Figure 28:
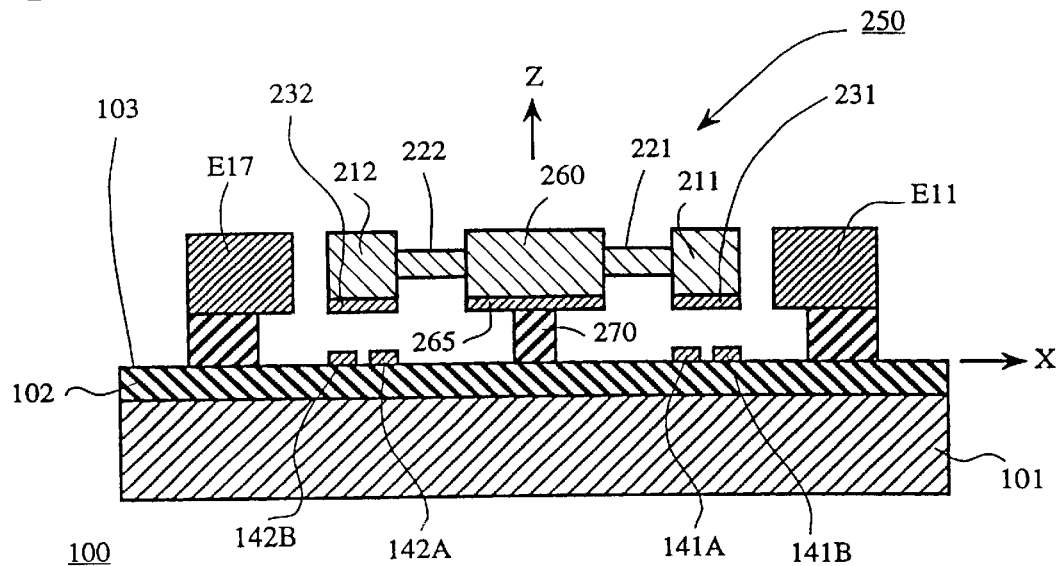
FIG. 28 is a side cross sectional view showing a cutting plane along the X-axis of an angular velocity sensor according to a more practical embodiment in which the rotor is operated with reversal rotational movement (oscillatory motion).
Figure 29:
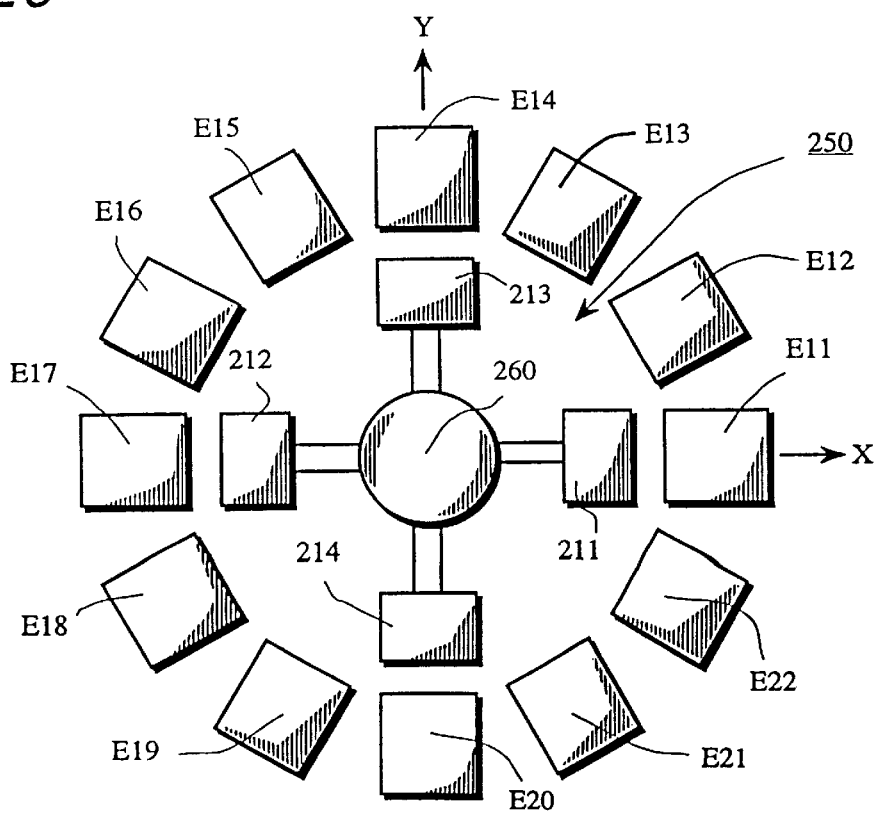
FIG. 29 is a plan view showing arrangement of main components of the angular velocity sensor shown in FIG. 28.

While the embodiment described in chapter §5 is directed to the angular velocity sensor having a structure suitable for allowing the rotor to undergo continuous rotational motion, an example of an angular velocity sensor haling a structure suitable for allowing the rotor to undergo reversal (reciprocating) rotational motion is disclosed in this chapter. FIG. 28 is a side cross sectional view of such an embodiment, and FIG. 29 is a plan view showing an arrangement of main components of this embodiment.

The structure of the substrate 100 in this angular velocity sensor is exactly the same as that of the embodiment described in chapter §5. A structure of a rotor 250 is substantially the same as the structure of the rotor 200 which has been described in chapter §5, but a central member 260 is a columnar block and is secured on the upper end of a supporting body 270 through an electrode 265. The supporting body 270 is a columnar block, wherein the lower end thereof is fixed on the substrate 100. Eventually, the rotor 250 is placed in the state where its central portion is fixed on the substrate 100 through the supporting body 270. It is to be noted that while the weight bodies 211 to 214 are indirectly connected to the substrate 100 through the arms 221 to 224 and the supporting body 270, they are permitted to undergo reversal rotational motion in the non-contact state with respect to the substrate 100.

In order to allow the rotor 250 to undergo reversal (reciprocating) rotational motion, it is necessary to use, as a supporting body 270, a structure capable of producing torsion about the Z-axis. In this embodiment, the supporting body 270 consists of polysilicon as described above. By setting the size of the diameter to a suitable dimension, reversal (reciprocating) rotational motion can be made with a necessary degree of freedom.

In order to realize more smooth reversal (reciprocating) rotational motion, twelve stator electrodes are provided in this embodiment. They are disposed so that angular differences therebetween are equal to 30 degrees. FIG. 29 is a plan view showing the arrangement of these twelve stator electrodes E11 to E22 and the rotor 250. In order to allow the rotor 250 to undergo reversal (reciprocating) rotational motion, it is sufficient to apply predetermined a.c. voltages to the respective stator electrodes.

Figure 30:
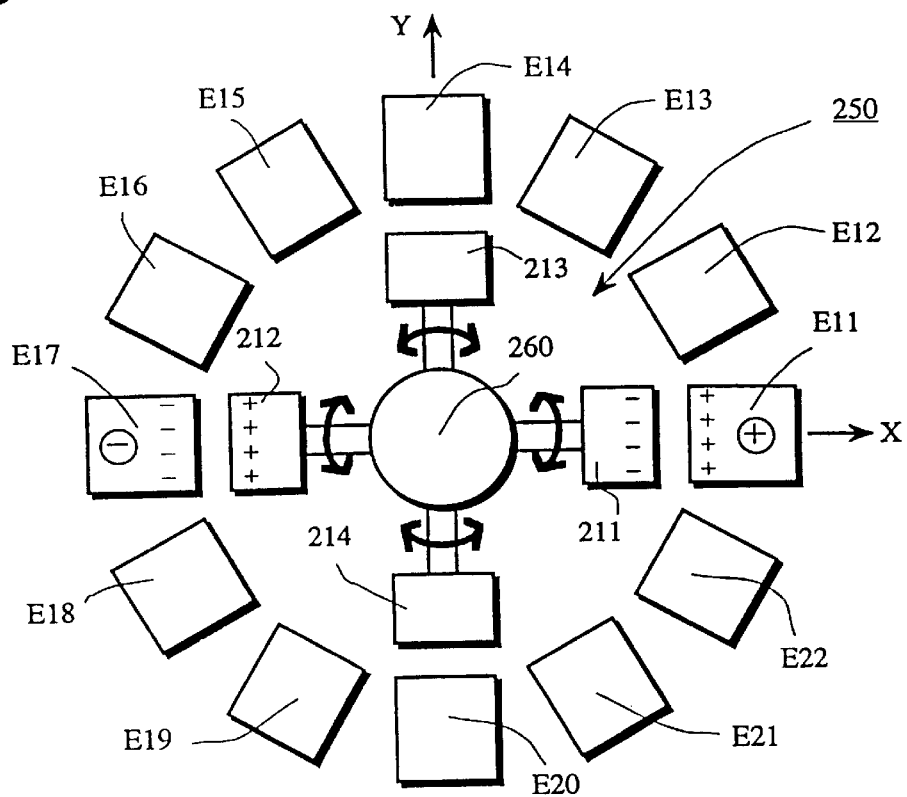
FIG. 30 is a plan view showing an operational mode for allowing the rotor to undergo reversal rotational movement in the angular velocity sensor shown in FIG. 28.

For example, as shown in FIG. 30, if positive charges and negative charges are respectively produced at the stator electrode E11 and the stator electrode E17, there takes place the polarization phenomenon that negative charges and positive charges are respectively collected at the weight body 211 and the weight body 212. Subsequently, when the stator electrodes E11, E17 are restored to the neural state and positive charges and negative charges are respectively produced on the stator electrode E12 and the stator electrode E18, the rotor 250 begins rotating counterclockwise. Thereafter, when the stator electrodes E12, E18 are restored to the neutral state and positive charges and negative charges are respectively produced on the stator electrode E11 and the stator electrode E17 as shown in FIG. 30 for a second time, rotational motion of the rotor 250 is reversed in the clockwise direction. Further, when the stator electrodes E11, E17 are restored to the neutral state and positive charges and negative charges are respectively produced on the stator electrode E22 and the stator electrode E16, the rotor 250 further continues to rotate in the clockwise direction. Thereafter, when the stator electrodes E22, E16 are restored to the neutral state and positive charges and negative charges are respectively produced on the stator electrode E11 and the stator electrode E17 as shown in FIG. 30 for a third time, rotational motion of the rotor 250 is reversed in the counterclockwise direction.

When a drive operation as described above is carried out, the rotor 250 is caused to undergo rotational motion in the counterclockwise direction in the first half period, and is caused to undergo rotational motion in the clockwise direction in the second half period. Thus, the rotor 250 is caused to undergo reversal or reciprocating rotational motion (oscillation) within a predetermined angular range as indicated by arrows in the figure.

However, as previously described in chapter §4, there exists the drawback that when the rotor 250 carries out such reversal (reciprocating) rotational motion, oscillatory component of the rotor is propagated to the substrate 100 through the supporting body 270, so that oscillation leaks to the device casing. Moreover, as previously described, in order to prevent such oscillation leakage, it is sufficient to carry out reversal (reciprocating) rotational motion in such a form that clockwise rotation and counterclockwise rotation are canceled with each other. Namely, in the case of the rotor having four weight bodies, it is sufficient to respectively carry out rotations in predetermined directions for every respective weight body as shown in FIG. 11 in a first half period and as shown in FIG. 12 in the second half period.

Figure 31:
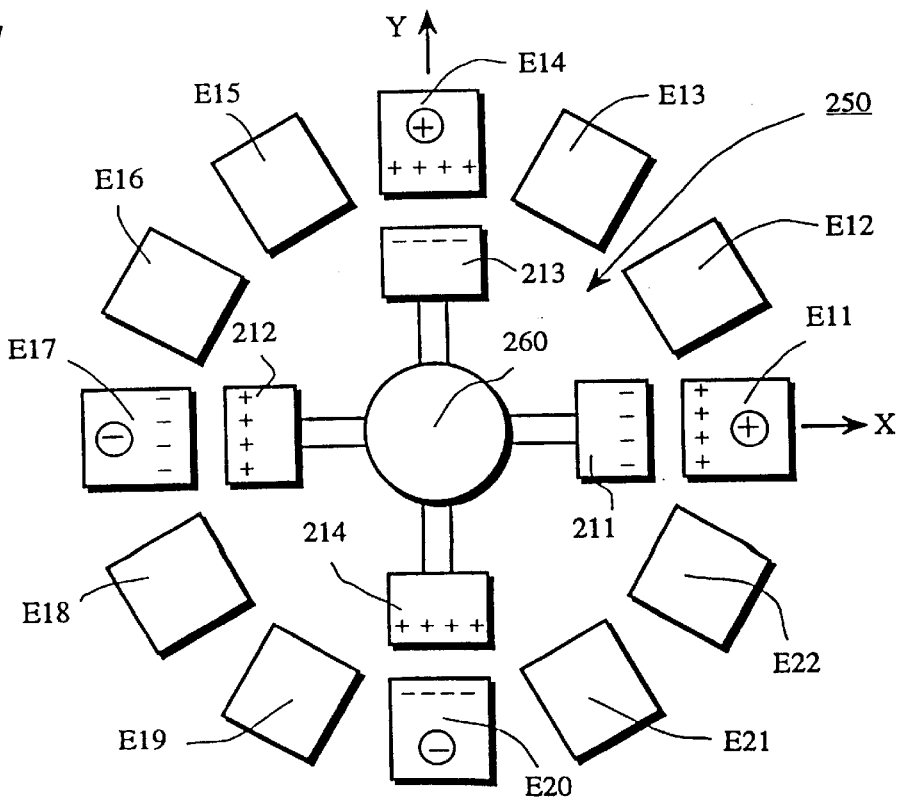
FIG. 31 is a plan view showing a first operational mode for allowing the rotor to undergo reversal rotational movement by the method of canceling the rotational oscillation component in the angular velocity sensor shown in FIG. 28.
Figure 32:
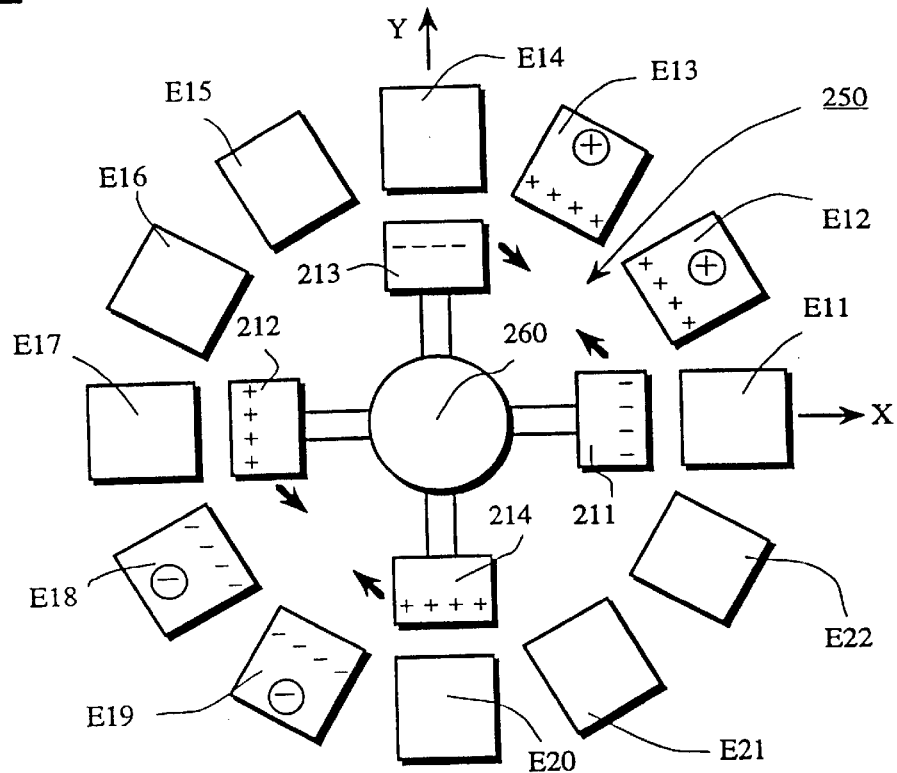
FIG. 32 is a plan view showing a second operational mode for allowing the rotor to undergo reversal rotational movement by the method of canceling the rotational oscillation component in the angular velocity sensor shown in FIG. 28.
Figure 33:
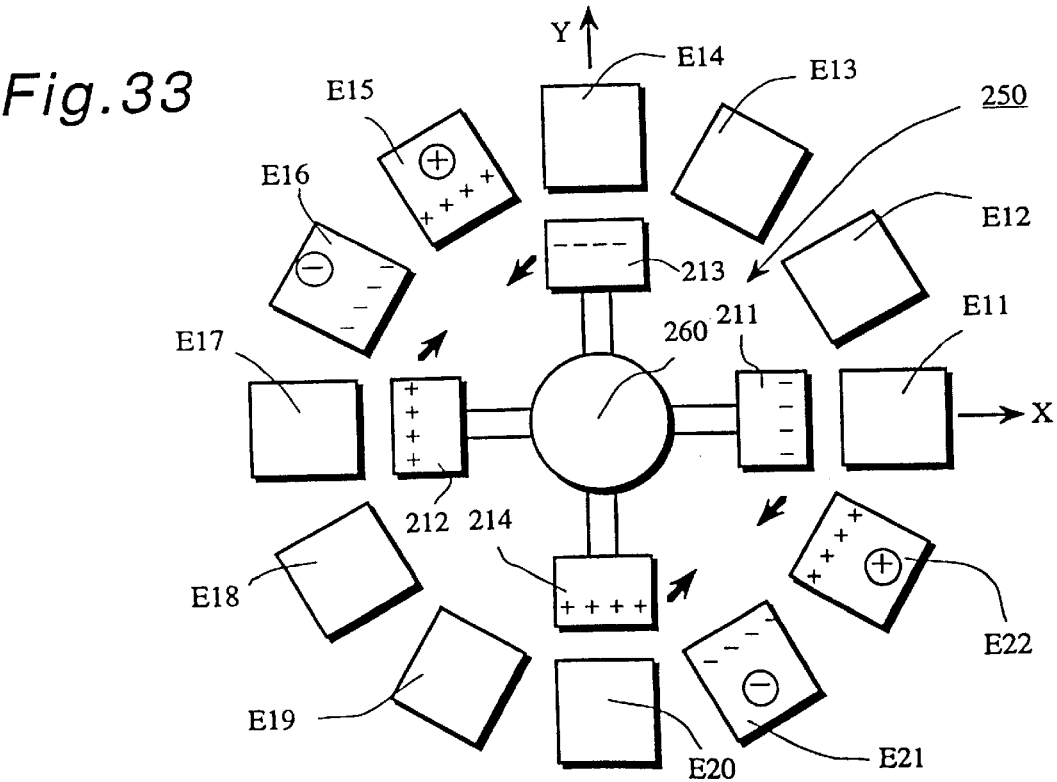
FIG. 33 is a plan view showing a third operational mode for allowing the rotor to undergo reversal rotational movement by the method of canceling the rotational oscillation component in the angular velocity sensor shown in FIG. 28.

In order to apply such reversal (reciprocating) rotational motion to the embodiment shown in FIG. 29, it is sufficient to carry out a drive method as described below. Initially, as shown in FIG. 31, the stator electrodes E11, E14 and the stator electrodes E17, E20 are caused to respectively produce positive charges and negative charges. Thus, in the rotor 250 side, there takes place the polarization phenomenon that negative charges and positive charges are respectively collected at the weight bodies 211, 213 and the weight bodies 212, 214. Subsequently, when the stator electrodes E11, E14, E17, E20 are restored to the neutral state and positive charges and negative charges are respectively produced at the stator electrodes E12, E13 and the stator electrodes E8, E19 as shown in FIG. 32, the weight bodies 211, 212 begin rotating in the counterclockwise direction and the weigh bodies 213, 214 begin rotating in the clockwise direction. Subsequently, when the stator electrodes E12, E13, E18, E19 are restored to the neutral state and positive charges and negative charges are respectively produced on the stator electrodes E11, E14 and the stator electrodes E17, E20 as shown in FIG. 31 for a second time, rotational directions of the respective weight bodies are reversed. Further, when the stator electrodes E11, E14, E17, E20 are restored to the neutral state and positive charges and negative charges are respectively produced on the stator electrodes E15, E22 and the stator electrodes E16, E21 as shown in FIG. 33, the weight bodies 211, 212 continue rotating in the clockwise direction and the weight bodies 213, 214 continue rotating in the counterclockwise direction. Thus, when the stator electrodes E15, E16, E21, E22 are restored to the neutral state and positive charges and negative charges are respectively produced on the stator electrodes E11, E14 and the stator electrodes E17, E20 as shown in FIG. 31 for a third time, rotational directions of the respective weight bodies are reversed.

When a drive operation as described above is carried out, two weight bodies constituting the rotor 250 rotate in the clockwise direction, and the remaining two weight bodies rotate in the counterclockwise direction. As a result, the oscillatory components are canceled within the rotor 250, thus making it possible to prevent that oscillation leaks into the device casing. In this case, when resonant frequency inherent in the rotor 250 is selected as a frequency of the reversal (reciprocating) rotational motion (oscillation frequency), an efficient drive can be made.

§9 Fundamental Principle of Detection of Angular Velocity about Z-axis

The angular velocity sensors which have been described until now are adapted so that weight bodies are caused to undergo rotational motion on the substrate in parallel to the XY plane in the XYZ three-dimensional coordinate system to detect an angular velocity $\omega x$ about the X-axis and an angular velocity $\omega y$ about the Y-axis. Further, in this chapter, the principle for detecting an angular velocity $\omega z$ about the z-axis perpendicular to the substrate will be described below.

Figure 34:
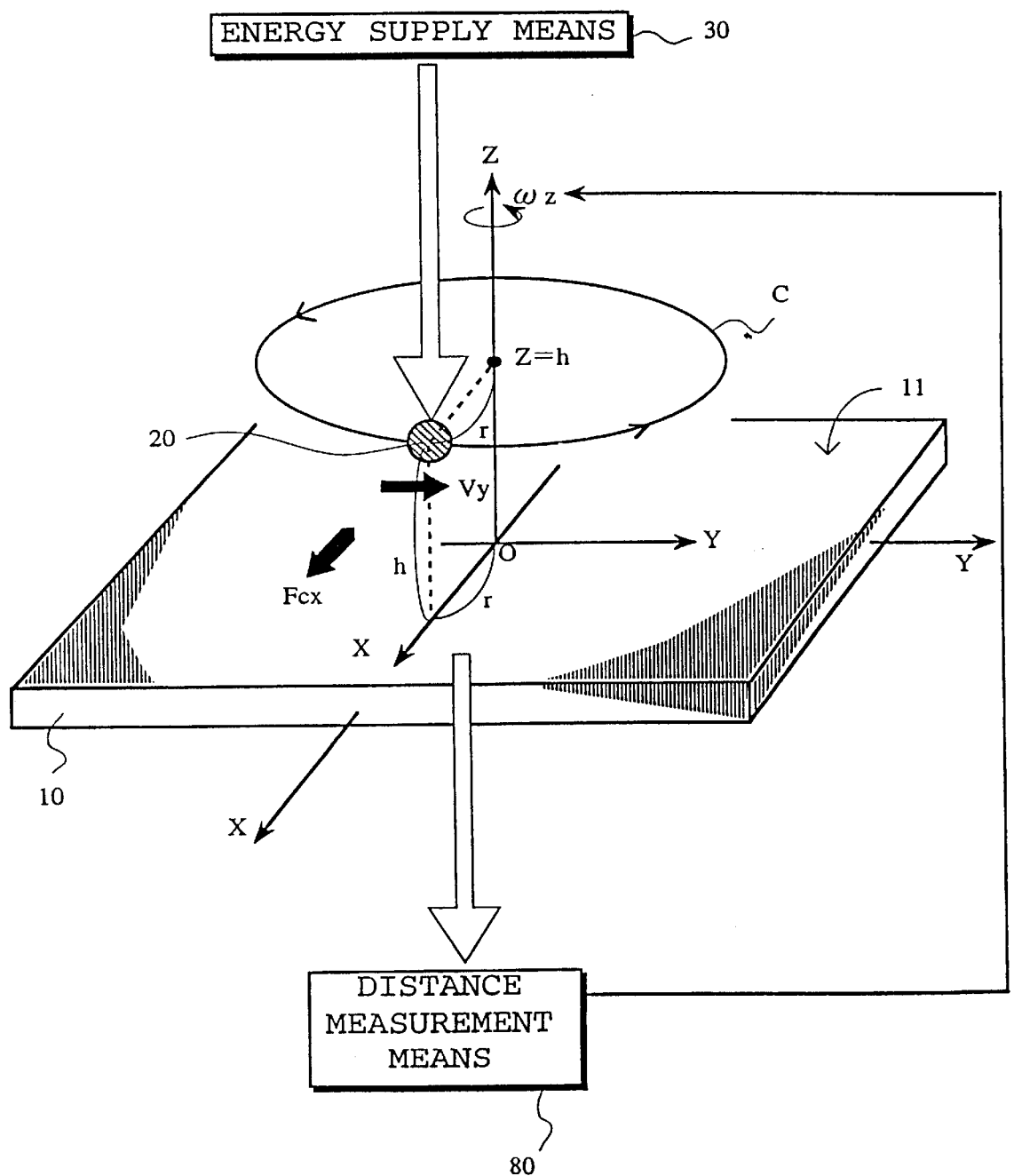
FIG. 34 is a perspective view showing a fundamental configuration of an angular velocity sensor for detecting angular velocity ωz about the Z-axis.

FIG. 34 is a perspective view showing the detection principle of an angular velocity $\omega z$. Individual components shown in this figure are substantially the same as the components shown in FIG. 1. Namely, the substrate 10 includes a flat upper surface 11, and functions as a device casing. The XYZ three-dimensional coordinate system is defined so that the upper surface 11 is included within the XY plane, wherein the Z-axis extending upwardly from the origin O serves as an axis perpendicular to the upper surface 11. In this example, such an approach is employed to deliver energy from energy supply means 30 to the weight body 20 having a predetermined mass to allow the weight body 20 to carry out rotational motion along the orbit C of the figure with the Z-axis being an axis of rotation. At this time, it is assumed that energy supply from the energy supply means 30 is caused to be carried out so that the weight body 20 carries out rotational motion along the orbiit C while maintaining a fixed distance h with respect to the upper surface 11 and maintaining a fixed distance r with respect to the Z-axis in the state where an external forcie such as angular velocity or acceleration, etc. is not applied to this system. Accordingly, in the state where no external force is applie to the system (substrate 10 is in a stationary state), the weight body 20 is supplied with energy from the energy supply means 30 to carry out rotational motion on the circular orbit C having a radius r within the plane indicated by the equation Z=h.

This angular velocity sensor further comprises distance measurement means 80 for measuring distance between the Z-axis and the weight body 20 (radius of the rotational motion) at a time point when the weight body 20 passes above the X-axis. Since the weight body 20 carries out motion along the circular orbit C all the time in the state where no force is applied from outside the system as described above, a measured value by the distance measurement means 80 always indicates a fixed radius value r in that state.

However, in the case where the entirety of this system is caused to undergo rotational motion (movement) at an angular velocity ωz about the Z-axis, in other words, in the case where an angular velocity ωz is applied to the substrate 10, a Coriolis force based on the angular velocity is applied to the weight body 20. As a result, motion of the weight body 20 deviates from the primary circular orbit C. Namely, in the case where the entirety of this system is rotated at an angular velocity ωz about the Z-axis as shown in FIG. 34, Coriolis force Fcx in the positive X-axis direction (Coriolis force −Fcx in the negative X-axis direction which may take place in dependency upon direction of the angular velocity ωz) is applied to the weight body 20 moving above the X-axis with a velocity component Vy in the Y-axis direction. This Coriolis force is defined by the relational expression as described below;

$$Fcx = 2 \cdot m \cdot Vy \cdot \omega z.$$

In the example shown in FIG. 34, the orbit of the weight body 20 moving in the Y-axis direction is distorted in the X-axis direction by an action of the Coriolis force Fcx. Thus, distance between the weight body 20 and the Z-axis at a time point when the weight body 20 passes through the point above the X-axis is increased or decreased by Δr (is caused to depend upon direction of the angular velocity ωz), resulting in r±Δr.

If mass m and moving velocity Vy of the weight body 20 are constant, the Coriolis force Fcx takes a value proportional to the angular velocity ωz. Eventually, distance Δr, which is a deviation of an actual orbit from the original circular orbit C when the weight body 20 passes through a point above the X-axis, can be used as a value indicating an angular velocity ωz. In addition, since r is constant, if distance r+Δr between the weight body 20 and the Z-axis can be measured, it is possible to obtain a value of an angular velocity ωz. The angular velocity sensor shown in FIG. 34 has a function to detect an angular velocity ωz about the Z-axis on the basis of such a principle. Namely, an output of the distance measurement means 80 indicates a detection value of the angular velocity ωz.

The fundamental principle for detecting the angular velocity ωz has been described as above. In practice, however, it is preferable to provide a function to cancel the influence of acceleration as described in chapter §2. The reason thereof is as follows. In the case of the configuration shown in FIG. 34, even if the orbit of the weight body 20 is caused to undergo displacement by Δr in the X-axis direction, it is impossible to discriminate whether that displacement results from the Coriolis force Fcx or force Fax based n acceleration αx in the X-axis direction.

Figure 35:
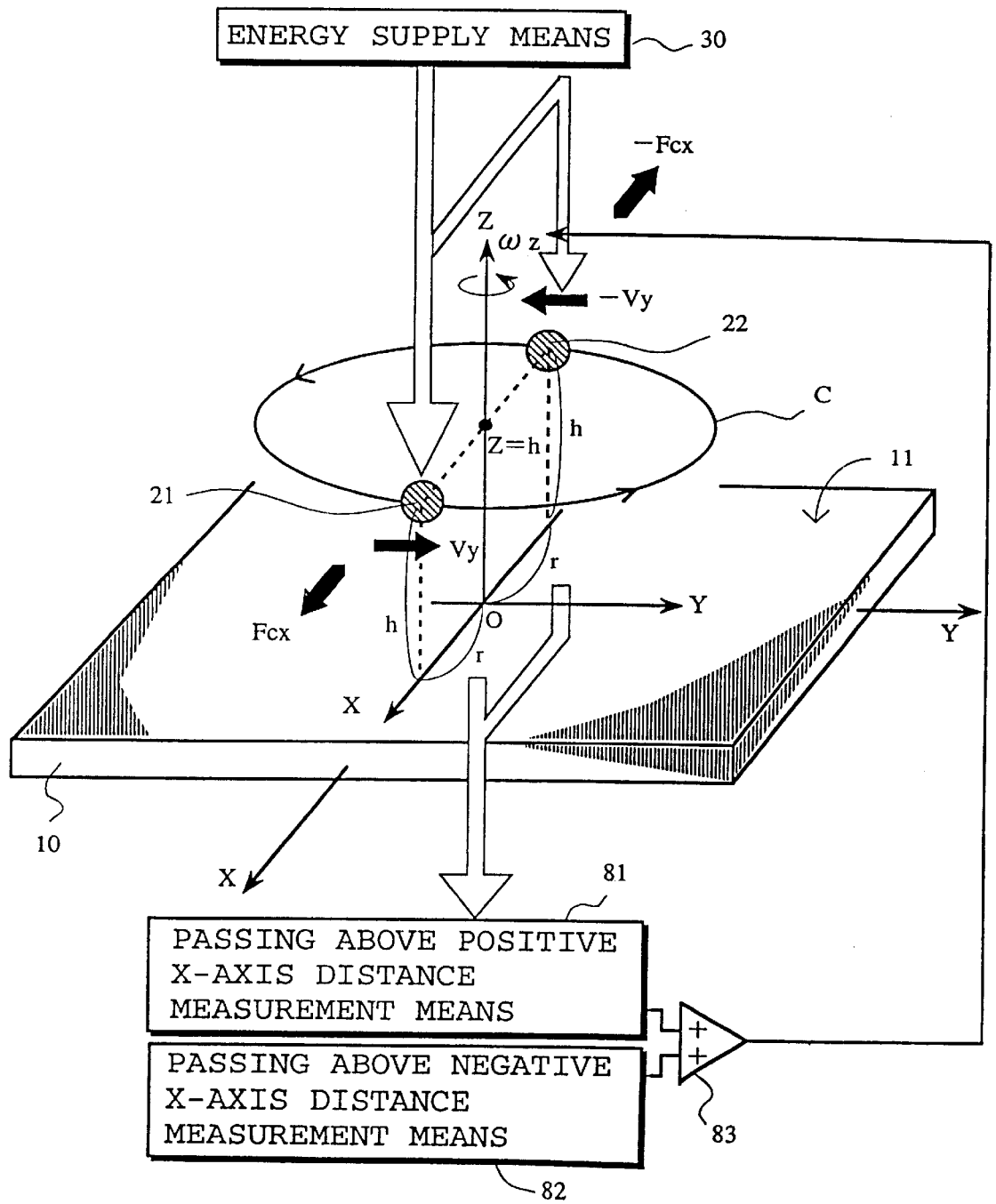
FIG. 35 is a perspective view showing a fundamental configuration of an angular velocity sensor for detecting angular velocity ωz about the Z-axis while canceling the component of acceleration under the environment where acceleration is applied.

The fundamental configuration of the angular velocity sensor having such a fiction to cancel the acceleration component is shown in FIG. 35. In this sensor, a pair of weight bodies 21, 22 are prepared and both the weight bodies are supplied with energy from the energy supply means 30 to carry out rotational motion on the circular orbit C having a radius r with the Z-axis being an axis of rotation. It is to be noted that, as illustrated, the first weight body 21 and the second weight body 22 carry out rotational motion in the state where their phases are shifted relative to each other by 180 degrees so that when the first weight body 21 is located above the positive X-axis, the second weight body 22 is located above the negative X-axis.

Moreover, in this angular velocity sensor, a pair of distance measurement means are provided. Namely, means 81 for measuring distance at a time of passing above the positive X-axis (hereinafter referred to as "passing above positive X-axis distance measurement means 81" as occasion may demand) has a fiction to measure distance between the Z-axis and a weight body at a time point when the weight body is passing through a point above the positive X-axis (for example, the time point when the first weight body 21 locates above the positive X-axis as shown in FIG. 35), and means 82 for measuring distance at a time point of passing above the negative X-axis (hereinafter referred to as "passing above negative X-axis distance measurement means 82" as occasion may demand) has a function to measure distance between the Z-axis and a weight body at a time point when the weight body is passing through a point above the negative X-axis (for example, the time point when the second weight body 22 locates above the negative X-axis as shown in FIG. 35). Further, this angular velocity sensor comprises calculation means 83 for obtaining a sum of distance measured by the "passing above positive X-axis distance measurement means 81" and distance measured by the "passing above negative X-axis distance measurement means 82". Ultimately, an angular velocity ωz about the Z-axis is detected on the basi of an output of the calculation means 83.

Subsequently, the detection principle in this angular velocity sensor and the reason why the acceleration component is canceled will be described. Let us now consider the state where energy is delivered from the energy supply means 30 so that a pair of the weight bodies 21, 22 carry out rotational motion on the circular orbit C included within the plane indicated by Z=h in the state where their phases are shifted relative to each other by 180 degrees. In this state, as shown, the first weight body 21 passes above the positive X-axis with a velocity Vy in the Y-axis positive direction, and the second weight body 22 passes above the negative X-axis with a velocity −Vy in the Y-axis negative direction simultaneously therewith. At this time, if an angular velocity ωz about the Z-axis is applied to the entirety of this system Coriolis force Fcx in the X-axis positive direction is applied to the first weight body 21. As a result, the first weight body 21 deviates toward the outside (in the direction remote or away from the Z-axis) from the original circular orbit C. On the other hand, Coriolis force −Fcx in the X-axis negative direction is applied to the second weight body 22. As a result, the second weight body 22 deviates toward the outside from the original circular orbit C. It is now assumed that the first weight body 21 and the second weight body 22 have exactly the same shape and exactly the same mass. In this case, since both the weigh bodies are carrying out rotational motion while maintaining a phase difference of 180 degrees therebetween all the time, absolute values of velocities of the respective rotational motions are equal to each other. Accordingly, absolute values of Coriolis forces applied to both the weight bodies are equal to each other. If the first weight body 21 deviates toward the outside from the circular orbit C by Δr so that it passes at a position of distance r+Δr from the Z-axis, the second weight body 22 also deviates toward the outside from the circular orbit C by Δr so that it passes at a position of distance r+Δr from th Z-axis. Accordingly, 2r−2·Δr corresponding to the sum of these values is outputted from the calculation means 83. If an output value 2r, which is obtained in the state were no external force is applied, of the calculation mean 83 is determined as a reference value, a difference 2·Δr with respect to the reference value 2r becomes a value indicating an angular velocity ωz about the Z-axis. Meanwhile, in the case where direction of an applied angular velocity ωz is opposite the above direction of the Coriolis force is reversed. As a result, both the weigh bodies 21, 22 deviate toward the inside from the origina circular orbit C. In this case, an output from the calculation means 83 becomes equal to 2r−2·Δr. Accordingly, a sign of an output signal obtained from the calculation means 83 indicates direction of an angular velocity ωz and a magnitude of an output signal indicates the magnitude of an angular velocity ωz.

Let us now consider the case where an acceleration is applied to the entiret of this system. Since force Faz produced on the basis of an acceleration αz in the Z-axis direction and force Fay produced on the basis of an acceleration αy in the Y-akis direction are perpendicular to Coriolis force Fcx in the X-axis direction, there is no possibility that they interfere with this measurement system. However, since force Fax produced on the basis of an acceleration αx in the X-axis direction is directed in the same direction as that of the Coriolis force Fcx, consideration must be made in connection with the influence of interference. In fact, in the measurement system using the single weight body 20 shown in FIG. 34, force Fax produced on the basis of the acceleration αx interferes with a detection value of an angular velocity (oz. However, in the measurement system shown in FIG. 35 using a pair of the weight bodies 21, 22, such an interference is canceled. The reason thereof is as follows. When force Fax produced on the basis of an acceleration αx is applied, the weight bodies 21, 22 are caused to undergo displacement Δx in the X-axis positive direction. For this reason, an output of the "passing above positive X-axis distance measurement mean 81" is increased by Δx, but an output of the "passing above negative X-axis distance measurement means 82" is decreased by Δx. Accordingly, there is no possibility that an output of the calculation means 83 may vary resulting from an action of the acceleration αx.

As stated above, in this embodiment, a pair of weight bodies which carry out rotational motion in the state where their phases are shifted relative to each other by 180 degrees are used, thereby making it possible to cancel the acceleration component.

It has been described above that "passing above positive X-axis distance measurement means 81" and "passing above negative X-axis distance measurement means 82" are use to carry out measurement at a time point when the weight body is passing above the X-axis. Similarly, "passing above positive Y-axis distance measurement means" and "passing above negative Y-axis distance measurement means" may be used to carry out measurement at a time point when the weight body is passing above the Y-axis to detect an angular velocity ωz. Of course, it is possible to carry out measurement of an angular velocity ωz at a time point when the weight body is passing above an arbitrary axis in addition to the X-axis or the Y-axis §−10 More Practical Embodiment of Three-dimensional Angular Velocity Sensor In chapter §5, the practical embodiment of the two-dimensional angular velocity sensor has been already described. According to this embodiment, it is capable of detecting an angular velocity ωx about the X-axis and an angular velocity ωy about the Y-axis at the same time. In this chapter, an explanation will be given in connection with another embodiment in which the principle described in chapter §9 is applied to the above-mentioned two-dimensional angular velocity sensor of chapter §5 to thereby realize a three-dimensional angular velocity sensor capable of detecting an angular velocity ωx about the X-axis, an angular velocity ωy about the Y-axis and an angular velocity ωz about the Z-axis.

Figure 36:
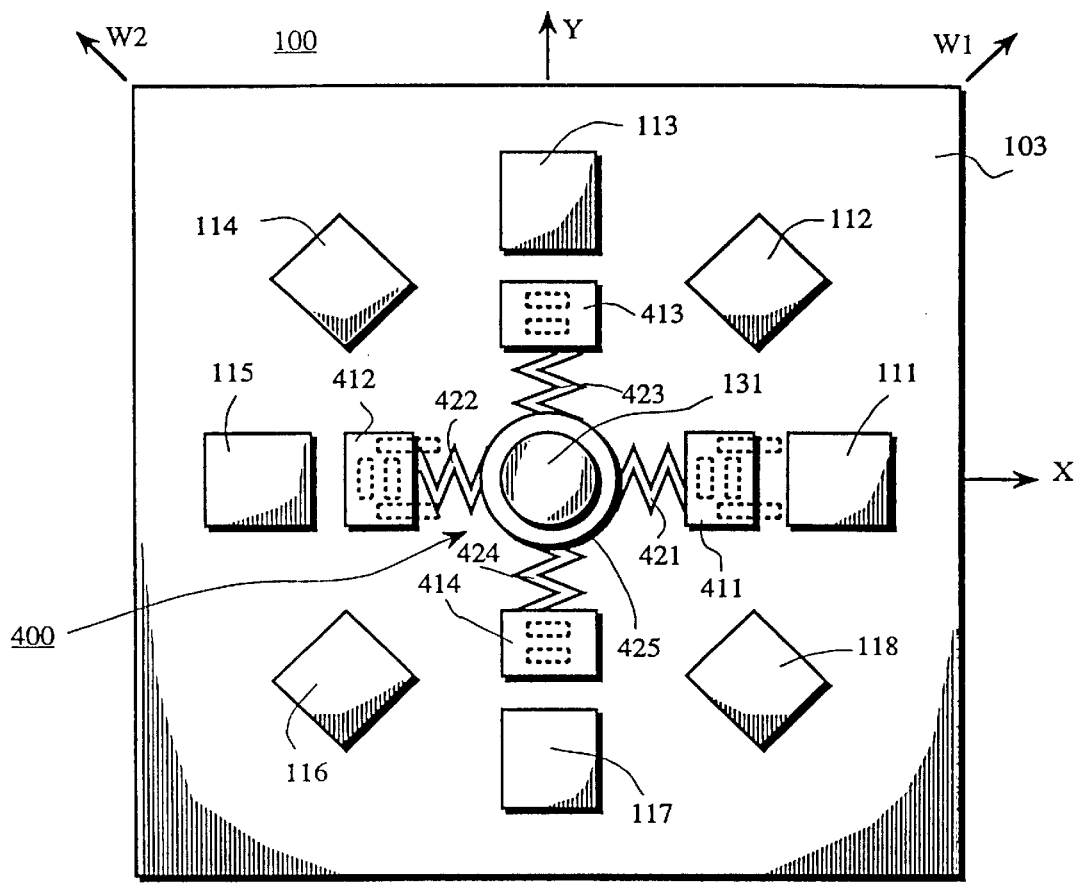
FIG. 36 is a plan view showing a more practical embodiment of a three-dimensional angular velocity sensor capable of detecting angular velocity components ωx, ωy, ωz about three axes.
Figure 37:
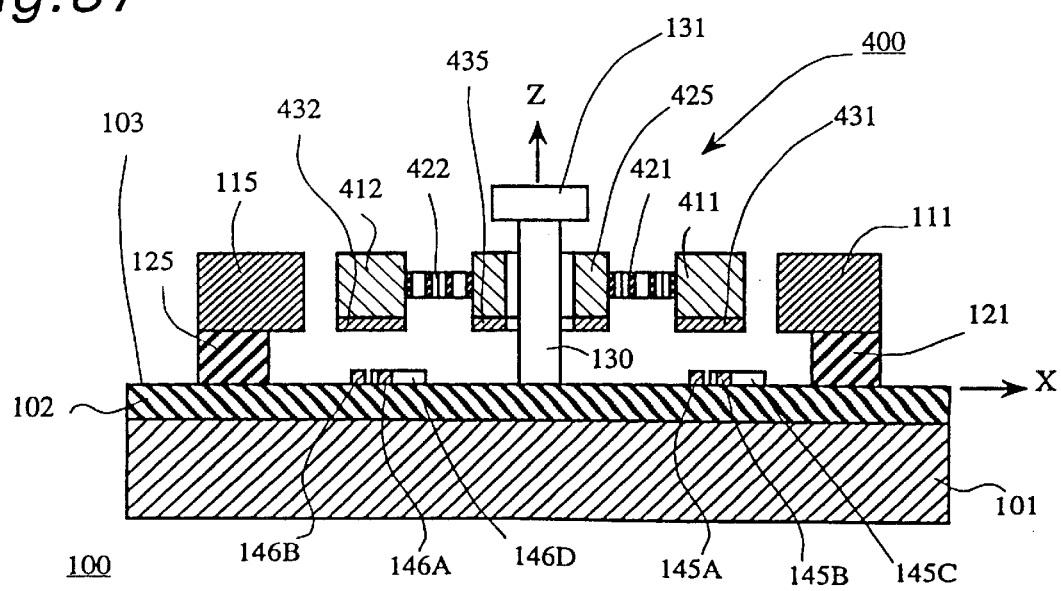
FIG. 37 is a side cross sectional view showing the state where the angular velocity sensor shown in FIG. 36 is cut along the X-axis.

FIG. 36 is a plan view of this three-dimensional angular velocity sensor. FIG. 37 is a side cross sectional view showing the state cut along the X-axis of this sensor. Since the structure of this three-dimensional angular velocity sensor is substantially the same as the structure of the two dimensional angular velocity sensor described in chapter §5 (see FIGS. 13 to 16), only differences therebetween will be described here. Components common to both sensors are respectively indicated by the same reference numerals and their detailed explanation will be omitted.

Figure 38:
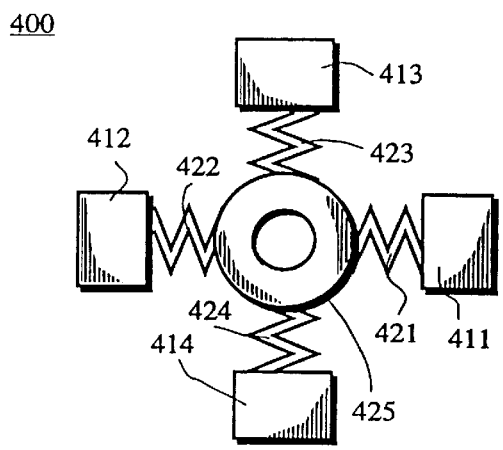
FIG. 38 is a plan view showing only the rotor of the angular velocity sensor shown in FIG. 36.

The first feature of this three-dimensional angular velocity sensor resides in that the rotor 400 has a structure in which a portion can be expanded or contracted. As clearly shown in the plan view of FIG. 38, the rotor 400 is of a construction in which four weight bodies 411 to 414 are connected to a central member 425 by four arms 421 to 4241. In this example, these four arms 421 to 424 have a zigzag structure as shown and have an expanding and contracting property. Accordingly, in the case where force in a direction away from the central member 425 or force in a direction close to the central member 425 is applied to the respective weight bodies 411 to 414, the respective weight body is permitted to undergo displacement in the direction of force applied thereto. Similarly to the previously described two-dimensional angular velocity sensor, movement electrodes 431 to 434 are respectively formed on the lower surfaces of the respective weight bodies 411 to 414 (the electrodes 433, 434 are of illustrated), and an electrode 435 is formed on the lower surface of the central member 425.

Figure 39:
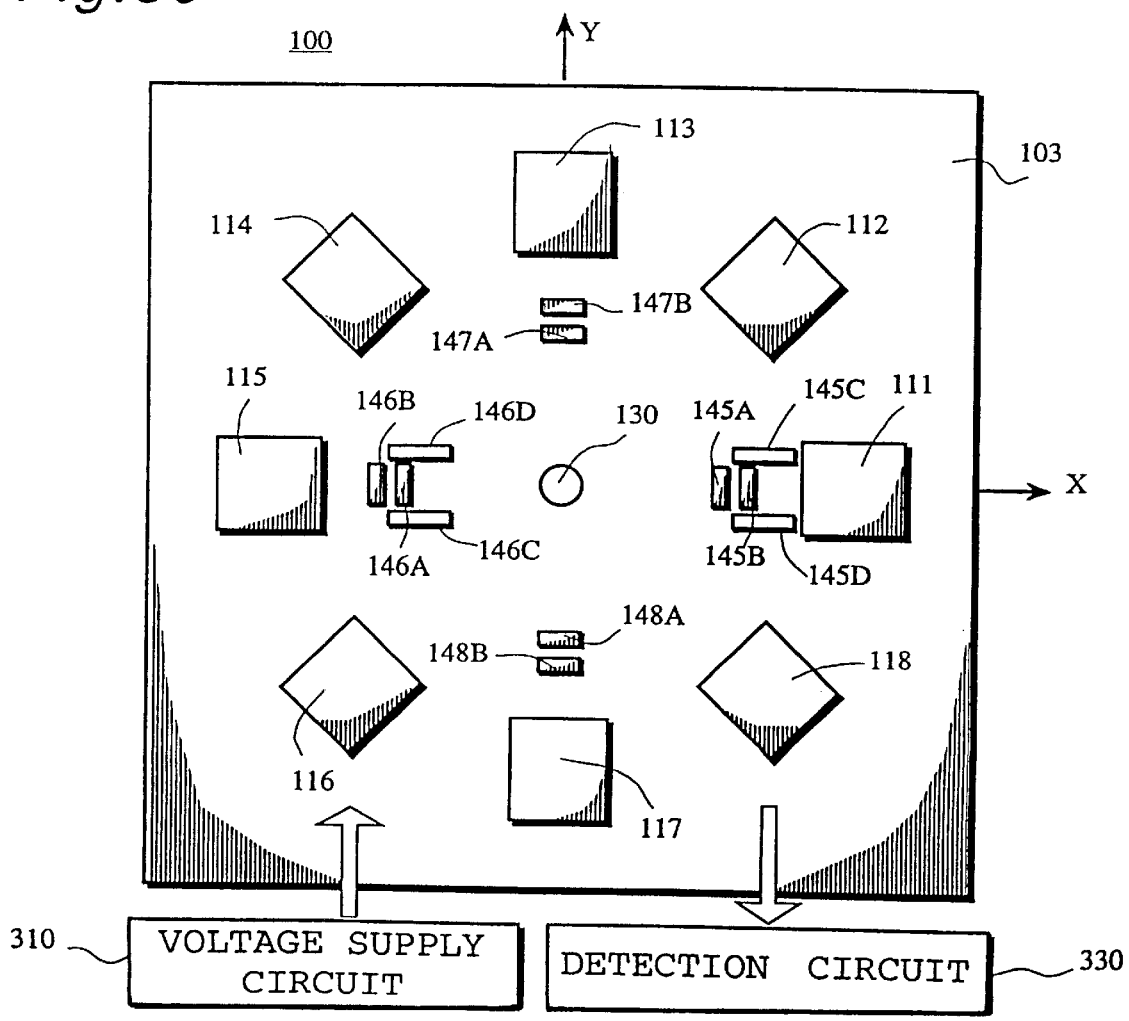
FIG. 39 is a plan view showing the state where the rotor is detached from the angular velocity sensor shown in FIG. 36.

The second feature of this three-dimensional angular velocity sensor resides in that the shape and arrangement of the fixed electrodes on the substrate are slightly changed, and additional fixed electrodes are newly added for the purpose of detecting an angular velocity ωz. FIG. 39 is a plan view showing the state where the stopper 131 of the angular velocity sensor shown in FIG. 36 is removed (omitted) and the rotor 400 is detached. Fixed electrodes 145A to 148A, 145B to 148B disposed on the substrate 100 are fixed electrodes which perform a function exactly equivalent to the fixed electrodes 141A to 144A, 141B to 144B shown in FIG. 16 (i.e., the function to detect an angular velocity ωx about the X-axis and an angular velocity ωy about the Y-axis), but areas of the individual electrodes are caused to be slightly small. The reason why the area is reduced in this way is to prevent a capacitance measurement from suffering the influence of expanding or contracting action of the four arms 421 to 424 which constitute the rotor 400. That is, even if the respective weight bodies 411 to 414 are caused to slightly undergo displacement on the basis of the expanding or contracting action of these arms, a change doe not take place in the areas of the capacitance elements by reducing the areas. On the other hand, the fixed electrodes 145C, 145D, 146C, 146D are additional electrodes added for the purpose of detecting an angular velocity ωz about the Z-axis. Detection circuit 330 is a circuit for detecting electrostatic capacitance values of the capacitance elements constituted by twelve fixed electrodes in total disposed on the substrate 100 and movement electrodes formed on the rotor 400 side (lower surfaces of the respective weight bodies). Detection values of three-dimensional angular velocity components ωx, ωy, ωz are outputted from the detection circuit 330.

Figure 40:
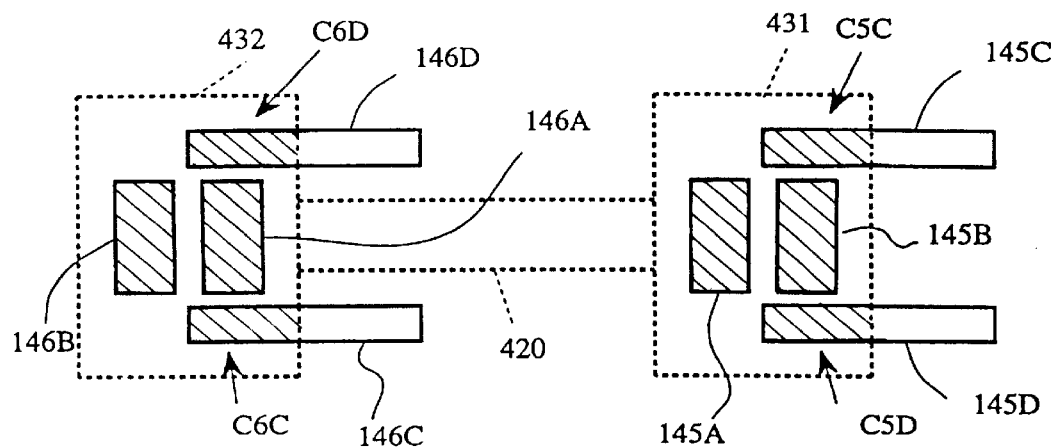
FIG. 40 is a plan view showing capacitance elements in the state when no external force is applied to the angular velocity sensor shown in FIG. 36.

The detection principle of the angular velocity components ωx and ωy by his sensor is as already described in chapter §7. In this chapter, the detection principle of an angular velocity ωz will be described below. FIG. 40 is a plan view showing capacitance elements formed at a moment when the weight bodies 411 and 412 are passing above the X-axis. In this example, components 431, 432 indicated by rectangular broken lines indicate movement electrodes respectively formed on the lower surfaces of the weight bodies 411, 412, and component 420 indicates intermediate member having an expanding and contracting property which connects both the weight bodies. When the movement electrodes 431, 432 as indicated by broken lines in the figure are positioned above the respective fixed electrodes disposed on the substrate 100, capacitance elements are respectively formed by the above-mentioned movement electrodes and the electrodes opposite thereto. Namely, capacitance elements C1A, C1B, C5C, C5D are formed by the fixed electrodes 145A, 145B, 145C, 145D and the movement electrode 431, and capacitance elements C2A, C2B, C6C, C6D are formed by the fixed electrodes 146A, 146B, 146C, 146D and the movement electrode 432. In this case, if the capacitance elements C1A, C1B, C2A, C2B are used to constitute the circuit shown at the left half of FIG. 26, an angular velocity ωx about the X-axis can be detected as previously described. Let us now demonstrate that an angular velocity ωz bout the Z-axis can be detected by using the capacitance elements C5C, C5D, C6C, C6D.

Let us now consider the case where the rotor 400 is carrying out rotational motion at a constant velocity in the state where no external force is applied to this sensor. Further, it is assumed that the respective fixed electrodes are disposed so that the respective fixed electrodes and the respective movement electrodes maintain a positional relationship as shown in the plan view of FIG. 40 at a moment when the weight bodies 411, 412 are passing above the X-axis in this steady state. In this case, the portions where hatching is provided the respective fixed electrodes in FIG. 40 serve as portions opposite the movement electrodes. In other words, capacitance elements are formed only in the areas where the hatching is implemented. The important point to which attention should be drawn is that all of the fixed electrodes 145A, 145B, 146A, 146B for detecting an angular velocity ωx are adapted so that the hatching is implemented to the entire surfaces thereof and these entire surfaces participate in formation of the capacitance elements, though all of the fixed electrodes 145C, 145D, 146C, 146D for detecting angular velocity ωz are adapted so that the hatching is implemented only to the left half of the figure. In short, the fixed electrodes 145A, 145B, 146A, 146B are formed at positions symmetrical with respect to the Y-axis, whereas the fixed electrodes 145C, 145D are formed at positions shifted by a predetermined offset distance to the outside (in the direction remote or away from the Z-axis), and the fixed electrodes 146C, 146D are formed at positions shifted by a predetermined offset distance to the inside (in the direction close to the Z-axis).

Figure 41:
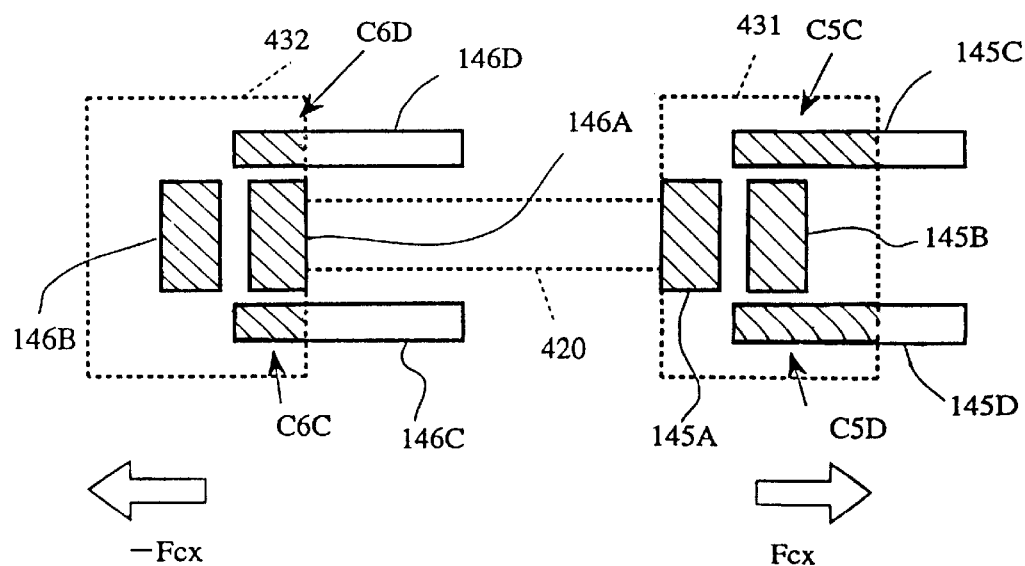
FIG. 41 is a plan view showing capacitance elements in the state when angular velocity ωz about the Z-axis is applied to the angular velocity sensor shown in FIG. 36.

Let us now consider the case where an angular velocity ωz about the Z-axis is applied to the entirety of this sensor. As previously described in chapter §9, when an angular velocity ωz is applied, a Coriolis force along the radial direction of the circular motion is applied to the respective weigh bodies 411 to 414. Since the respective weight bodies are connected by intermediate member 420 (arms 421 to 424) having an expanding or contracting property to constitute the rotor 400, the orbits of the weight bodies are changed toward the outside (or toward the inside depending upon the direction of angular velocity ωz) by this Coriolis force. For example, if the orbits of the respective weight bodies are changed toward the outside, the positional relationship between the fixed electrodes and the movement electrodes at the periphery of the X-axis is as shown in FIG. 41. Namely, the movement electrode 431 being moved above the positive X-axis is caused to undergo displacement by a predetermined quantity Δr in the X-axis positive direction by Coriolis force Fcx in the X-axis positive direction, and the movement electrode 432 being moved above the negative X-axis is caused to undergo displacement by a predetermined quantity Δr in the X-axis negative direction by Coriolis force –Fcx in the X-axis negative direction.

Even if the positions of the movement electrodes are caused to undergo displacement in this way, no change takes place in the electrode areas (areas of the hatched portion of the figure) as far as the capacitance elements constituted by the fixed electrodes 145A, 145B, 146A, 146B which are used for detection of an angular velocity ωx about the X-axis are concerned. To speak conversely, the fixed electrodes 145A, 145B, 146A, 146B are disposed so that the entire surfaces thereof are always respectively opposite the movement electrodes, even if the orbit of the weight body is caused to undergo displacement in the radial direction of the circular motion on the basis of expansion or contraction of the intermediate, member 420. For this reason, an angular velocity ωz about the Z-axis does not interfere with detection of an angular velocity ωx about the X-axis.

For the same reason, an angular velocity ωz about the Z-axis does not interfere with detection of an angular velocity ωy about the Y-axis either.

On the other hand, a change takes place in the electrode areas (areas of the hatched portion of the figure) of the capacitance elements constituted by the fixed electrodes 145C, 145D, 146C, 146D used for detection of an angular velocity ωz about the Z-axis. When it is now assumed that the capacitance elements constituted by the fixed electrodes 145C, 145D, 146C, 146D and the movement electrodes 431, 432 are respectively called capacitance elements C5C, C5D, C6C, C6D, electrostatic capacitance values of the capacitance elements C5C, C5D are increased by increase of the electrode area, and electrostatic capacitance values of the capacitance elements C6C, C6D are decreased by decrease of the electrode area.

Meanwhile, it is difficult to carry out wiring with respect to the rotor 400 because it carries out rotational motion. Therefore, it is preferable to provide a pair of fixed electrodes to measure an electrostatic capacitance value so that it becomes possible to measure the above-described respective electrostatic capacitance values under the condition where wiring is carried out only on the substrate 100. Namely, if the entirety of a pair of the capacitance elements C5C, C5D connected in series is considered to be a single capacitance element C5, and the entirety of a pair of the capacitance elements C6C, C6D connected in series is considered to be a single capacitance element C6, an electrostatic capacitance value of the capacitance element C5 can be measured as an electrostatic capacitance value between the fixed electrodes 145C and 145D, and an electrostatic capacitance value of the capacitance element C6 can be measured as an electrostatic capacitance value between the fixed electrodes 146C and 146D.

Figure 42:
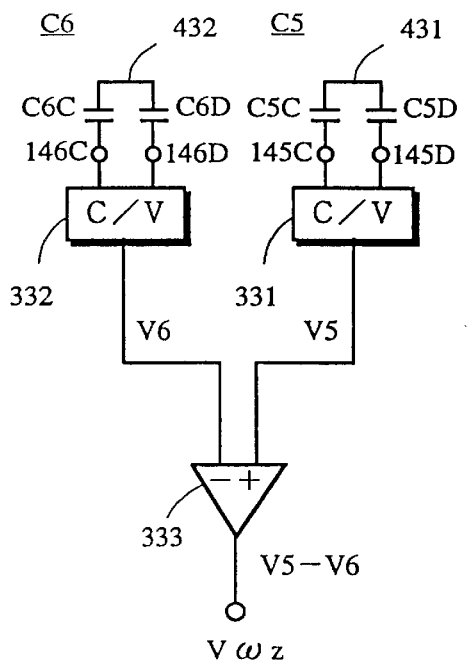
FIG. 42 is a circuit diagram showing a portion of a detection circuit used for the angular velocity sensor shown in FIG. 36.
Figure 43:
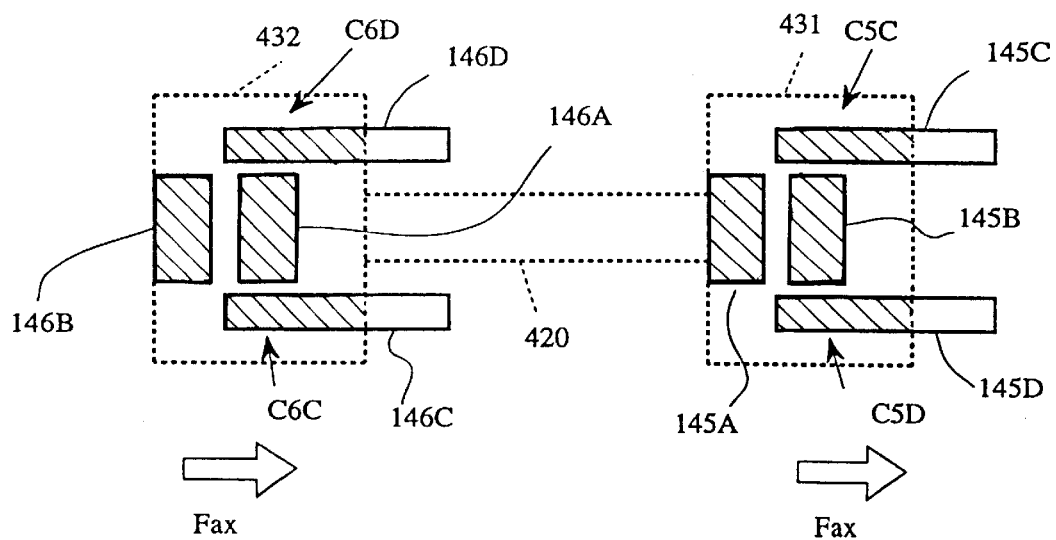
FIG. 43 is a plan view showing capacitance elements in the state when acceleration ωx in the X-axis direction is applied to the angular velocity sensor shown in FIG. 36.

FIG. 42 is a circuit diagram showing an example of a more practical circuit configuration for detecting an angular velocity ωz. Electrostatic capacitance values of the capacitance elements C5, C6 are respectively converted into voltage values V5, V6 by C/V converting circuits 331, 332 having a function to convert electrostatic capacitance value C into voltage value V. Then, the difference between the voltage values V5 and V6 is calculated by an operational amplifier 333. The difference value thus calculated is outputted therefrom. This output voltage is a value indicating difference (Fcx−(−Fcx)) in which a sign of applied Coriolis force is taken into consideration, and becomes a value corresponding to an applied angular velocity ωz about the Z-axis.

Even in the environment where an acceleration is applied, there is no possibility that an output voltage of the differential amplifier 333 may suffer the influence of acceleration. For example, in the case where an acceleration αx in the X-axis direction is applied, the movement electrodes 431, 432 are caused to undergo displacement in the X-axis direction by force Fax based on the acceleration αx. However, since the electrode areas of the capacitance elements C5C, C5D, C6C, C6D are all increased by the same quantity, such increases can be canceled by taking the difference therebetween in the differential amplifier 333. Moreover, in the case where an acceleration αy in the Y-axis is applied, the movement electrodes 431, 432 are caused to slightly undergo displacement in the Y-axis direction. However, there is no change in the electrode areas of the capacitance elements C5C C5D, C6C, C6D. The electrostatic capacitance values of these respective capacitance elements are not affected. Further, in the case where an acceleration αz in the Z-axis direction is applied, electrode distances of the capacitance elements C5C, C5D, C6C, C6D are all increased or decreased by the same quantity. However, such increase or decrease values are canceled by taking differences therebetween by the differential amplifier 333.

In accordance with the fundamental principle shown in FIG. 35, in order to cancel the acceleration component, a sum of an output of the "passing above positive X-axis distance measurement means 81" and an output of the "passing above negative X-axis distance measurement means 82" is obtained by the calculation means 83. On the contrary, in the embodiment disclosed here, in order to cancel the acceleration component, a difference is obtained by using the differential amplifier 333. As stated above, a sum is obtained in the case of the former, and a difference is obtained in the case of the later. However, both the methods are equivalent in principle. Namely, a sum relating to the distance r is obtained in the case of the former, whereas a difference of the electrostatic capacitance value C is obtained in the case of the latter. The reason why handling operations are different in the case of both the methods as stated above is that the increase or decrease of the distance r and the increase or decrease of the electrostatic capacitance value C are different from each other with respect to the same phenomenon. This is a matter of course. For example, a circular motion radius of the weight body in the state of FIG. 40 is assumed to be r, and a circular motion radius of the weight body in the state of FIG. 41 is assumed to be r+Δr. In accordance with the fundamental principle shown in FIG. 35, an angular velocity ωz about the Z-axis is determined on the basis of a sum of the distances from the center axis of a pair of the weight bodies whose phases are shifted relative to each other by 180 degrees. Accordingly, a sum of the distances was "2r" in the state of FIG. 40, whereas a sum of the distances is "2r+2Δr" in the state of FIG. 41. Therefore, "2Δr" which is a change between both the states is value indicating an applied angular velocity ωz. However, in accordance with the electrode arrangement in this embodiment, increase or decrease of the electrostatic capacitance value C is not necessarily in correspondence with increase or decrease of the distance r. Namely, as seen from FIG. 41, capacitance values of the capacitance elements C5C, C5D are increased by increase of the distance r, whereas capacitance values of the capacitance elements C6C, C6D are decreased by increase of the distance r. For this reason, in the circuit diagram shown in FIG. 42, a sign of the voltage value V6 corresponding to capacitance value C6 is inverted in the differential amplifier 333. Therefore, "the calculation for obtaining a difference between electrostatic capacitance values C" which the differential amplifier 333 carries out is equivalent to "the calculation for obtaining a sum of distances r".

§11 Modified Example of Three-dimensional Angular Velocity Sensor

Figure 44:
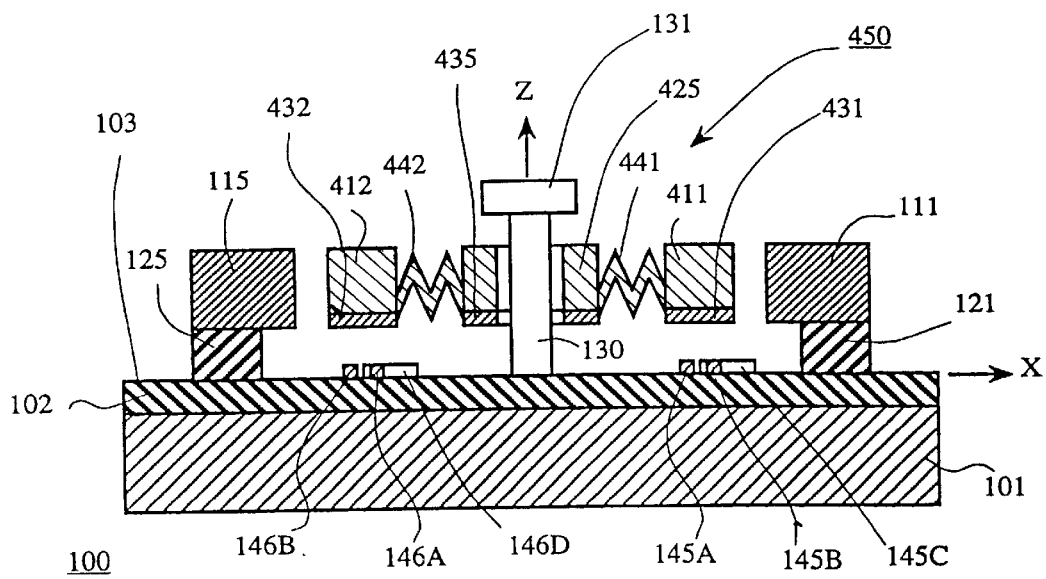
FIG. 44 is a side cross sectional view showing a modified example in which the structure of the rotor is modified or changed with respect to the angular velocity sensor shown in FIG: 36.

FIG. 44 is a side cross sectional view showing a modified example of the three-dimensional angular velocity sensor described in chapter §10. In this sensor, the rotor 400 in the sensor of chapter §10 is replaced by rotor 450. The difference between the rotor 400 and the rotor 450 resides in only the structure of the arms having expanding or contracting property for connecting weight bodies 411 to 414. Namely, while the arms 421 to 424 used in the rotor 400 employ the zigzag structure when viewed from the upper surface, the arms 441 to 444 having the zigzag structure when viewed from the side surface are used in the rotor 450 of the modified example shown in FIG. 44 (the arms 443, 444 are not illustrated).

As an arm having an expanding or contracting property, arms of various structures may be utilized in addition to the above. For example, an arm in coil spring form may be used. It is to be noted that in the case where the micromachining technology is utilized for the semiconductor substrate to form the rotor, it is preferable to use the above-described zigzag arms in which leaf springs constitute the zigzag structure, because manufacturing becomes easy.

Figure 45:
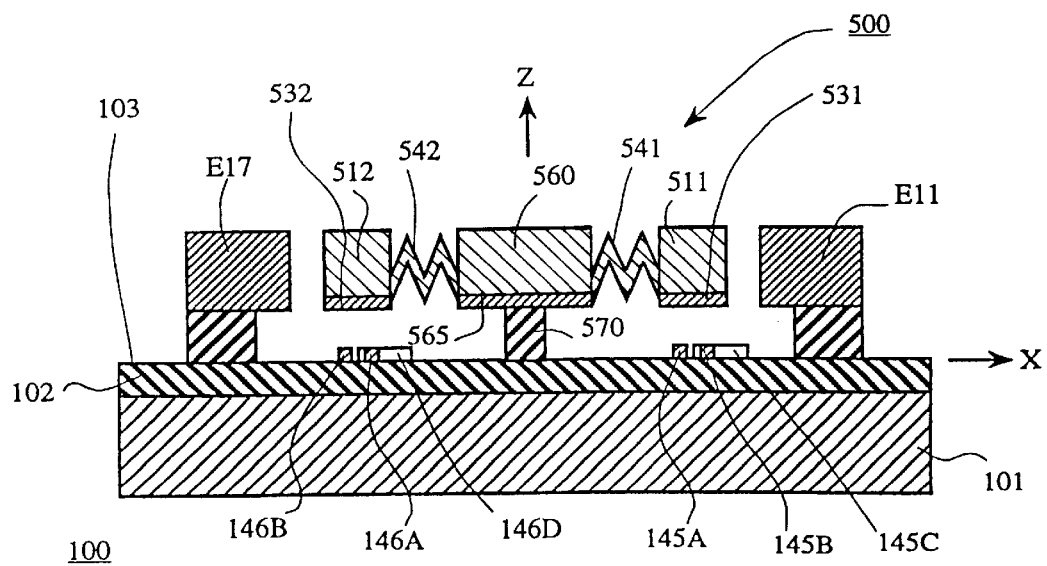
FIG. 45 is a side cross sectional view showing a modified example changed into the type in which the rotor is caused to undergo reversal rotational movement (oscillatory motion) with respect to the angular velocity sensor shown in FIG. 36.

FIG. 45 is a modified example in which there is employed a structure in which the rotor in the three-dimensional angular velocity sensor described in chapter §10 is caused to undergo reversal (reciprocating) rotational motion. Rotor 500 has structure which is substantially the same as the rotor 450 shown in FIG. 44. Namely, four weight bodies 511 to 514 are connected to a central member 560 by arms 541 to 544 having a zigzag structure when viewed from the side surface (the weight bodies 513, 514 and the arms 543, 544 are not illustrated). Movement electrodes 531 to 534, 565 are formed (the movement electrodes 533, 534 are not illustrated) on the lower surfaces of the weight bodies 511 to 514 and the central member 560, and the central member 560 is secured on the substrate 100 through the electrode 565 and a supporting body 570. The supporting body 570 has a structure capable of producing torsion about the Z-axis, and the rotor 500 is thus permitted to carry out reversal (reciprocating) rotational motion as described in chapter §8. The operation of this sensor is exactly the same as the operation of the sensor described in chapter §10 except that the rotor 500 carries out reversal (reciprocating) rotational motion, and its detailed explanation is omitted here.

INDUSTRIAL APPLICABILITY

When the angular velocity sensor according to this invention is mounted on an object to be measured, it becomes possible to detect, at the same time, an angular velocity ωx about the X-axis and an angular velocity ωy about the Y-axis applied to this object. In addition, it becomes possible to obtain precise detection values free from influence of the acceleration component. This angular velocity sensor can be manufactured by making use of micro-machining and semiconductor technology, and is suitable for miniaturization and mass-production. Accordingly, this sensor may be mounted on industrial machines, industrial robots, automotive vehicles, airplanes or ships, etc. and can be widely utilized as a sensor in carrying out recognition of motion (movement) state or feedback control with respect to motion (movement). In addition, this sensor can also be utilized for cameras to eliminate vibrational factors in a picture which is caused by unintentional movement during shutter operation.

What is claimed is:

1. An angular velocity sensor comprising:
   a substrate having an upper surface in an XY plane of an XYZ three dimensional coordinate system;
   a first weight body, a second weight body, a third weight body and a fourth weight body for carrying out rotational movement about a Z-axis of said coordinates system in a non-contact state with respect to the upper surface of the substrate, said Z-axis being perpendicular to said upper surface and constituting an axis of rotation for said weight bodies and said weight bodies being supported so that respective weight bodies can move independently;
   energy supply means for delivering energy to the first weight body so that the first weight body carries out a reversal rotational movement to traverse the positive X-axis in the clockwise and counterclockwise directions alternately while maintaining a fixed distance with respect to the upper surface of the substrate when no external force is applied, for delivering energy to the second weight body so that the second weight body carries out a reversal rotational movement to traverse the negative X-axis in the clockwise and counterclockwise directions alternately while maintaining a fixed distance with respect to the upper surface of the substrate when no external force is applied, for delivering energy to the third weight body so that the third weight body carries out a reversal rotational movement to traverse the positive Y-axis in the clockwise and counterclockwise directions alternately while maintaining a fixed distance with respect to the upper surface of the substrate when no external force is applied, and for delivering energy to the fourth weight body so that the fourth weight body carries out a reversal rotational movement to traverse the negative Y-axis in the clockwise and counterclockwise directions alternately while maintaining a fixed distance with respect to the upper surface of the substrate when no external force is applied, the rotational direction of the reversal rotational movement of the first weight body and the rotational direction of the reversal rotational movement of the second weight body being the same, the rotational direction of the reversal rotational movement of the third weight body and the rotational direction of the reversal rotational movement of the fourth weight body being the same and a rotational direction of the reversal rotational movement of the first and the second weight bodies and a rotational direction of the reversal rotational movement of the third and the fourth weight bodies being opposite;
   distance above positive X-axis measurement means for measuring a distance between the upper surface of the substrate and the first weight body when the first weight body passes above the positive X-axis; and
   distance above negative X-axis measurement means for measuring a distance between the upper surface of the substrate and the second weight body when the second weight body passes above the negative X-axis;
   distance above positive Y-axis measurement means for measuring a distance between the upper surface of the substrate and the third weight body when the third weight body passes above the positive Y-axis;
   distance above negative Y-axis measurement means for measuring a distance between the upper surface of the substrate and the fourth weight body when the fourth weight body passes above the negative Y-axis;
   first difference calculation means for obtaining a difference between a distance measured by the distance above positive X-axis measurement means and a distance measured by the distance above negative X-axis measurement means; and
   second difference calculation means for obtaining a difference between a distance measured by the distance above positive Y-axis measurement means and a distance measured by the distance above negative Y-axis measurement means;
   thereby to detect an angular velocity about the X-axis applied to the substrate on the basis of a difference obtained by the first difference calculation means and to detect an angular velocity about the Y-axis on the basis of a difference obtained by the second difference calculation means.

2. An angular velocity sensor as set forth in claim 1: wherein the first weight body, the second weight body, the third weight body and the fourth weight body are coupled through an intermediate member so that when the first weight body is positioned above the positive X-axis, the second weight body is positioned above the negative X-axis, the third weight body is positioned above the positive Y-axis and the fourth weight body is positioned above the negative Y-axis.

3. An angular velocity sensor as set forth in claim 1: wherein a supporting body made of material capable of producing torsion about the Z-axis is secured on the upper surface of the substrate to support the weight bodies.

4. An angular velocity sensor as set forth in claim 1: wherein the plural weight bodies have the same mass and shape.

5. An angular velocity sensor as set forth in claim 1: wherein at least a portion of the weight bodies is constituted with dielectric substance; and
   wherein the energy supply means comprises a plurality of electrodes disposed along an orbit of the rotational movement of the weight bodies and a voltage supply circuit for supplying, to the plurality of electrodes, a.c. voltages of which phases are different from each other.

6. An angular velocity sensor as set forth in claim 1, wherein said weight bodies are so arranged that said first and second weight bodies move as a pair in one direction and said third and fourth weight bodies move as a second pair in the opposite direction whereby to reduce torsional vibrations.

* * * * *